(12) United States Patent
Asai

(10) Patent No.: US 12,358,670 B2
(45) Date of Patent: Jul. 15, 2025

(54) BINDING MACHINE

(71) Applicant: Max Co., Ltd., Tokyo (JP)

(72) Inventor: Masatoshi Asai, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/409,513

(22) Filed: Jan. 10, 2024

(65) Prior Publication Data

US 2024/0239536 A1    Jul. 18, 2024

(30) Foreign Application Priority Data

Jan. 13, 2023 (JP) ................................ 2023-004108
Nov. 8, 2023 (JP) ................................ 2023-190917

(51) Int. Cl.
     *B65B 13/02*      (2006.01)
     *A01G 17/08*      (2006.01)
     *B65B 13/30*      (2006.01)

(52) U.S. Cl.
     CPC .......... *B65B 13/305* (2013.01); *B65B 13/025* (2013.01)

(58) Field of Classification Search
     CPC .... A01G 17/08; A01G 17/085; B65B 13/305; B65B 13/025
     See application file for complete search history.

(56) References Cited

U.S. PATENT DOCUMENTS

| | | | | |
|---|---|---|---|---|
| 5,778,946 | A * | 7/1998 | Pellenc | A01G 17/085 |
| | | | | 140/119 |
| 10,961,729 | B2 * | 3/2021 | Itagaki | E04G 21/123 |
| 12,054,958 | B2 * | 8/2024 | Itagaki | B25B 25/00 |
| 2023/0389483 | A1 * | 12/2023 | Osuga | A01G 9/128 |

FOREIGN PATENT DOCUMENTS

| | | |
|---|---|---|
| CH | 295590 A | 1/1954 |
| CN | 111903423 A | 11/2020 |
| EP | 1839482 A1 | 10/2007 |
| JP | 2007-217862 A | 8/2007 |
| JP | 2023-013307 A | 1/2023 |
| JP | 2023-013317 A | 1/2023 |
| WO | 2022/092172 A1 | 5/2022 |

OTHER PUBLICATIONS

May 29, 2024—(EP) Extended EP Search Report—EP App 24151369.6.

* cited by examiner

*Primary Examiner* — Andrew M Tecco
(74) *Attorney, Agent, or Firm* — Banner & Witcoff, Ltd.

(57) ABSTRACT

A binding machine includes: a magazine configured to hold a staple that has a first leg portion and a second leg portion and that is opened between the first leg portion and the second leg portion; a driver configured to push the staple held in the magazine in a forward direction with an opening portion facing forward and configured to move the first leg portion and the second leg portion in the forward direction of the magazine; and a displacement portion configured to bind an object to be bound inserted between the first leg portion and the second leg portion by displacing the first leg portion moved in the forward direction of the magazine.

8 Claims, 64 Drawing Sheets

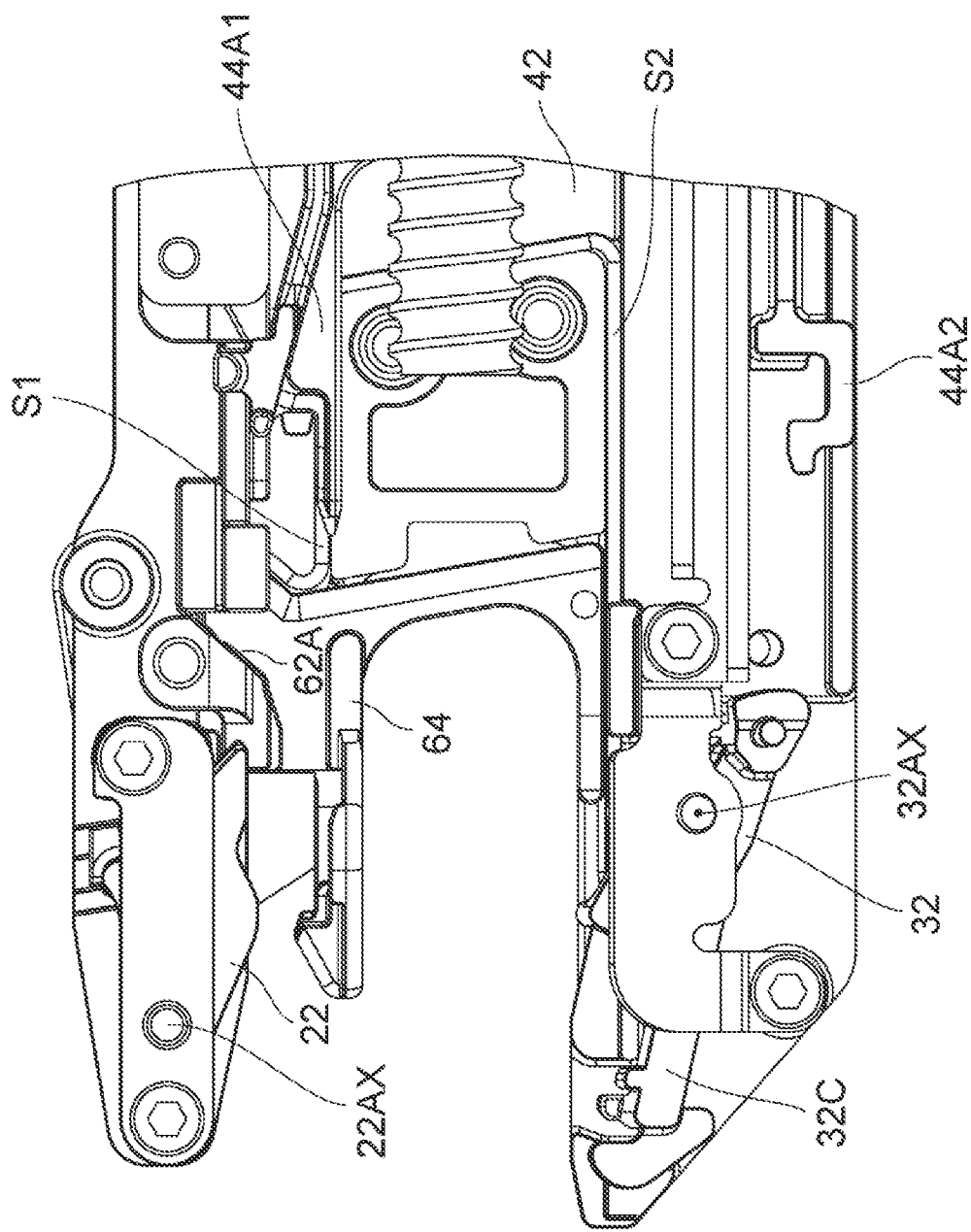
FIG. 17B
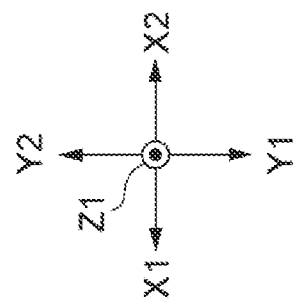

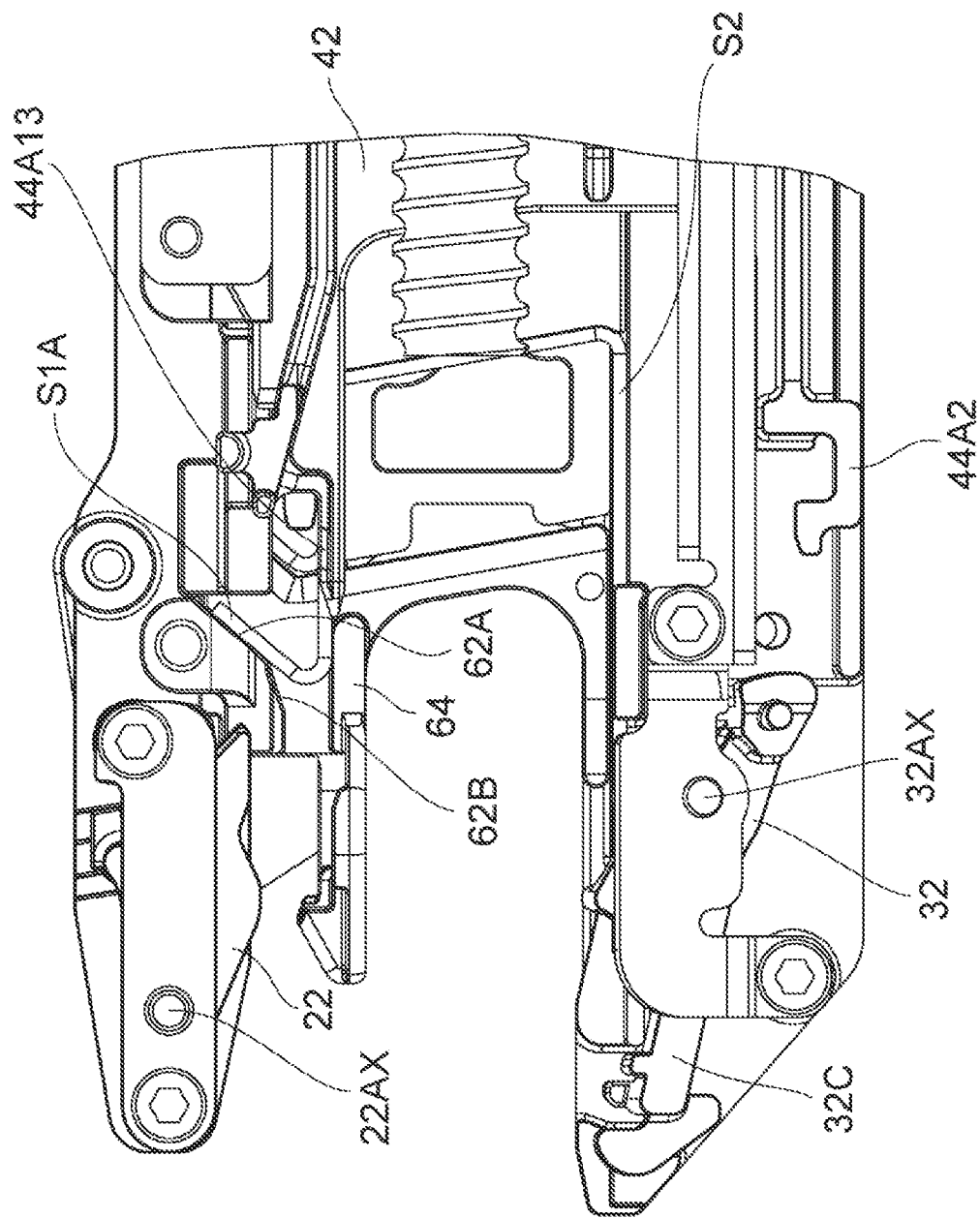
FIG. 18
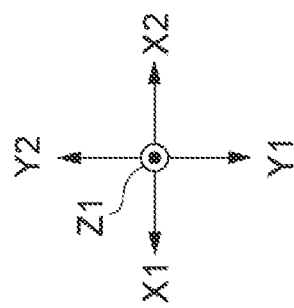

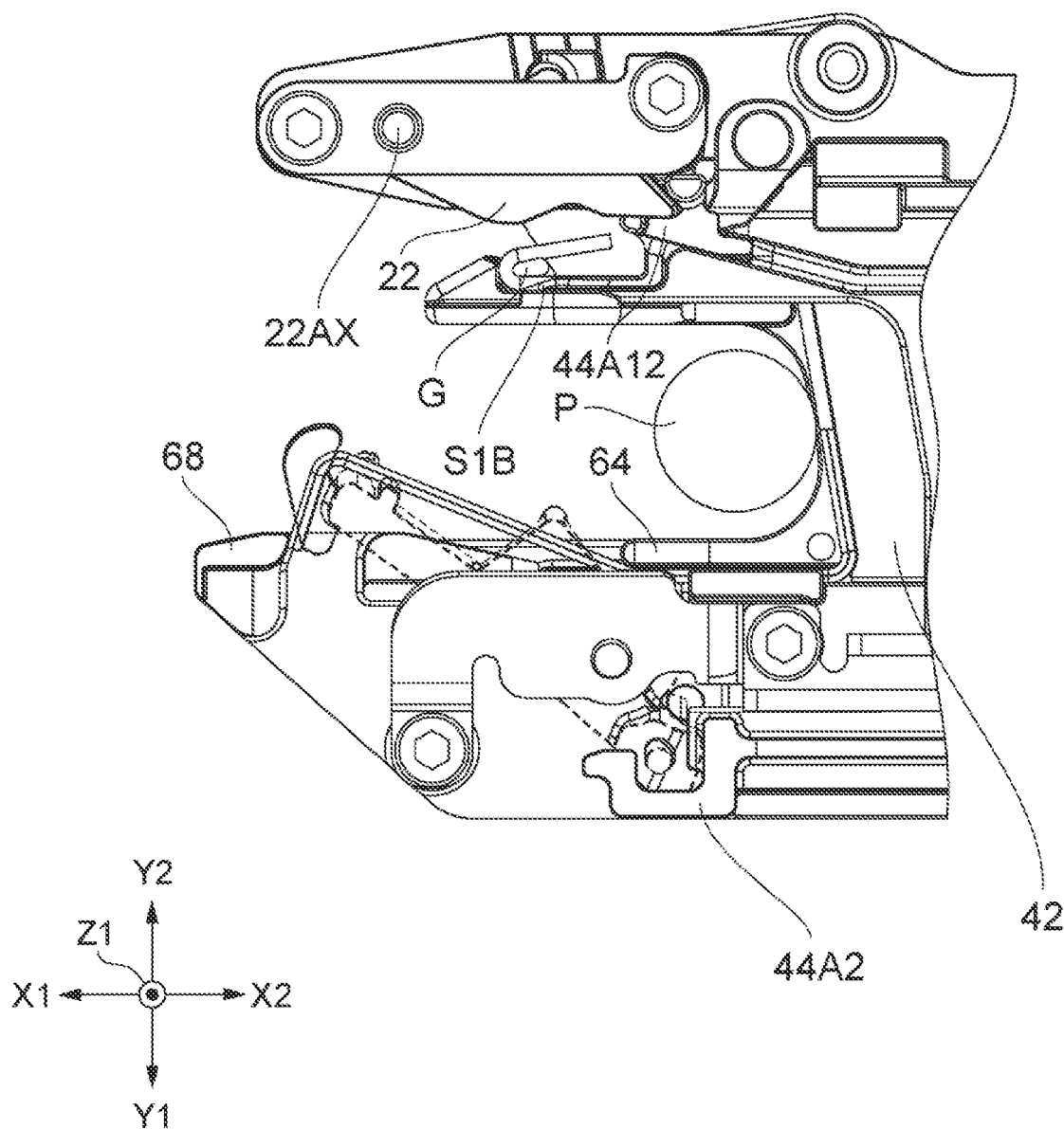

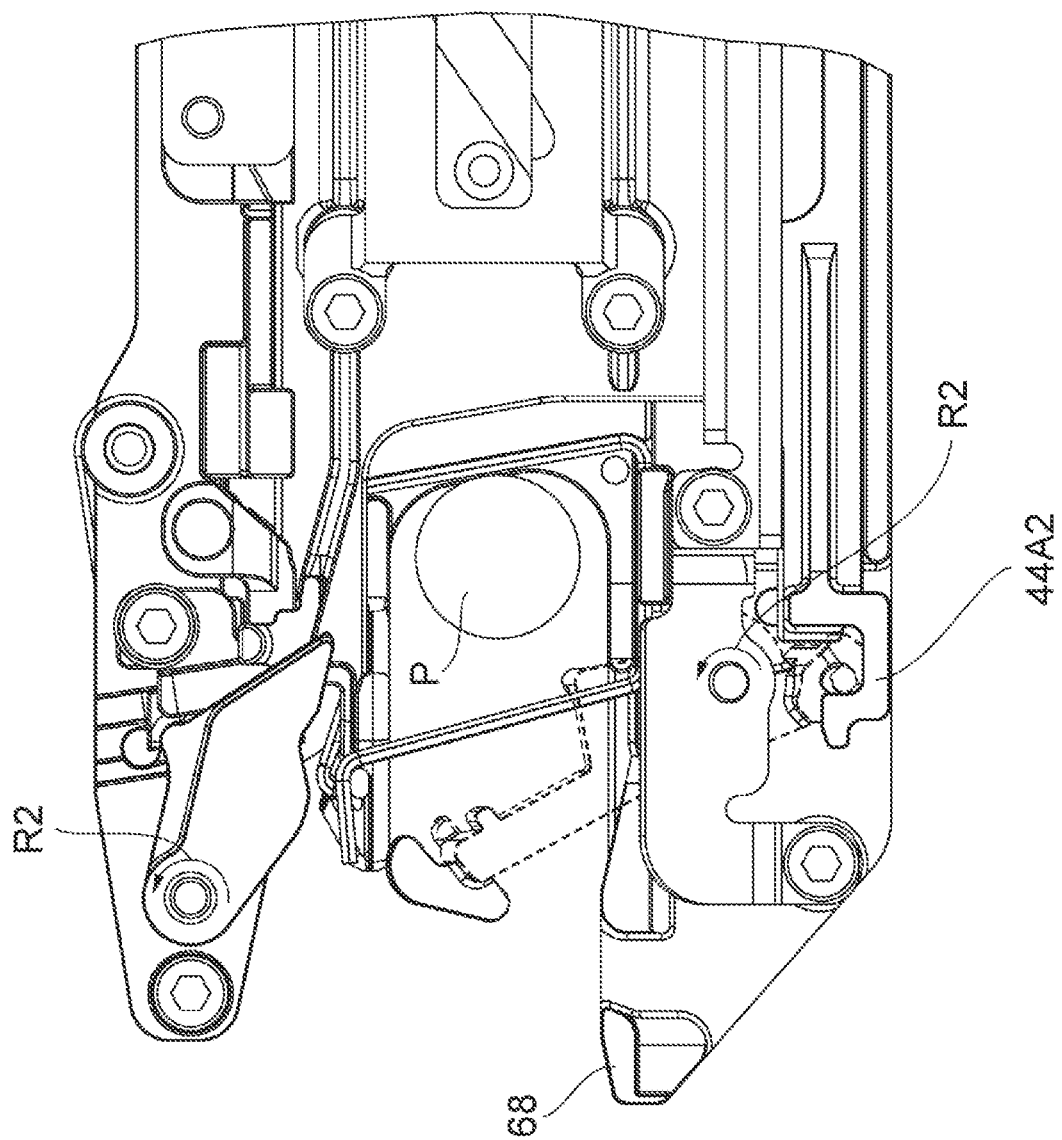
FIG. 25B
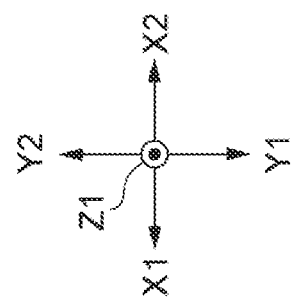

BINDING MACHINE

CROSS-REFERENCE TO RELATED APPLICATIONS

This application is based on Japanese Patent Application No. 2023-004108 filed on Jan. 13, 2023 and Japanese Patent Application No. 2023-190917 filed on Nov. 8, 2023, the contents of which are incorporated herein by way of reference.

TECHNICAL FIELD

The present disclosure relates to a binding machine and a binding method.

BACKGROUND ART

It is known that a plant and the like are bound with a wire or the like by using a binding tool such as a staple.

Patent Literature 1 describes an example of such a staple. The staple includes a pair of left and right arms and a convex protrusion provided between the arms.

Patent Literature 2 describes an electric binding machine that includes a rechargeable power source detachably connected to a mounting shell. The binding machine described in Patent Literature 2 can perform binding by using the staple described in Patent Literature 1.

Patent Literature 1: European Patent No. 1839482
Patent Literature 2: Chinese Patent Application Publication No. 111903423
Patent Literature 3: JP2023-013317A The staple and the like described in Patent Literature 1 restrain the relative movement of two objects, that is, a first object and a second object, and thus the staple and the like correspond to a binding tool (a staple) for binding the first object and the second object.

Patent Literature 2 discloses a binding machine using the staple disclosed in Patent Literature 1.

However, in the binding machine described in Patent Literature 2, since a magazine for accommodating the staple is disposed immediately below a tip end of a binding portion, the magazine may come into contact with the object and damage the object during binding.

Therefore, an example of the object of the present disclosure is to provide a binding machine and a binding method capable of suppressing contact with an object as compared with the related techniques.

SUMMARY OF INVENTION

A binding machine includes: a magazine configured to hold a staple that has a first leg portion and a second leg portion and that is opened between the first leg portion and the second leg portion; a driver configured to push the staple held in the magazine in a forward direction with an opening portion facing forward and configured to move the first leg portion and the second leg portion in the forward direction of the magazine; and a displacement portion configured to bind an object to be bound inserted between the first leg portion and the second leg portion by displacing the first leg portion moved in the forward direction of the magazine.

The displacement portion may be configured to displace the first leg portion to intersect the second leg portion in a top view, and the magazine may be positioned in a rearward direction of an intersection point when the first leg portion and the second leg portion intersect each other.

The displacement portion may include a first fulcrum portion positioned in an inward direction of the first leg portion moved in the forward direction of the magazine, and a bending portion positioned in an outward direction of the first leg portion and configured to bend the first leg portion in the inward direction with the first fulcrum portion as a fulcrum, and the magazine may be positioned in a rearward direction of the first fulcrum portion.

The displacement portion may include a second fulcrum portion positioned in an outward direction of the first leg portion moved in the forward direction of the magazine, and a bending portion positioned in an outward direction of the first leg portion and configured to bend the first leg portion in an inward direction by pivoting in the inward direction with the second fulcrum portion as a fulcrum, and the magazine may be positioned in a rearward direction of the second fulcrum portion.

The magazine may be positioned in a rearward direction of a virtual straight line that passes through a rear end of the staple at a binding position and that is inclined in a downward direction with respect to the forward direction by 60 degrees, in a side view.

The driver may be configured to move the staple held in the magazine in the forward direction of the magazine, by a distance of a half of a total length of the staple.

The driver may be configured to move the staple held in the magazine in the forward direction of the magazine, by a distance of the total length of the staple.

The binding machine may further include: a ball screw; and a nut part configured to move based on a rotation of the ball screw. The nut part may be configured to move the driver.

A total of a length of the driver and an extension amount of the ball screw in the forward direction from a position of a rear end of the staple held in the magazine, may be equal to or larger than a half of a total length of the staple.

BRIEF DESCRIPTION OF DRAWINGS

FIG. 17B is a partially enlarged view illustrating the driver movement start time of the binding machine according to the embodiment in the top view;

FIG. 18 is a partially enlarged view illustrating a state in which the separated staple is advanced by the binding machine according to the embodiment in the top view;

FIG. 22B is a partially enlarged view illustrating the front end portion of the binding machine in the top view when the slider restarts advancing after the first object and the second object are inserted;

FIG. 25B is a partially enlarged view and an enlarged perspective view of the front end portion of the binding machine in the top view after the slider starts retracting;

DESCRIPTION OF EMBODIMENTS

Hereinafter, embodiments of the present disclosure will be described with reference to the drawings. The following embodiments are examples for explaining the present disclosure, and it is not intended to limit the present disclosure only to the embodiments.

Configuration of Staple S

First, a configuration of a staple S according to the present embodiment will be described. The staple S is formed of a plastic deformable wire material that has plasticity. The staple S may be referred to as a wire or a clip. The staple S includes, for example, a metal wire material or a metallic wire (including one whose surface is coated by using a plating process or a resin).

Figure 1A:
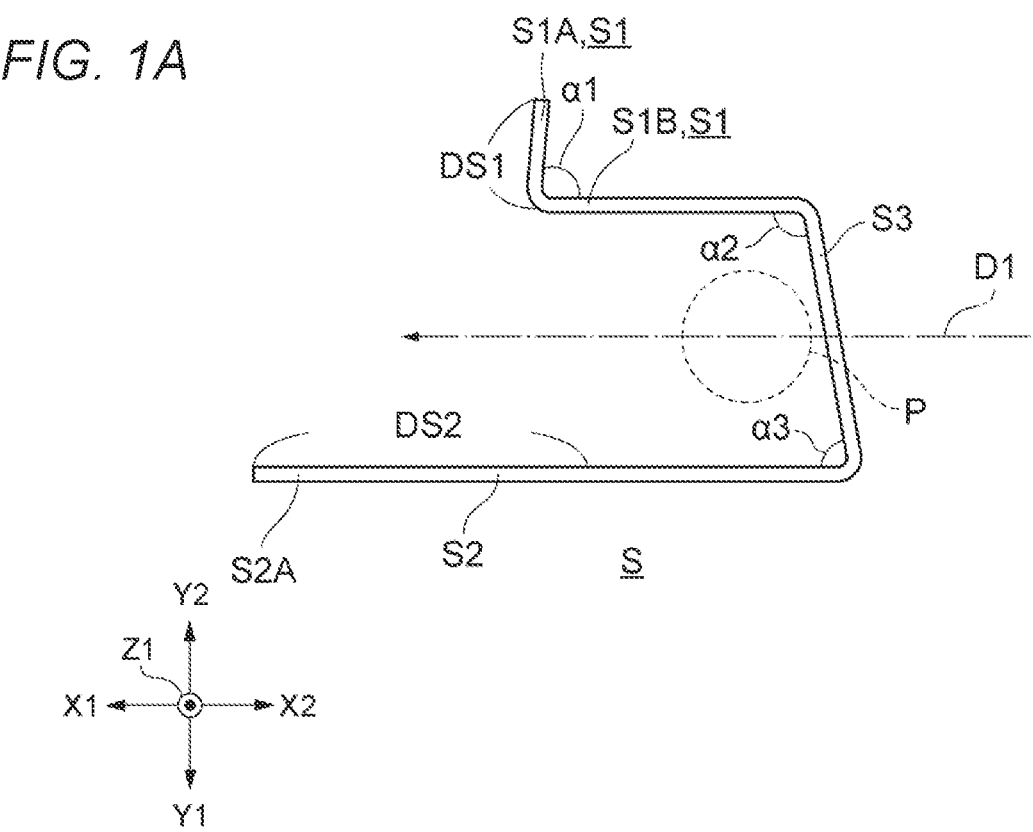
FIG. 1A is a diagram illustrating an example of a staple before binding in a top view.
Figure 1B:
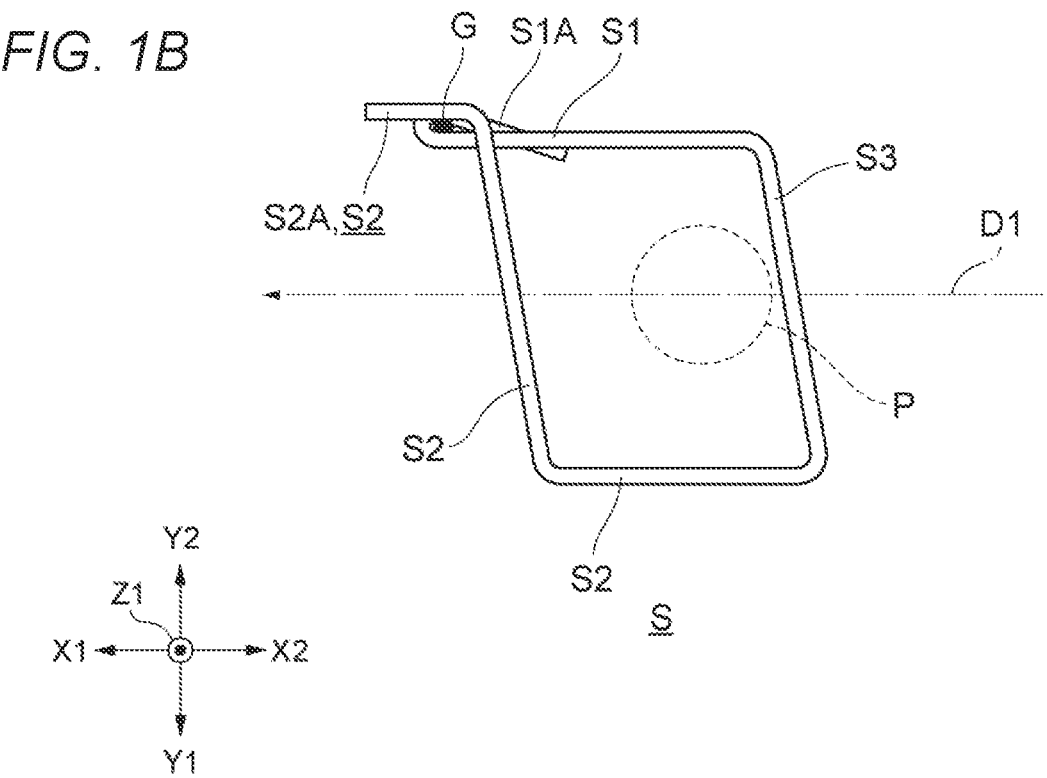
FIG. 1B is a diagram illustrating an example of the staple after the binding in the top view.
Figure 1C:
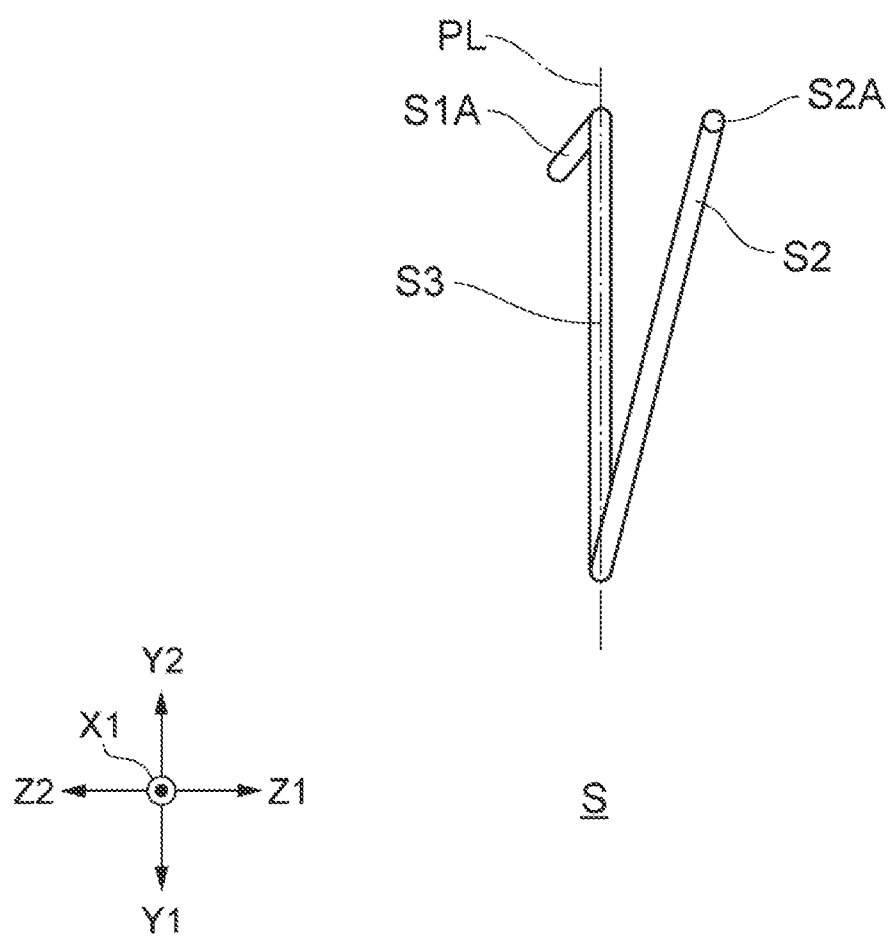
FIG. 1C is a diagram illustrating an example of the staple after the binding in a front view.

FIG. 1A illustrates the staple S before binding according to the present embodiment, and FIGS. 1B and 1C respectively illustrate a top view and a front view of the staple S in a bound state after the binding (however, for convenience of description, parts unnecessary for description such as a first object G and a second object P are omitted in FIG. 1C).

The staple S includes a first leg portion S1, a second leg portion S2, and a main body portion S3 connecting the first leg portion S1 and the second leg portion S2.

In a state before the binding, the first leg portion S1 and the second leg portion S2 of the staple S are separately provided, and thus an opening is provided between the first leg portion S1 and the second leg portion S2. A direction from a closed portion of the main body portion S3 toward the opening (a leftward direction of a paper surface in FIG. 1A) is referred to as an opening direction D1. When the staple S is set in a binding machine 10, the opening direction D1 of the staple S coincides with a forward direction X1 to be described later.

The first leg portion S1 is a portion including one end portion of the staple S and includes a first portion S1B extending in the opening direction D1 and a tip end portion S1A bent from the first portion S1B and extending outward. An angle formed by the first portion S1B and the tip end portion S1A is referred to as a bending angle $\alpha 1$, and a portion of the tip end portion S1A that is bent to be connected to the first portion S1B is referred to as a bent portion. In the present embodiment, the bending angle $\alpha 1$ is 90 degrees or less.

The second leg portion S2 is a portion including the other end portion of the staple S and includes a second portion extending in the opening direction D1. In the top view (FIG. 1B) illustrating the bound state, the second leg portion S2 is bent to intersect the first leg portion S1 and closes the opening. Accordingly, the second leg portion S2 according to the present embodiment is formed to be longer than a width of the opening, that is, a distance between the first leg portion S1 and the second leg portion S2. In addition, the second leg portion S2 is formed to be longer than the first leg portion S1.

The main body portion S3 is a portion connecting the first leg portion S1 and the second leg portion S2. The main body portion S3 according to the present embodiment includes a side portion extending linearly. However, a shape of the main body portion S3 is not limited thereto, and the main body portion S3 may include, for example, a curved portion that is curved in an outward direction or may include one or more side portions and one or more curved portions.

In the bound state illustrated in FIG. 1B, the tip end portion S1A of the first leg portion S1 of the staple S is bent substantially clockwise (Hereinafter, in the top view, a substantially clockwise direction may be referred to as a "first rotation direction R1", and a substantially counter-clockwise direction may be referred to as a "second rotation direction R2".) in FIG. 1B, and intersects the first leg portion S1 in the top view. Accordingly, it is possible to sandwich the first object G with the first leg portion S1. As illustrated in FIG. 1C, the tip end portion S1A of the first leg portion S1 is bent such that a tip end thereof advances in a downward direction Z2 separated from a plane PL penetrating through the first leg portion S1, the second leg portion S2, and the main body portion S3 before the binding.

On the other hand, a part of the second leg portion S2 of the staple S closes the opening by being folded in the first rotation direction R1. Since the opening is closed, it is possible to restrain the staple S from being disengaged from the second object P surrounded by the staple S. Further, as illustrated in FIG. 1C, a tip end portion S2A of the second leg portion S2 is bent such that a tip end thereof advances in an upward direction Z1 separated from the plane PL penetrating through the first leg portion S1, the second leg portion S2, and the main body portion S3 before the binding. In this way, the tip end of the first leg portion S1 is bent to advance in the downward direction Z2 and is engaged with the first object G, and the tip end of the second leg portion S2 is bent to advance in the upward direction Z1 and is engaged with the second object P, and thus it is possible to easily generate tension in a region from an engagement position of the first object G with the first leg portion S1 to an engagement position of the second object P with the second leg portion S2. Accordingly, it is possible to restrain the first object G from being bent and the staple S from falling off and the like.

In addition, the second leg portion S2 is folded to a position at which the second leg portion S2 intersects the first leg portion S1 in the first rotation direction R1 toward an inward direction of the staple S so as to close the opening in the top view. At this time, the tip end portion S2A of the second leg portion S2 passes through a gap between the first object G and the second object P. Thereafter, the second leg portion S2 is displaced in the second rotation direction R2 opposite to the first rotation direction R1 in the top view, which causes the tip end portion S2A of the second leg portion S2 passing through the gap between the first object G and the second object P to be engaged with the first object G. As a result, the first object G can be engaged so as to be sandwiched between the tip end portion S1A of the first leg portion S1 and the tip end portion S2A of the second leg portion S2. Even when the second object P grows, the first leg portion S1 and the second leg portion S2 are respectively bent in directions in which a force for sandwiching the first object G is strengthened. Accordingly, even when the second object P grows, the staple S is less likely to be disengaged from the first object G.

When the second leg portion S2 is displaced in the first rotation direction R1, it is preferable to bend the second leg portion S2 in the first rotation direction R1 and bend the tip end portion S2A of the second leg portion S2 in the second rotation direction R2 opposite to the first rotation direction R1. According to such a configuration, it is possible to easily engage the tip end portion S2A of the second leg portion S2 with the first object G by displacing the tip end portion S2A of the second leg portion S2 that has passed through the gap between the first object G and the second object P in the second rotation direction R2.

As is clear from a comparison between FIG. 1A illustrating the state of the staple S before the binding and FIGS. 1B and 1C illustrating the state of the staple S after the binding, when a distance from the tip end of the first leg portion S1 to the displaced portion of the first leg portion S1 is set to a first distance DS1 and a distance from the tip end of the second leg portion S2 to the displaced portion of the second leg portion S2 is set to a second distance DS2, the second distance DS2 is larger than the first distance DS1, and for example, the second distance DS2 is larger than twice the first distance DS1. In this way, by bending the staple S in a non-symmetrical manner, it is possible to suitably engage the second leg portion S2 with the first object G held adjacently to the first leg portion S1.

Further, as illustrated in FIG. 1A, a boundary position between the displaced portion and a non-displaced portion of the first leg portion S1, which corresponds to a position from the tip end of the first leg portion S1 by the first distance DS1, corresponds to a position advanced in the opening direction D1 with respect to a boundary position between the displaced portion and a non-displaced portion of the second leg portion S2, which corresponds to a position from the tip end of the second leg portion S2 by the second distance DS2.

According to such a configuration, when a slider 44 is advanced in the opening direction D1, it is possible to first start the displacement of the second leg portion S2, and start the displacement of the first leg portion S1 after the displacement of the second leg portion S2 is started. Therefore, it is possible to restrain a large load from being applied to the binding machine 10 at the same time.

A shape of the staple S is not limited to that illustrated in FIG. 1A. For example, it will be understood by a person skilled in the art that the first leg portion S1 and the second leg portion S2 are not necessarily parallel to each other, and for example, even when the width of the opening becomes narrower toward the tip end, or the width of the opening becomes wider toward the tip end, it is possible to bend the staple S such that at least a part of the technical effects described above is exhibited. In addition, it will be understood by a person skilled in the art that even when the first leg portion S1 and the second leg portion S2 have the same length, the tip end of the first leg portion S1 is surplus, but it is possible to bend the staple S such that at least a part of the technical effects described above is exhibited.

A method of bending the staple S is not limited to those illustrated in FIGS. 1B and 1C. For example, the tip end portion S2A of the second leg portion S2 may not be bent. It will be understood by a person skilled in the art that even when the tip end portion S2A of the second leg portion S2 is not bent, the second leg portion S2 can be engaged with the first object G, and thus at least a part of the technical effects described above is exhibited.

An example of a configuration of the binding machine 10 for bending the staple S illustrated in FIG. 1A as illustrated in FIGS. 1B and 1C will be described below.

Figure 2:
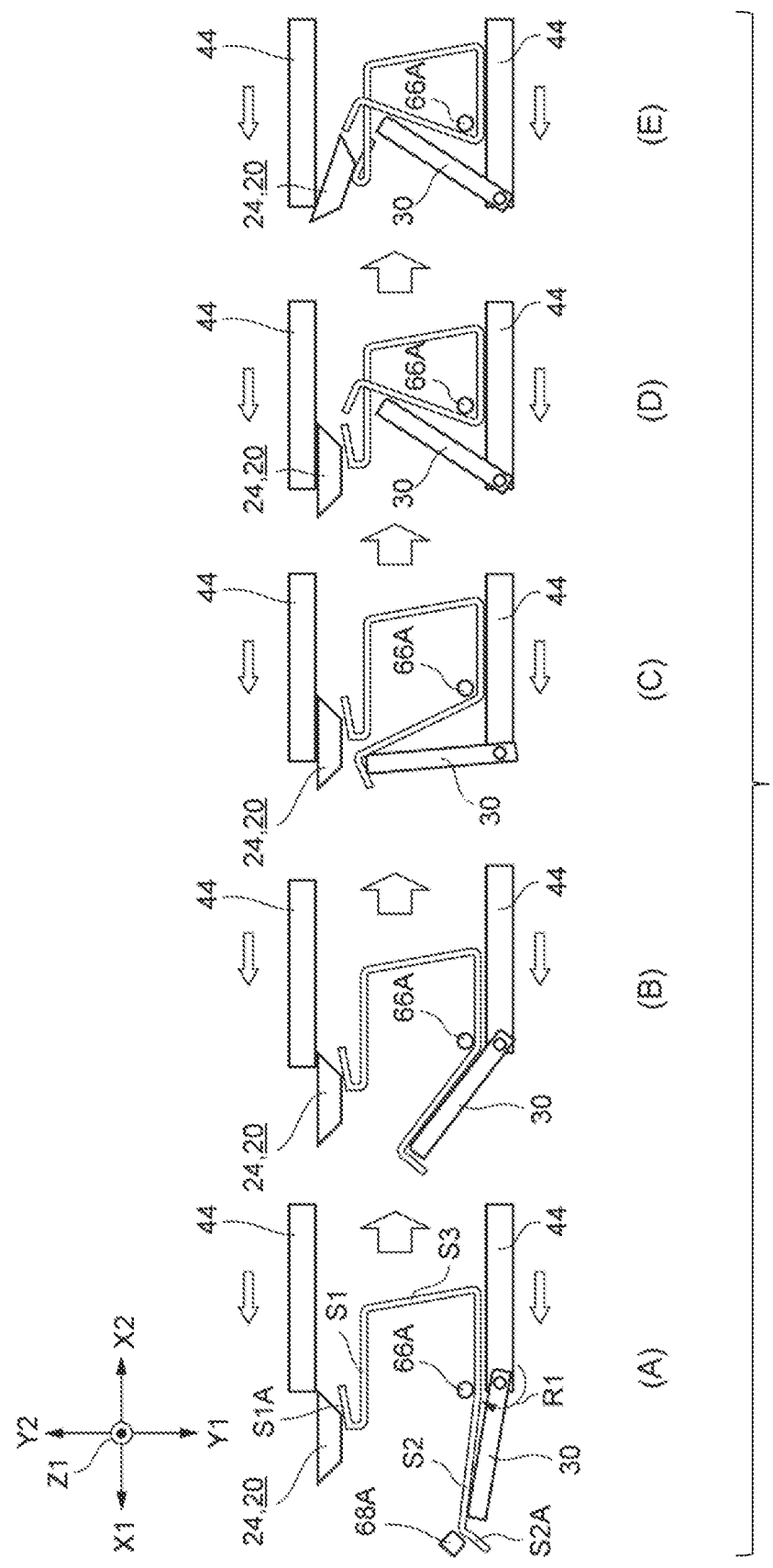
FIG. 2 is a schematic diagram of a binding method using a binding machine according to an embodiment.

(A) to (E) of FIG. 2 are schematic diagrams illustrating the configuration of the binding machine 10 according to the embodiment of the present disclosure and states of the staple S bent by the binding machine 10, respectively. In (A) to (E) of FIG. 2, the main body portion S3 of the staple S is static.

In order to describe a relation between relative directions, for the sake of convenience, a leftward direction of the paper surface in FIG. 2 may be referred to as the forward direction X1, a rightward direction of the paper surface may be referred to as a rearward direction X2, a near-side direction perpendicular to the paper surface may be referred to as the upward direction Z1, a far-side direction perpendicular to the paper surface may be referred to as the downward direction Z2, a lower side of the paper surface may be referred to as a rightward direction Y1, and an upper side of the paper surface may be referred to as a leftward direction Y2. The top view refers to a viewpoint when the binding machine 10 and the like are seen from a position at the upward direction Z1 toward the downward direction Z2, the front view refers to a viewpoint when the binding machine 10 and the like are seen from a position at the forward direction X1 toward the rearward direction X2, and the side view refers to a viewpoint when the binding machine 10 and the like are seen toward the rightward direction Y1 or the leftward direction Y2.

Further, when the staple S to be described later is set in the binding machine 10, a direction from a region surrounded by the staple S (a region into which the second object P to be described later is inserted) toward an outer side of the staple S may be referred to as an outward direction, and a direction from the outer side of the staple S toward the region surrounded by the staple S may be referred to as an inward direction, with the staple S as a reference.

As illustrated in (A) of FIG. 2 and the like, the binding machine 10 includes the slider 44 as an example of a movement part that moves in the forward direction X1. The binding machine 10 further includes a first displacement portion 20 for displacing the first leg portion S1 of the staple S. The first displacement portion 20 displaces the first leg portion S1 of the staple S so as to be engageable with the first object G by moving different parts in different directions based on the movement of the slider 44 toward the forward direction X1.

The slider 44 may be integrally formed or may be composed of a plurality of parts that move in an interlocked manner.

The first displacement portion 20 according to the present embodiment includes a contact member 24 that moves in a direction inclined toward the inward direction of the staple S (the rightward direction Y1) and the rearward direction X2 based on the movement of the slider 44 toward the forward direction X1. The contact member 24 comes into contact with a region of the tip end portion S1A of the staple S and bends the tip end portion S1A to plastically deform, and thus the contact member 24 may be referred to as a gripping portion.

The first displacement portion 20 may include a part that moves in a direction substantially perpendicular to the forward direction X1, which is the inward direction of the staple S (the rightward direction Y1), based on the movement of the slider 44 toward the forward direction X1 so as to come into contact with the tip end portion S1A of the staple S and bend the tip end portion S1A.

Instead of this, the first displacement portion 20 may include a part that moves in the outward direction of the staple S (the leftward direction Y2) based on the movement of the slider 44 toward the forward direction X1 so as to come into contact with the tip end portion S1A of the staple S and bend the tip end portion S1A.

Instead of this, the first displacement portion 20 may include a part that moves the staple S in the first rotation direction R1 based on the movement of the slider 44 toward the forward direction X1 so as to come into contact with the tip end portion S1A of the staple S and bend the tip end portion S1A.

Instead of this, the first displacement portion 20 may include a part that moves the staple S in the second rotation direction R2 based on the movement of the slider 44 toward the forward direction X1 so as to come into contact with the tip end portion S1A of the staple S and bend the tip end portion S1A.

As a mechanism for moving the parts such as the contact member 24 in different directions based on the movement of the movement part such as the slider 44 toward the forward direction X1, a mechanism disclosed in the present embodiment or other mechanisms may be used.

As a mechanism for rotating the parts such as the contact member 24 in the first rotation direction R1 or the second rotation direction R2 based on the movement of the movement part such as the slider 44 toward the forward direction X1, the mechanism disclosed in the present embodiment or other mechanisms may be used.

The binding machine 10 further includes a second displacement portion 30 for displacing the second leg portion S2 of the staple S. The second displacement portion 30 displaces the second leg portion S2 of the staple S so as to be engageable with the first object G by moving different parts in different directions based on the movement of the slider 44 toward the forward direction X1.

The second displacement portion 30 according to the present embodiment includes an arm (may also referred to as a second arm) that bends the second leg portion S2 to plastically deform by rotating in the first rotation direction R1 based on the movement of the slider 44 toward the forward direction X1. In the present embodiment, since the arm comes into contact with the second leg portion S2 of the staple S and bends the second leg portion S2 in a direction inclined toward the upward direction Z1 while bending the second leg portion S2 in a direction approaching the first leg portion S1, and thus the arm may be referred to as an obliquely bending portion.

In (A) of FIG. 2, the second displacement portion 30 is connected to the slider 44 and rotates with a front end portion of the slider 44 as a fulcrum. However, as described in an embodiment to be described later, the second displacement portion 30 may not be connected to the slider 44. For example, the second displacement portion 30 may be not connected to the slider 44, and may include a second arm 32 that bends the second leg portion S2 to plastically deform the second leg portion S2 by rotating in the first rotation direction R1 by a second front end portion 44A2 of the slider 44.

The second displacement portion 30 may include a part that moves in a direction substantially perpendicular to the forward direction X1, which is the inward direction of the staple S (the leftward direction Y2), based on the movement of the slider 44 toward the forward direction X1 so as to come into contact with the second leg portion S2 of the staple S and bend the second leg portion S2.

Instead of this, the second displacement portion 30 may include a part that moves in the outward direction of the staple S (the rightward direction Y1) based on the movement of the slider 44 toward the forward direction X1 so as to come into contact with the second leg portion S2 of the staple S and bend the second leg portion S2.

Instead of this, the second displacement portion 30 may include a part that moves the staple S in the second rotation direction R2 based on the movement of the slider 44 toward the forward direction X1 so as to come into contact with the second leg portion S2 of the staple S and bend the second leg portion S2.

Further, the second displacement portion 30 according to the present embodiment additionally includes a support wall portion 68A that bends the tip end portion S2A of the second leg portion S2 in an opposite direction (the outward direction) by causing the tip end portion S2A of the second leg portion S2 to pass therethrough while bringing the tip end portion S2A into contact therewith. Since the support wall portion 68A bends the tip end portion S2A of the second leg portion S2, the support wall portion 68A may be referred to as a tip end-bending portion.

However, in the case of using a staple having a tip end portion bent in the outward direction in advance, the binding machine may not include the support wall portion 68A.

Further, the binding machine 10 according to the present embodiment additionally includes a fulcrum 66A functioning as a bending fulcrum of the second leg portion S2. In the present embodiment, a front end of a second inner wall portion 66 functions as the fulcrum 66A. In addition, a distance from a portion of the second leg portion S2, which is in contact with the fulcrum 66A, to the tip end thereof corresponds to the second distance DS2.

(A) of FIG. 2 is a schematic diagram illustrating a state immediately after the start of the bending of the staple S in the top view. As illustrated in (A) of FIG. 2, the second displacement portion 30 starts rotating in the first rotation direction R1 by the slider 44 moving in the forward direction. Therefore, the second leg portion S2 of the staple S that is in contact with the second displacement portion 30 starts bending with the fulcrum 66A as a fulcrum. At the same time, the tip end portion S2A of the second leg portion S2 passes through the support wall portion 68A while being in contact with the support wall portion 68A. Accordingly, it is possible to bend the tip end portion S2A of the second leg portion S2 in the second rotation direction R2 corresponding to the outward direction of the staple S while bending the second leg portion S2 in the first rotation direction R1 corresponding to the inward direction of the staple S.

(B) and (C) of FIG. 2 are schematic diagrams respectively illustrating the states after the start of the bending of the staple S in the top view. As illustrated in (B) and (C) of FIG. 2, the second displacement portion 30 further rotates in the first rotation direction R1 by the slider 44 further moving in the forward direction. Therefore, the second displacement portion 30 further bends the second leg portion S2 in the first rotation direction R1 with the fulcrum 66A as a fulcrum.

(D) of FIG. 2 is a schematic diagram illustrating a state in which the second leg portion S2 of the staple S is bent and intersects the first leg portion S1 in the top view. In the present embodiment, since the second leg portion S2 is bent in the direction inclined toward the upward direction Z1 while being bent in the direction approaching the first leg portion S1, the second leg portion S2 does not intersect the first leg portion S1. As illustrated in (D) of FIG. 2, since the second displacement portion 30 further rotates in the first rotation direction R1 by the slider 44 further moving in the forward direction and rotates by 90 degrees or more, the second displacement portion 30 can bend the second leg portion S2 to the position at which the second leg portion S2 intersects the first leg portion S1 in the top view.

(E) of FIG. 2 is a schematic diagram illustrating a state in which the first leg portion S1 of the staple S is bent in the top view. As illustrated in (E) of FIG. 2, the contact member 24 of the first displacement portion 20 moves in the direction inclined toward the inward direction (the rightward direction Y1) and the rearward direction X2 by the slider 44 moving in the forward direction, and bends the tip end portion S1A of the first leg portion S1. As illustrated in (E) of FIG. 2, the tip end portion S1A may be folded in the upward direction Z1 or may be folded in the downward direction Z2 with respect to the first leg portion S1. By bending the tip end portion S1A of the first leg portion S1 in this manner, it is possible to sandwich the first object G with the first leg portion S1.

Further, in the present embodiment, by disposing the first displacement portion 20 and the second displacement portion 30 such that a timing at which the first displacement portion 20 comes into contact with the slider 44 and a timing at which the second displacement portion 30 comes into contact with the slider 44 are different, a timing at which the bending of the first leg portion S1 of the staple S starts and a timing at which the bending of the second leg portion S2 of the staple S starts are deviated. According to such a configuration, it is possible to restrain a large load from being simultaneously generated in the binding machine 10. In addition, by first starting the bending of the second leg portion S2 having a large bending amount, it is possible to restrain a large deviation between a timing at which the bending of the first leg portion S1 ends and a timing at which the bending of the second leg portion S2 ends.

First Embodiment

Hereinafter, the detailed configuration of the binding machine 10 according to a first embodiment will be described.

Figure 3:
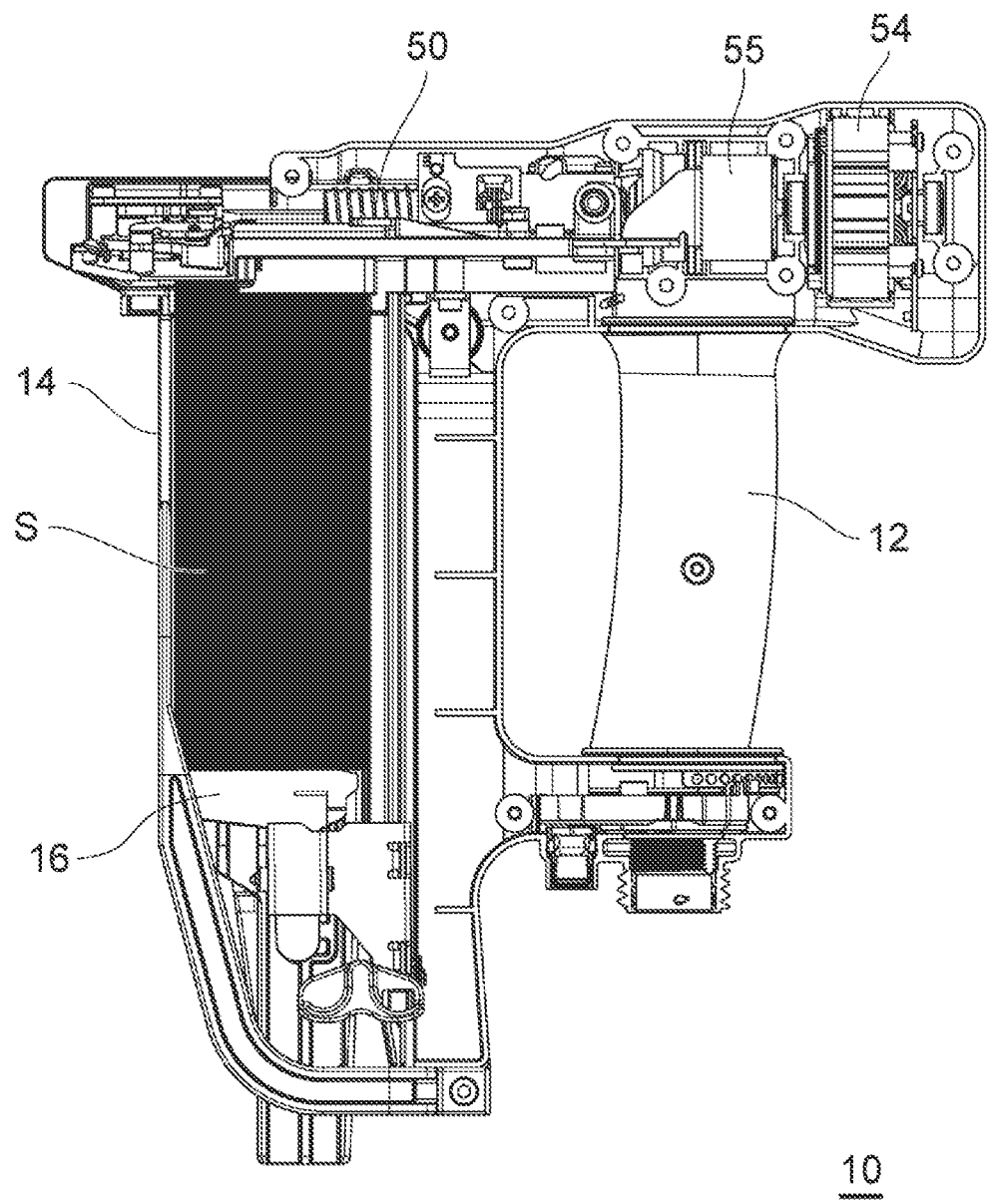
FIG. 3 is a cross-sectional view of the binding machine according to the embodiment in a right side view.
Figure 4A:
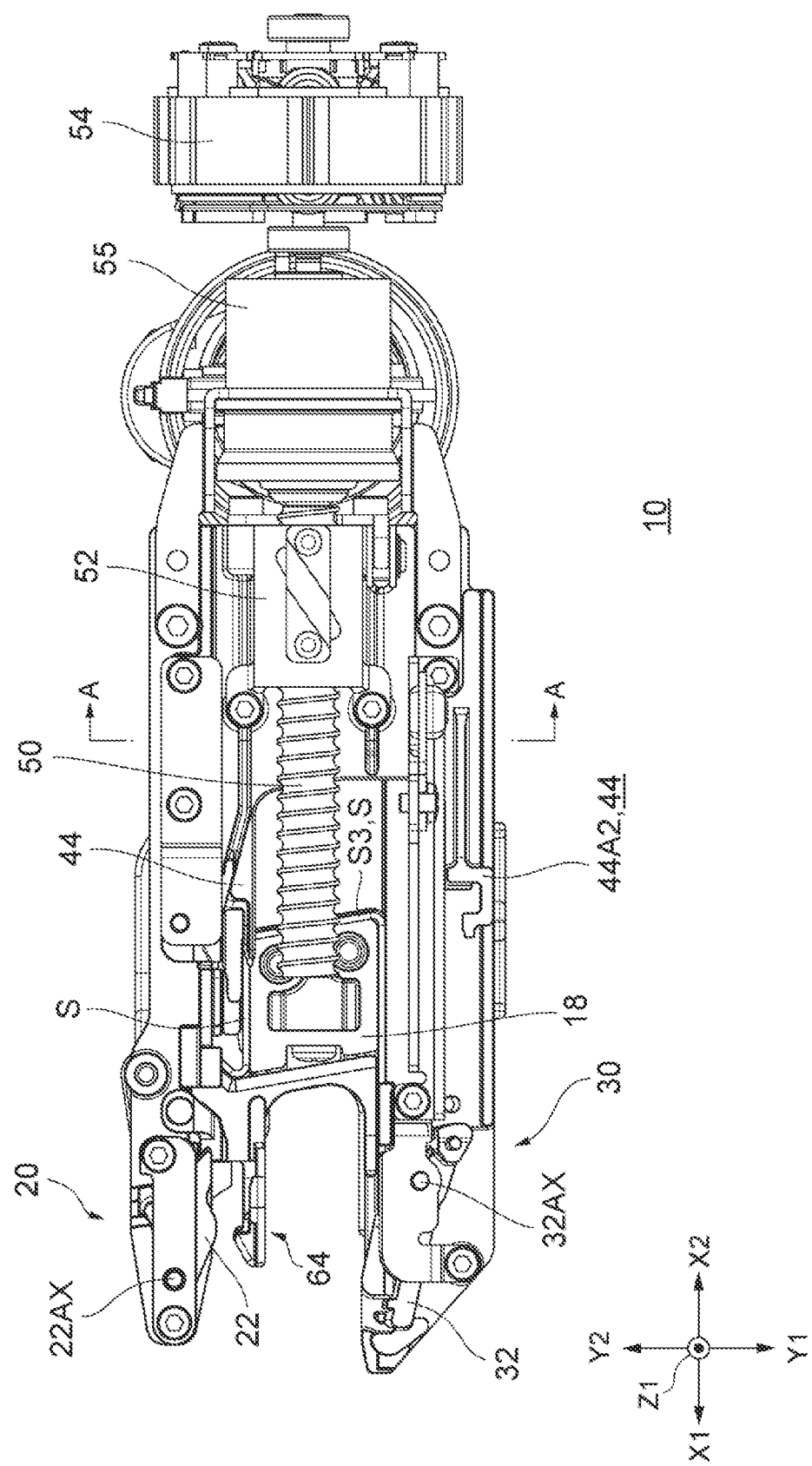
FIG. 4A is a cross-sectional view of the binding machine according to the embodiment in the top view.

FIG. 3 is a cross-sectional view of the binding machine 10 in a right side view. FIG. 4A is a cross-sectional view of the binding machine 10 in the top view (However, for the sake of convenience, FIG. 4A is rotated by 90 degrees. Hereinafter, the drawings may be rotated in the same manner for the sake of convenience. Further, configurations not described in order to make the description easier to understand (for example, a housing of the binding machine 10) are omitted (hereinafter, some configurations may be omitted in the drawings for the same reason)).

Figure 4B:
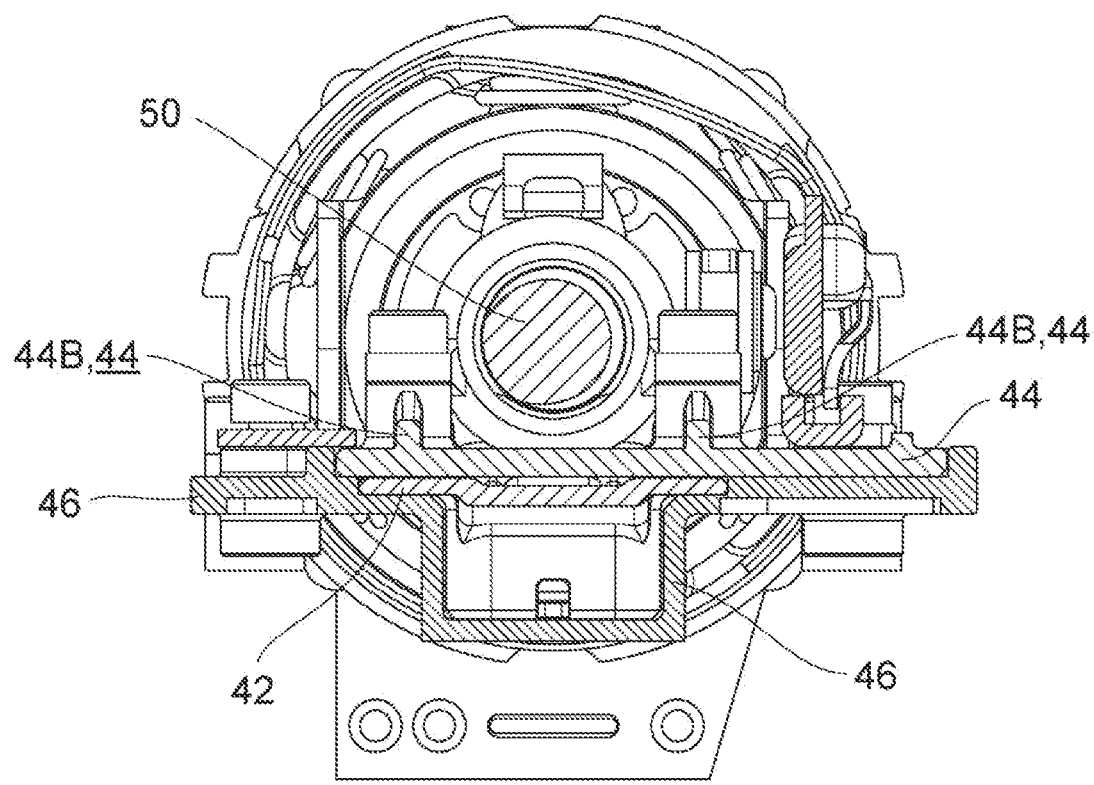
FIG. 4B is a cross-sectional view of the binding machine according to the embodiment in the front view.
Figure 4B:
Figure 5:
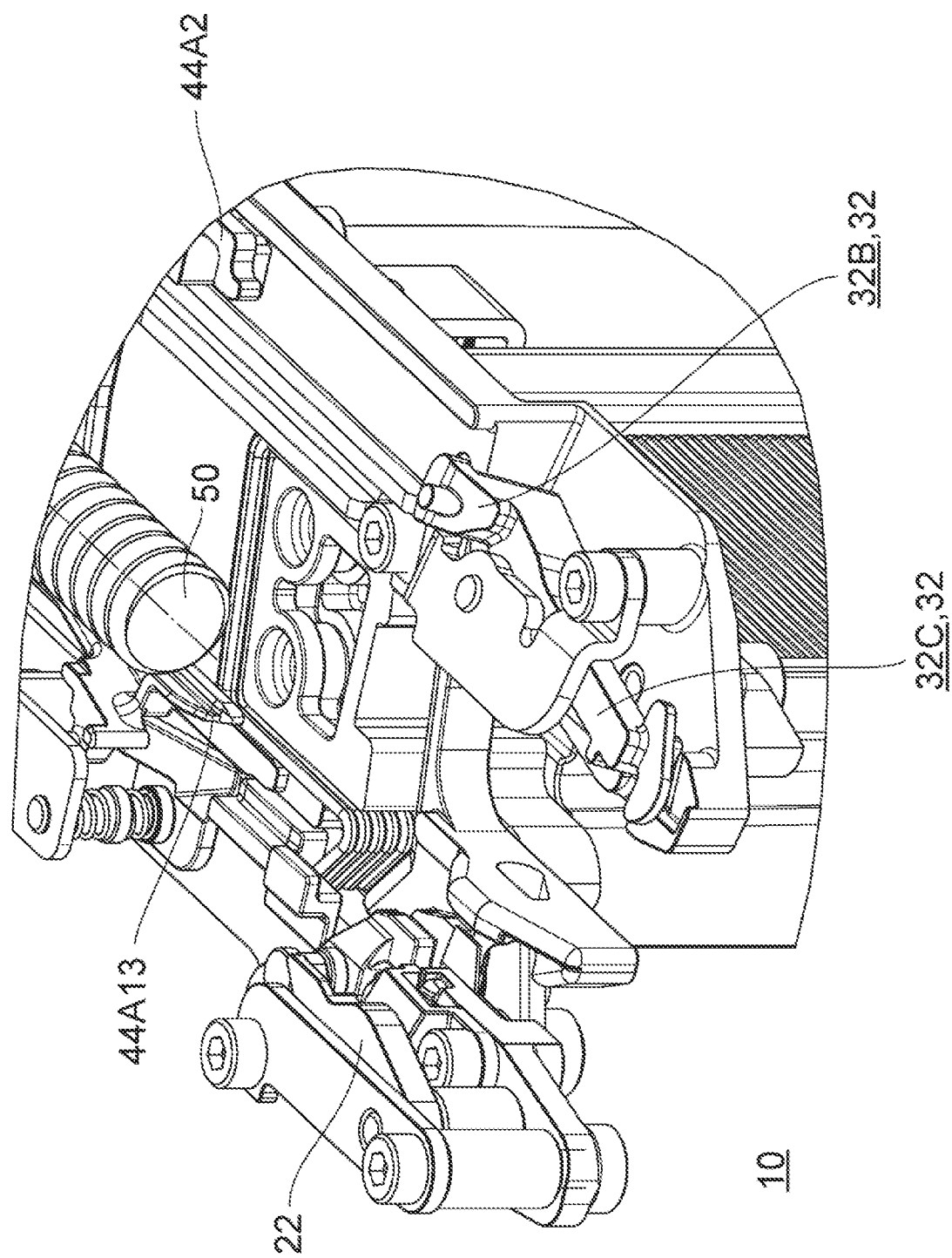
FIG. 5 is a partially enlarged view (a perspective view) illustrating a front-end side of the binding machine according to the embodiment.

FIG. 4B is a cross-sectional view of the binding machine 10 in the front view, which is obtained by cutting the binding machine 10 along an A-A cross section in FIG. 4A. FIG. 5 is an enlarged perspective view of a front end portion of the binding machine 10.

Schematic Configuration of Binding Machine 10

The binding machine 10 binds the first object G and the second object P by using the staple S having the formed opening. The configuration of the staple S (FIGS. 1A and 1B) according to the embodiment is described above.

The first object G is, for example, a wire, a beam, a string, a rod, a pipe, or a branch of a tree. The first object G may be referred to as a guide element. The second object P is, for example, a stem, a vine, a branch, or a fruit of a plant or a tree. The binding machine 10 restricts the movement of the second object P with respect to the first object G and binds the first object G and the second object P by displacing the first leg portion S1 of the staple S so as to engage with the first object G and displacing the second leg portion S2 thereof so as to engage with the first object G such that the staple S surrounds the second object P.

The binding machine 10 includes the first displacement portion 20 that displaces the first leg portion S1 of the staple S so as to be engageable with the first object G, and the second displacement portion 30 that displaces the second leg portion S2 of the staple S so as to be engageable with the first object G. The second displacement portion 30 can bind the first object G and the second object P by engaging the tip end portion S2A of the second leg portion S2 with the first object G in a state in which the second object P is surrounded by the first leg portion S1, the second leg portion S2, and the main body portion S3 of the staple S.

More specifically, the binding machine 10 includes a grip 12 extending in an up-down direction so as to be gripped by a user and provided with a switch for driving the binding machine 10, a magazine 14 (FIG. 3) that can accommodate a plurality of staples S stacked in the up-down direction, a pusher 16 that biases the plurality of staples S accommodated in the magazine 14 toward the upward direction Z1, a driver 42 that pushes the staple S positioned at an upper end toward the forward direction X1 to separate the staple S positioned at the upper end from another staple S and move the staple S in the forward direction X1, a movement mechanism for moving the driver 42 and the slider 44, the first displacement portion 20 for displacing the first leg portion S1 of the staple S by the slider 44, the second displacement portion 30 for displacing the second leg portion S2 of the staple S by the slider 44, and a detachment portion 56 that provides a movement path when the staple S is detached from the another staple S.

Here, the first displacement portion 20 includes a first outer wall portion 62 and a first inner wall portion 64 for displacing the tip end portion S1A by the tip end portion S1A of the first leg portion S1 passing through the first outer wall portion 62 and the first inner wall portion 64 while being in contact therewith when the staple S moves in the forward direction X1 by the driver 42.

Further, the first displacement portion 20 includes a first arm 22 that rotates by being pushed by a first front end portion 44A1 of the slider 44 moving in the forward direction X1, and the contact member 24 that bends the tip end portion S1A of the first leg portion S1 by moving toward the inward direction of the staple S while being in contact with the tip end portion S1A of the first leg portion S1 as the first arm 22 rotates. The contact member 24 may be referred to as a claw member.

The second displacement portion 30 includes the second arm 32 that rotates by being pushed by the second front end portion 44A2 of the slider 44 moving in the forward direction X1. The second arm 32 can bend the second leg portion S2 by rotating while being in contact with the second leg portion S2 of the staple S. At this time, as described above, since the second object P is surrounded by the first leg portion S1, the second leg portion S2, and the main body portion S3 of the staple S, and the second leg portion S2 is engaged with the first object G, it is possible to bind the first object G and the second object P.

The binding machine 10 according to the present embodiment respectively displaces the first leg portion S1 and the second leg portion S2 of the staple S by moving the parts such as the slider 44 in a translational motion toward the forward direction X1 and pushing the first arm 22 and the second arm 32 by the parts in the translational motion to convert the translational motion into a rotational motion. However, a means for displacing the first leg portion S1 or the second leg portion S2 is not limited thereto. For example, as the means for displacing the first leg portion S1, a means for displacing the tip end portion S1A in an arc shape when the tip end portion S1A of the first leg portion S1 advances by the driver 42 or the slider 44 may be mounted. In addition, another means for converting the translational motion into the rotational motion may be adopted as a configuration for converting the translational motion into the rotational motion. Further, in the present embodiment, the first arm 22 and the second arm 32 are rotated together in the same direction in the top view to displace the first leg portion S1 and the second leg portion S2, but the present disclosure is not limited thereto, for example, the second arm 32 may rotate in the opposite direction to displace the second leg portion S2.

Hereinafter, the detailed configuration of the binding machine 10 according to the present embodiment will be described.

Movement Mechanism (Feeding Mechanism) of Driver and Slider

The driver 42 of the binding machine 10 has a function of moving in the forward direction X1 to move the staple S in the forward direction X1. The driver 42 moves the staple S positioned at the upper end, which is connected to the another staple S, toward the forward direction X1 so as to separate the staple S from the another staple S, and further displaces the tip end portion S1A of the first leg portion S1 by moving the staple S toward the forward direction X1 and causing the tip end portion S1A of the first leg portion S1 to pass through the first outer wall portion 62 provided in the first displacement portion 20 while being in contact therewith.

Figure 6A:
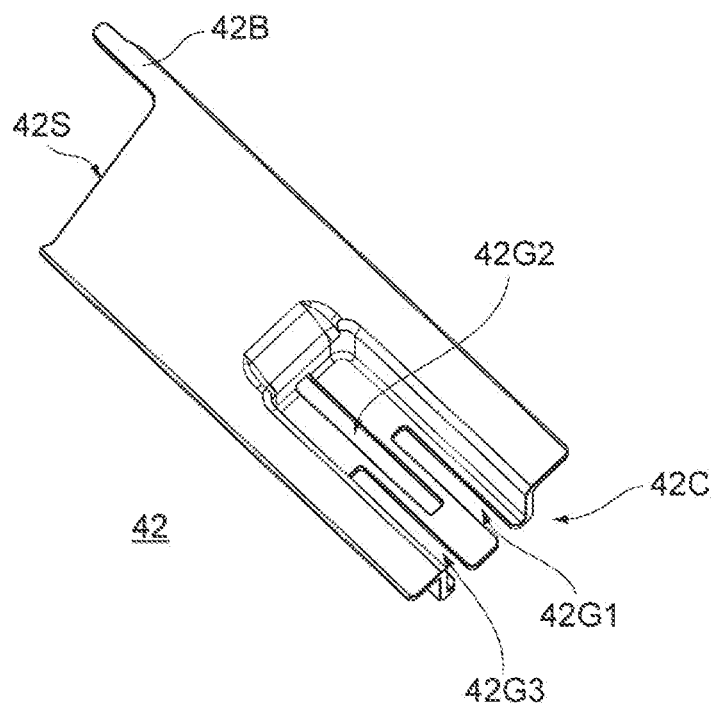
FIG. 6A is a perspective view of a driver according to the embodiment.
Figure 6B:
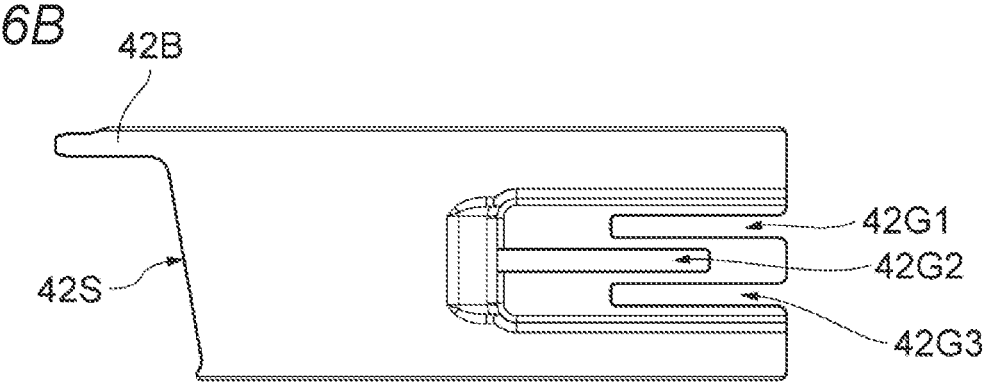
FIG. 6B is a plan view of the driver according to the embodiment in the top view.
Figure 6B:
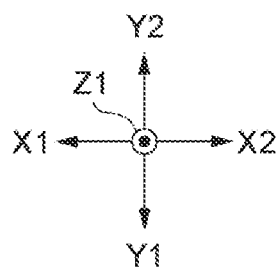

FIG. 6A is a perspective view of the driver 42 according to the present embodiment, and FIG. 6B is a plan view of the driver 42 in the top view. As illustrated in FIGS. 6A and 6B, the driver 42 is formed in a plate shape, and includes a front end portion having a front end surface 42S in contact with the main body portion S3 of the staple S and a rear end portion provided in the rearward direction X2 with respect to the front end portion and having a protruded portion 42C for driver protruding in the downward direction Z2.

The front end portion of the driver 42 includes the front end surface 42S that conforms to the shape of the main body portion S3 of the staple S and is provided to be inclined with respect to a front-rear direction.

Further, a left end of the front end portion of the driver 42 has a protruding end portion 42B extending in the forward direction X1 so as to have a wall surface extending in the forward direction X1 in order to support the first leg portion S1 by coming into contact with the first portion S1B of the first leg portion S1 corresponding to a left end of the staple S and with a portion of the main body portion S3 connected to the first leg portion S1 from the leftward direction Y2 which is the outward direction.

Figure 8A:
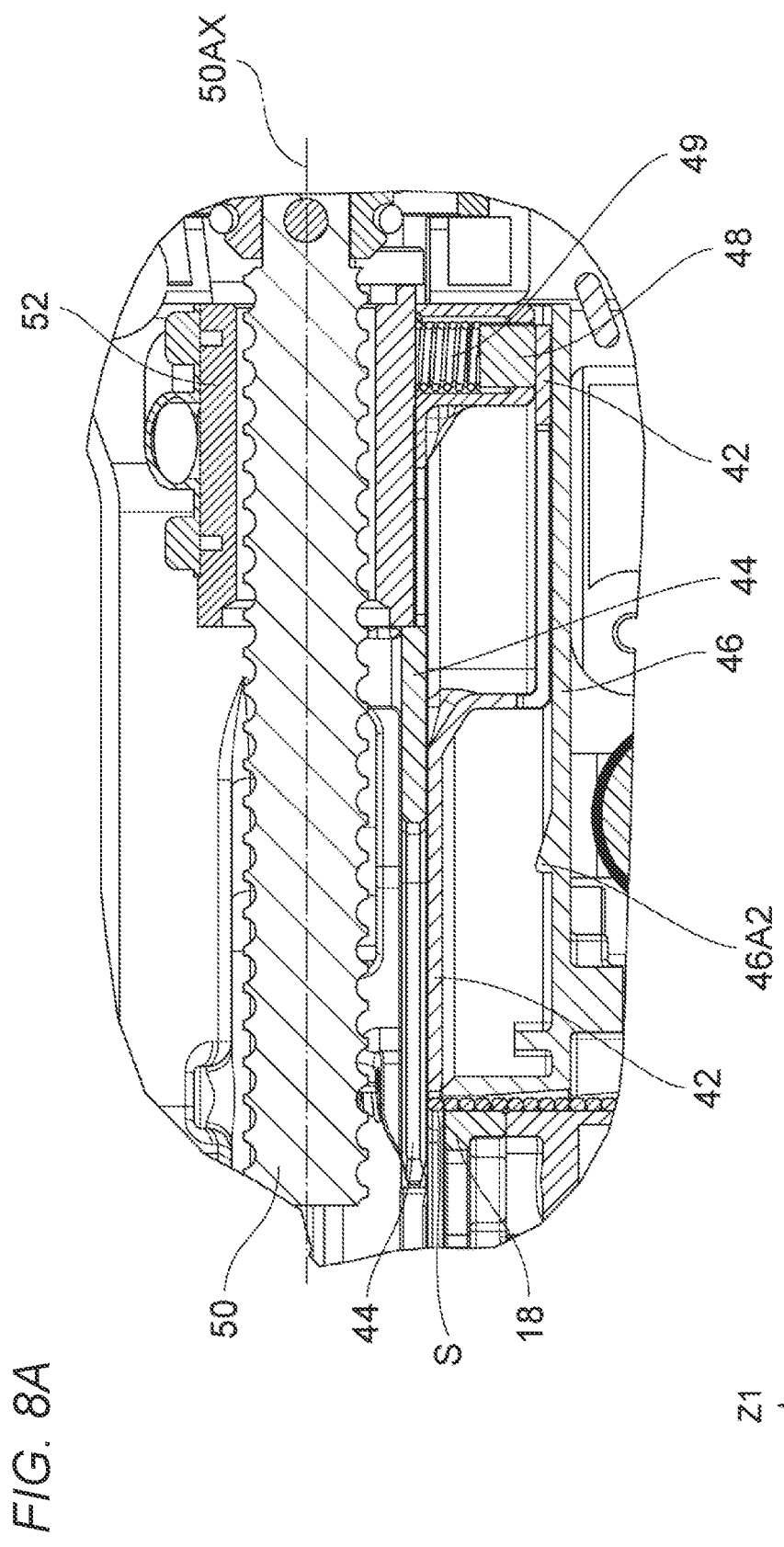
FIG. 8A is a partially enlarged view of a cross section of the binding machine according to the embodiment in a side view.
Figure 8B:
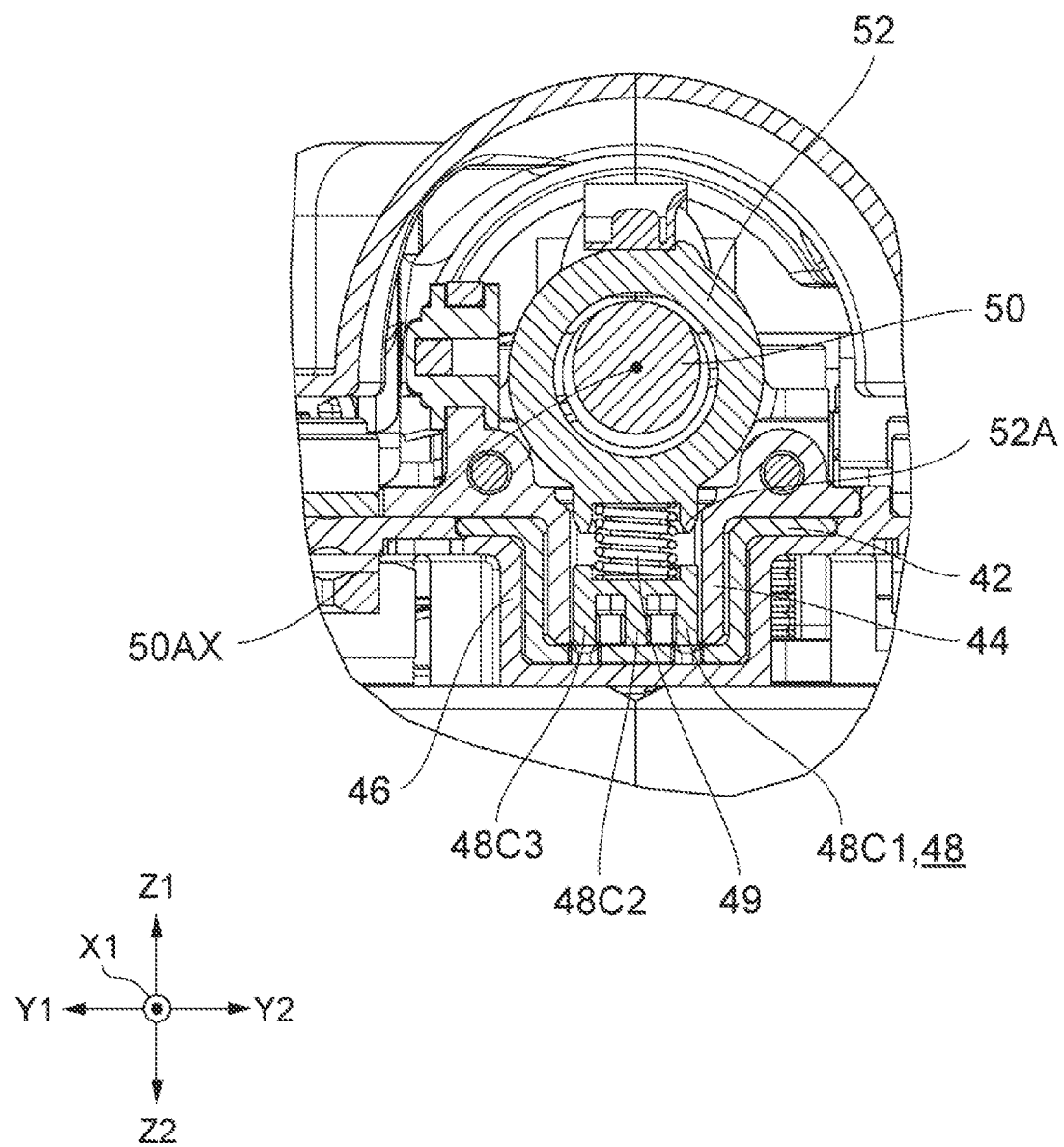
FIG. 8B is a partially enlarged view of a cross section of the binding machine according to the embodiment in a rear view.

As illustrated in FIGS. 4B and 8B, the driver 42 is guided to move in the front-rear direction by being fitted into a recessed portion provided in a base 46. Since an upper surface of the driver 42 is in contact with a bottom surface of the slider 44 fitted into the recessed portion provided in the base 46, the movement of the driver 42 toward the upward direction Z1 is restricted. In addition, since left and right side surfaces of the driver 42 are respectively in contact with left and right wall surfaces of the base 46 provided to extend in the front-rear direction, the leftward and rightward movement of the driver 42 is restricted. Further, the protruded portion 42C for driver formed at the rear end portion of the driver 42 and protruding in the downward direction Z2 is inserted into the recessed portion of the base 46. Left and right wall surfaces and a bottom surface of the protruded portion 42C for driver respectively face the wall surfaces and an upper surface of the base 46. According to the above configuration, the driver 42 is guided to move in the front-rear direction.

Three grooves are formed in a bottom portion of the protruded portion 42C for driver protruding toward the downward direction Z2. Specifically, a first groove 42G1 for moving toward the forward direction X1 by being pushed toward the forward direction X1 by a first claw portion 48C1 of a switching block 48 (an example of a "block") to be described later, a second groove 42G2 for moving toward the rearward direction X2 by being pushed toward the rearward direction X2 by a second claw portion 48C2, and a third groove 42G3 for moving toward the forward direction X1 by being pushed toward the forward direction X1 by a third claw portion 48C3 are formed. As illustrated in FIGS. 4B and 8B, the first groove 42G1, the second groove 42G2, and the third groove 42G3 are provided to be parallel to one another and extend in the front-rear direction. In addition, front ends of the first groove 42G1 and the third groove 42G3 (groove side surfaces of the first groove 42G1 and the third groove 42G3 facing the rearward direction X2) are provided at the same position in the front-rear direction. In addition, a rear end of the second groove 42G2 (a groove side surface of the second groove 42G2 facing the forward direction X1) is provided in the rearward direction X2 with respect to the front ends of the first groove 42G1 and the third groove 42G3 (the groove side surfaces of the first groove 42G1 and the third groove 42G3 facing the rearward direction X2). On the other hand, the first groove 42G1 and the third groove 42G3 are provided to extend in the rearward direction X2 with respect to the rear end of the second groove 42G2.

As will be described later, a configuration is adopted in which the driver 42 is advanced by using two grooves, that is, the first groove 42G1 and the third groove 42G3 at the time of advance, the driver 42 is retracted by using one groove, that is, the second groove 42G2 at the time of retraction, and thus the driver 42 can suitably move in the forward direction X1 at the time of advance having a relatively high load. Further, in the top view, the second groove 42G2 is provided to overlap with a central axis of a ball screw 50, and the first groove 42G1 and the third groove 42G3 are provided to sandwich the second groove 42G2, and thus the driver 42 can advance and retract in a well-balanced manner.

The driver 42 is placed on the base 46 of the binding machine 10 and can move in the front-rear direction on the base 46. Therefore, a part of the upper surface of the base 46 is exposed in the upward direction Z1 by forming the first groove 42G1, the second groove 42G2, and the third groove 42G3.

The slider 44 of the binding machine 10 has a function of moving in the forward direction X1 and pushing the first displacement portion 20 and the second displacement portion 30 toward the forward direction X1 so as to displace the first leg portion S1 and the second leg portion S2 of the staple S, respectively. The slider 44 according to the present embodiment includes the first front end portion 44A1 that pushes the first arm 22 of the first displacement portion 20 toward the forward direction X1 to rotate the first arm 22, and the second front end portion 44A2 that pushes the second arm 32 of the second displacement portion 30 toward the forward direction X1 to rotate the second arm 32.

Figure 7A:
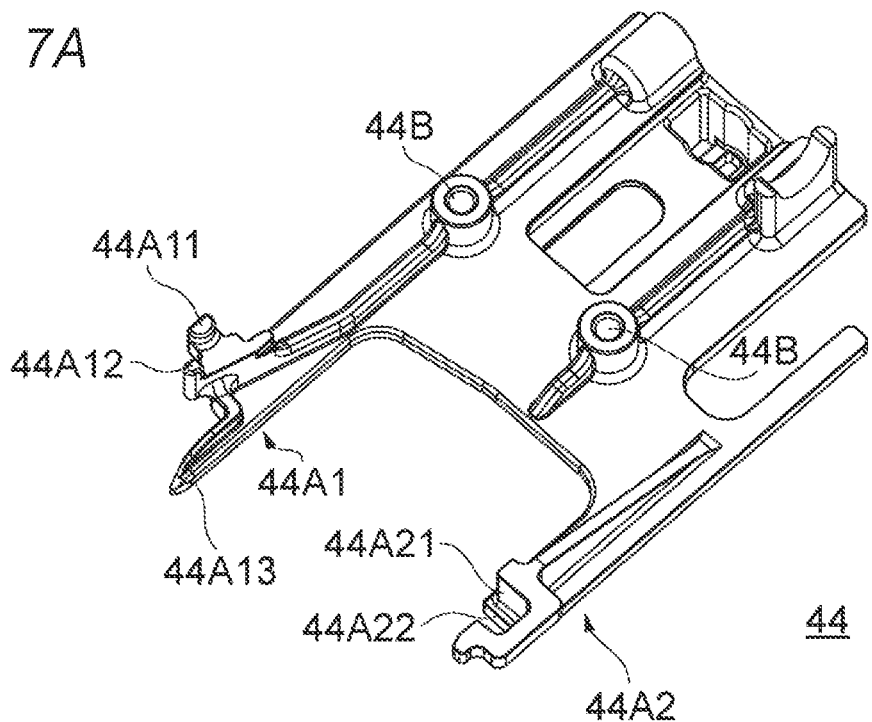
FIG. 7A is a perspective view of a slider according to the embodiment.
Figure 7B:
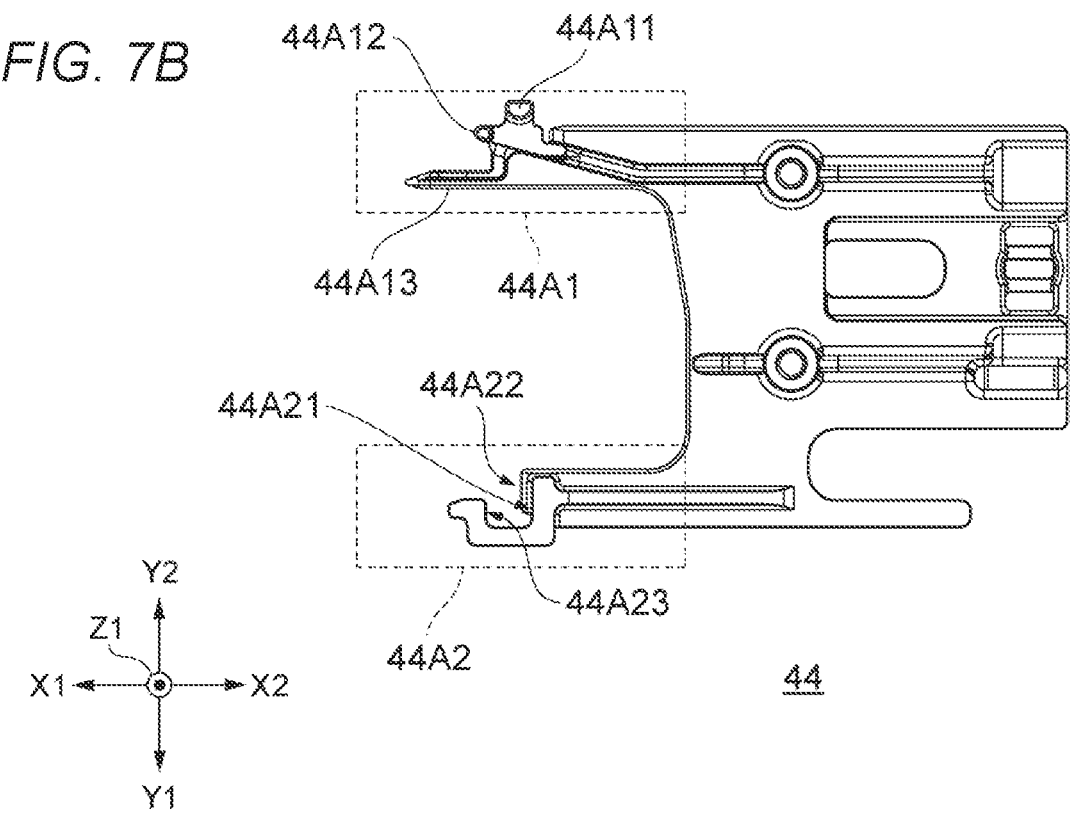
FIG. 7B is a plan view of the slider according to the embodiment in the top view.

FIG. 7A is a perspective view of the slider 44 according to the present embodiment, and FIG. 7B is a plan view of the slider 44 in the top view. As illustrated in FIGS. 7A and 7B, the slider 44 is formed in a plate shape, and includes the first front end portion 44A1 that extends in the forward direction X1 on a left side on which the first leg portion S1 of the staple S is disposed, and the second front end portion 44A2 that is separated from the first front end portion 44A1 and extends in the forward direction X1 on a side on which the second leg portion S2 of the staple S is disposed.

The slider 44 further includes fixing portions 44B for being fixed to a nut part 52 to be described later by using bolts.

As illustrated in FIG. 4B, the slider 44 is guided to move in the front-rear direction by being fitted into the recessed portion provided in the base 46. An upper surface of the slider 44 comes into contact with the base 46 or a guide fixed to the housing so as to restrict the movement toward the upward direction Z1. Further, left and right side surfaces of the slider 44 come into contact with the left and right wall surfaces of the base 46 provided to extend in the front-rear direction so as to restrict the leftward and rightward movement. Further, the bottom surface of the slider 44 is supported by the upper surface of the base 46 and the upper surface of the driver 42. According to such a configuration, the slider 44 (and the driver 42 on which the slider 44 is stacked) is guided to move in the front-rear direction.

Configurations of the first front end portion 44A1 and the second front end portion 44A2 of the slider 44 will be described later.

The nut part 52 of the binding machine 10 (for example, FIGS. 4A, 8A, and 8B) has a function of moving the driver 42 and the slider 44 in the forward direction X1 and the rearward direction X2. The nut part 52 according to the present embodiment is formed with a female screw that is screwed to a male screw of the ball screw 50 via a ball member (not shown). Therefore, the nut part 52 moves in the forward direction X1 when the ball screw 50 rotates clockwise, and the nut part 52 moves in the rearward direction X2 when the ball screw 50 rotates counterclockwise. The nut part 52 is fixed to the slider 44. Further, as illustrated in FIG. 8A, a front end surface of the nut part 52 is in contact with a rear end surface of the slider 44. Therefore, the nut part 52 and the slider 44 can integrally move in the forward direction X1 and the rearward direction X2 in a state in which a rotational moment is restrained.

Further, the nut part 52 includes an annular holding portion 52A protruding in the downward direction Z2 in order to hold the switching block 48 (FIG. 8B) provided with the first claw portion 48C1, the second claw portion 48C2, and the third claw portion 48C3. The nut part 52 and the switching block 48 held by the nut part 52 can integrally move in the forward direction X1 and the rearward direction X2. The holding portion 52A holds the switching block 48 such that the first claw portion 48C1 can be inserted into the first groove 42G1, the second claw portion 48C2 can be inserted into the second groove 42G2, and the third claw portion 48C3 can be inserted into the third groove 42G3.

The nut part 52, the slider 44, and the driver 42 can move in the forward direction X1 and the rearward direction X2, and thus the nut part 52, the slider 44, and the driver 42 may be referred to as movement portions.

Figure 9:
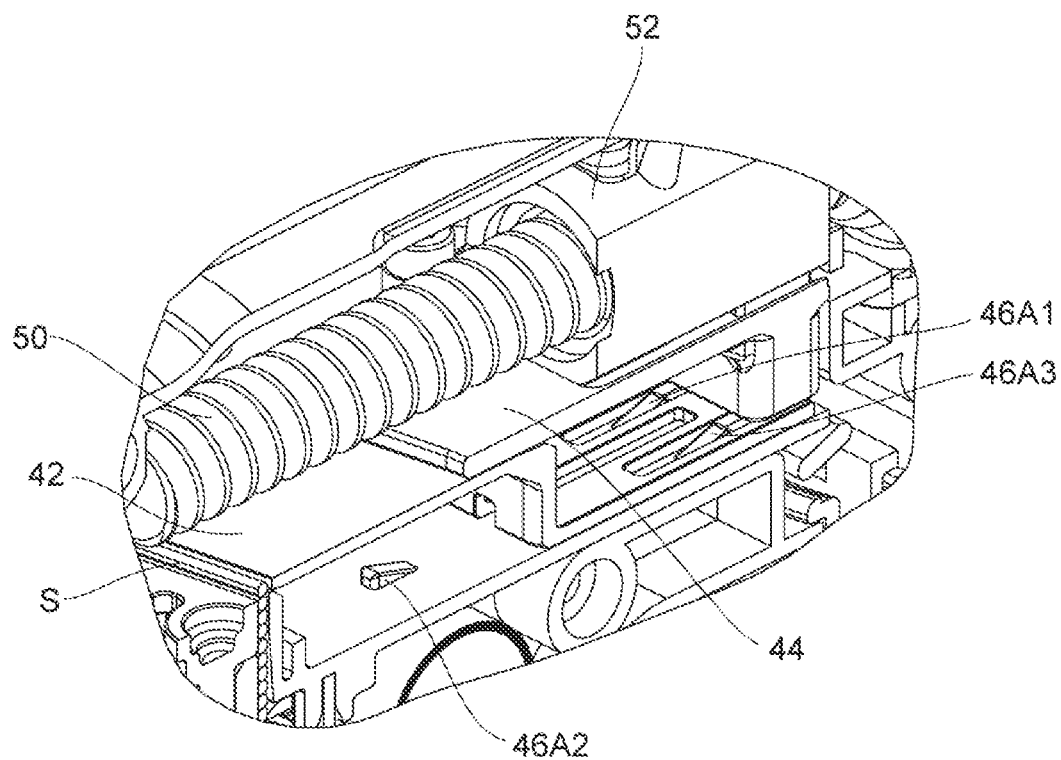
FIG. 9 is a partially enlarged view (a perspective cross-sectional view) illustrating a nut part and the like of the binding machine according to the embodiment.

FIG. 8A is a partially enlarged view obtained by cutting the binding machine 10 along a vertical cross section including the central axis 50AX of the ball screw 50 in a side view obtained by viewing the binding machine 10 from a side surface. FIG. 8B is a partially enlarged view obtained by cutting the binding machine 10 along a vertical cross section perpendicular to the central axis 50AX of the ball screw 50 in a rear view obtained by viewing the binding machine 10 from the rearward direction X2. FIG. 9 is a partially enlarged view illustrating the nut part 52 and the like in a perspective cross-sectional view of the binding machine 10.

As illustrated in FIG. 8B, an elastic member 49 for generating an elastic force for pressing a bottom surface of the switching block 48 against the surface of the base 46 is inserted between the nut part 52 and the switching block 48. Accordingly, the switching block 48 can move in the up-down direction, and a distance in the up-down direction between the nut part 52 and the switching block 48 varies according to a surface shape of the base 46 through which the switching block 48 passes.

In the present embodiment, the nut part 52 can move in the forward direction X1 and the rearward direction X2 by a motor 54 and the ball screw 50.

The motor 54 (FIG. 4A) rotates the ball screw 50. The motor 54 is provided at a rear end portion of the binding machine 10. The binding machine 10 may include a battery that is detachably provided, and the motor 54 may be rotationally driven by a power source of the battery. The binding machine 10 according to the present embodiment further includes a speed reducer 55, and the motor 54 increases a torque by the speed reducer 55 to rotate the ball screw 50. In addition, a printed wiring board on which a CPU corresponding to a control device for controlling the motor 54 is mounted, is mounted on the rear end portion of the binding machine 10.

The ball screw 50 (FIGS. 4A, 8A, and 8B) is provided by extending a substantially central portion of the binding machine 10 in the front-rear direction. As described above, the ball screw 50 is formed with the male screw that is screwed to the female screw of the nut part 52 via the ball member (not shown). For example, a total of a length of the driver 42 and an extension amount of the ball screw 50 in the forward direction X1 from a position of a rear end of the staple S held in the magazine 14, is equal to or larger than a half of a total length of the staple S.

The base 46 (FIGS. 4B, 8A, and 8B) supports the driver 42 and the slider 44. As illustrated in FIG. 4B, the base 46 includes a support surface that comes into contact with or faces the bottom surface of the driver 42 so as to support the driver 42 from the downward direction Z2, and a wall portion extending in the front-rear direction in order to come into contact with or face the left side surface of the driver 42 so as to support the driver 42 from the leftward direction Y2. Further, the base 46 includes a wall portion extending in the front-rear direction in order to come into contact with or face a right end of the driver 42 so as to support the driver 42 from the rightward direction Y1. According to such a configuration, the base 46 guides the driver 42 to move in the front-rear direction.

Further, the base 46 includes a support surface that comes into contact with or faces the bottom surface of the slider 44 placed on the driver 42 so as to support the slider 44 from the downward direction Z2, and a wall portion extending in the front-rear direction in order to come into contact with or face a left end of the slider 44 so as to support the slider 44 from the leftward direction Y2. Further, the base 46 includes a wall portion extending in the front-rear direction in order to come into contact with or face a right end of the slider 44 so as to support the slider 44 from the rightward direction Y1. According to such a configuration, the base 46 guides the slider 44 to move in the front-rear direction.

As illustrated in FIG. 9, the base 46 is formed with a first protrusion 46A1 provided with a taper that protrudes in the upward direction Z1 as advancing in the rearward direction X2, a second protrusion 46A2 provided with a taper that protrudes in the upward direction Z1 as advancing in the forward direction X1, and a third protrusion 46A3 provided with a taper that protrudes in the upward direction Z1 as advancing in the rearward direction X2.

The first protrusion 46A1 is provided on a path of the first claw portion 48C1 (inside the first groove 42G1) when the driver 42 moves in the rearward direction X2.

The second protrusion 46A2 is provided on a path of the second claw portion 48C2 (inside the second groove 42G2) when the driver 42 moves in the forward direction X1.

The third protrusion 46A3 is provided on a path of the third claw portion 48C3 (inside the third groove 42G3) when the driver 42 moves in the rearward direction X2.

Each of the first protrusion 46A1 to the third protrusion 46A3 is preferably formed to have the same height as the driver 42 (a plate thickness of the driver 42) or be higher than the driver 42.

The first protrusion 46A1 and the third protrusion 46A3 are provided at the same position in the front-rear direction. The second protrusion 46A2 is provided in the forward direction X1 with respect to the first protrusion 46A1 and the third protrusion 46A3.

According to the above configuration, when the motor 54 rotates the ball screw 50 clockwise, the nut part 52, the slider 44 fixed to the nut part 52, and the switching block 48 held by the nut part 52 move together in the forward direction X1. Further, since the first claw portion 48C1, the second claw portion 48C2, and the third claw portion 48C3 of the switching block 48 are respectively inserted into the first groove 42G1, the second groove 42G2, and the third groove 42G3, a front surface of the first claw portion 48C1 and a front surface of the third claw portion 48C3 respectively come into contact with a side surface of the first groove 42G1 facing the rearward direction X2 and a side surface of the third groove 42G3 facing the rearward direction X2. Therefore, the switching block 48 pressed against the surface of the base 46 by the elastic member 49 moves the driver 42 in the forward direction X1 by the front surface of the first claw portion 48C1 and the front surface of the third claw portion 48C3 while pressing the surface of the base 46 in the downward direction Z2. As a result, the driver 42 and the slider 44 move together in the forward direction X1. A moving operation in which the driver 42 and the slider 44 move together in the forward direction X1 is referred to as a first moving operation.

Thereafter, when the switching block 48 advances to a position at which the second protrusion 46A2 is provided, the second claw portion 48C2 moves in the upward direction Z1 along an inclined surface of the second protrusion 46A2. Therefore, the switching block 48 moves in the upward direction Z1 while moving in the forward direction X1. As a result, the front surface of the first claw portion 48C1 and the front surface of the third claw portion 48C3 move in the upward direction Z1 with respect to the side surface of the first groove 42G1 and the side surface of the third groove 42G3 that are in contact with the front surface of the first claw portion 48C1 and the front surface of the third claw portion 48C3, respectively. Accordingly, the switching block 48 moves on the driver 42, and the driver 42 stops moving in the forward direction X1. At this time, the first moving operation ends.

After the first moving operation ends, when the motor 54 further rotates the ball screw 50 clockwise, the switching block 48 moves on the driver 42 in the forward direction X1. At this time, of the slider 44 and the driver 42, only the slider 44 moves in the forward direction X1. A moving operation in which only the slider 44 of the driver 42 and the slider 44 moves in the forward direction X1 is referred to as a second moving operation. When the slider 44 advances by a predetermined amount with respect to the driver 42, the motor 54 stops the clockwise rotation of the ball screw 50. At this time, the second moving operation ends.

During the second moving operation, there is a possibility that the driver 42 advances by the friction with the switching block 48 and the driver 42. Therefore, the binding machine 10 may include a stopper for stopping the advance of the driver 42 during the second moving operation. For example, by adopting a configuration in which an opening hole is formed on the base 46, the stopper such as a ball biased in the upward direction Z1 from the opening hole is exposed, and on the other hand, a recess into which the ball is inserted is provided on the bottom surface of the driver 42, and the stopper and the recessed portion are engaged with each other at a position at which the first moving operation ends and the movement of the driver 42 toward the forward direction X1 is to be stopped, it is possible to restrain the advance and the retraction of the driver 42 during the second moving operation.

As will be described later, in the first moving operation, by pushing the staple S positioned at the upper end in the forward direction X1 by using the driver 42 moving in the forward direction X1, it is possible to move the staple S positioned at the upper end in the forward direction X1 and separate the staple S from the another staple S. Further, in the first moving operation, by bringing the tip end portion S1A of the first leg portion S1 into contact with the first outer wall portion 62 while moving the staple S positioned at the upper end in the forward direction X1 by using the driver 42 moving in the forward direction X1, it is possible to displace (plastically deform) the first leg portion S1 such that the bending angle α1 formed by the tip end portion S1A of the first leg portion S1 and the first portion S1B of the first leg portion S1 is further reduced.

Further, in the second moving operation, the driver 42 stops the movement toward the forward direction X1, and thus the staple S pushed by the driver 42 also stops the movement toward the forward direction X1. Accordingly, in a state in which the staple S is stopped, by causing the slider 44 to advance in the second moving operation, it is possible to push the second arm 32 of the second displacement portion 30 in the forward direction X1 by the second front end portion 44A2 of the slider 44 so as to rotate, and displace the second leg portion S2 of the staple S so as to be surrounded by the first leg portion S1, the second leg portion S2, and the main body portion S3 and be engaged with the first object G. Further, in the state in which the staple S is stopped, by rotating the first arm 22 of the first displacement portion 20 by the first front end portion 44A1 of the slider 44, it is possible to displace the first leg portion S1 of the staple S so as to be engaged with the first object G.

The binding machine 10 may further include a sensor other than a Hall sensor for obtaining a rotation amount of the motor 54 in order to control movement amounts of the driver 42 and the slider 44. In addition, the binding machine 10 may further include a magnet attached to the nut part 52 in order to detect and control a position of the nut part 52 in the front-rear direction, and a sensor other than a Hall sensor for obtaining a position of the magnet attached to the nut part 52.

After a binding operation ends, when the motor 54 rotates the ball screw 50 counterclockwise, the nut part 52, the slider 44 fixed to the nut part 52, and the switching block 48 held by the nut part 52 move together in the rearward direction X2. At this time, the switching block 48 moves on the stopped driver 42 in the rearward direction X2.

Further, when the motor 54 rotates the ball screw 50 counterclockwise, the second claw portion 48C2 of the switching block 48 moves in the downward direction Z2 while moving in the rearward direction X2 along the inclined surface of the second protrusion 46A2 provided on the base 46, and thus the first claw portion 48C1, the second claw portion 48C2, and the third claw portion 48C3 of the switching block 48 are respectively inserted into regions inside the first groove 42G1, the second groove 42G2, and the third groove 42G3. In addition, when the motor 54 rotates the ball screw 50 counterclockwise, the switching block 48 moves in the rearward direction X2, and a rear surface of the second claw portion 48C2 of the switching block 48 comes into contact with a side surface of the second groove 42G2 facing the forward direction X1. Therefore, the switching block 48 moves the driver 42 in the rearward direction X2 by the rear surface of the second claw portion 48C2 while pressing the surface of the base 46 in the downward direction Z2 by the elastic member 49. At this time, the nut part 52, the slider 44, the switching block 48, and the driver 42 move together in the rearward direction X2.

Further, when the motor 54 rotates the ball screw 50 counterclockwise and the switching block 48 retracts to the position at which the first protrusion 46A1 and the third protrusion 46A3 are provided, the first claw portion 48C1 and the third claw portion 48C3 of the switching block 48 respectively move in the upward direction Z1 along inclined surfaces of the first protrusion 46A1 and the third protrusion 46A3. Therefore, the switching block 48 moves in the upward direction Z1 while moving in the rearward direction X2. As a result, the rear surface of the second claw portion 48C2 moves in the upward direction Z1 with respect to the side surface of the second groove 42G2 that is in contact with the rear surface of the second claw portion 48C2. Accordingly, the switching block 48 moves on the driver 42, and the driver 42 stops moving in the rearward direction X2. In order to restrict the movement of the driver 42 toward the rearward direction X2, the binding machine 10 may include a stopper having the above configuration or other configurations.

Thereafter, when the motor 54 further rotates the ball screw 50 counterclockwise, the switching block 48 moves on the driver 42 in the rearward direction X2. At this time, of the driver 42 and the slider 44, only the slider 44 moves in the rearward direction X2. When the slider 44 retracts by a predetermined amount with respect to the driver 42, the motor 54 stops the counterclockwise rotation of the ball screw 50.

Thereafter, when the motor 54 rotates the ball screw 50 clockwise, the nut part 52, the slider 44 fixed to the nut part 52, and the switching block 48 held by the nut part 52 move together in the forward direction X1. Since the nut part 52, the slider 44, and the switching block 48 are moved together in the forward direction X1 to a position at which the first claw portion 48C1 and the third claw portion 48C3 of the switching block 48 respectively come into contact with or approach close to a side surface of the front end of the first groove 42G1 and a side surface of the front end of the third groove 42G3, and thereafter, it is possible to shift to the first moving operation.

According to the above configuration, the binding machine 10 can execute the first moving operation in which the driver 42 and the slider 44 advance together, and the second moving operation in which only the slider 44 of the driver 42 and the slider 44 further moves in the forward direction X1.

A position of the nut part 52 in an initial state is not limited. For example, the binding machine 10 may have a configuration in which only the slider 44 moves in the forward direction immediately after startup from the initial state, and then the first moving operation in which the driver 42 and the slider 44 start moving is executed.

Feeding-Bending Mechanism of Detachment Portion

The detachment portion includes a support wall that supports the staple S in the movement path of the staple S separated by the driver 42 and moving in the forward direction X1 and during the displacement by the first displacement portion 20 and the second displacement portion 30.

Figure 10:
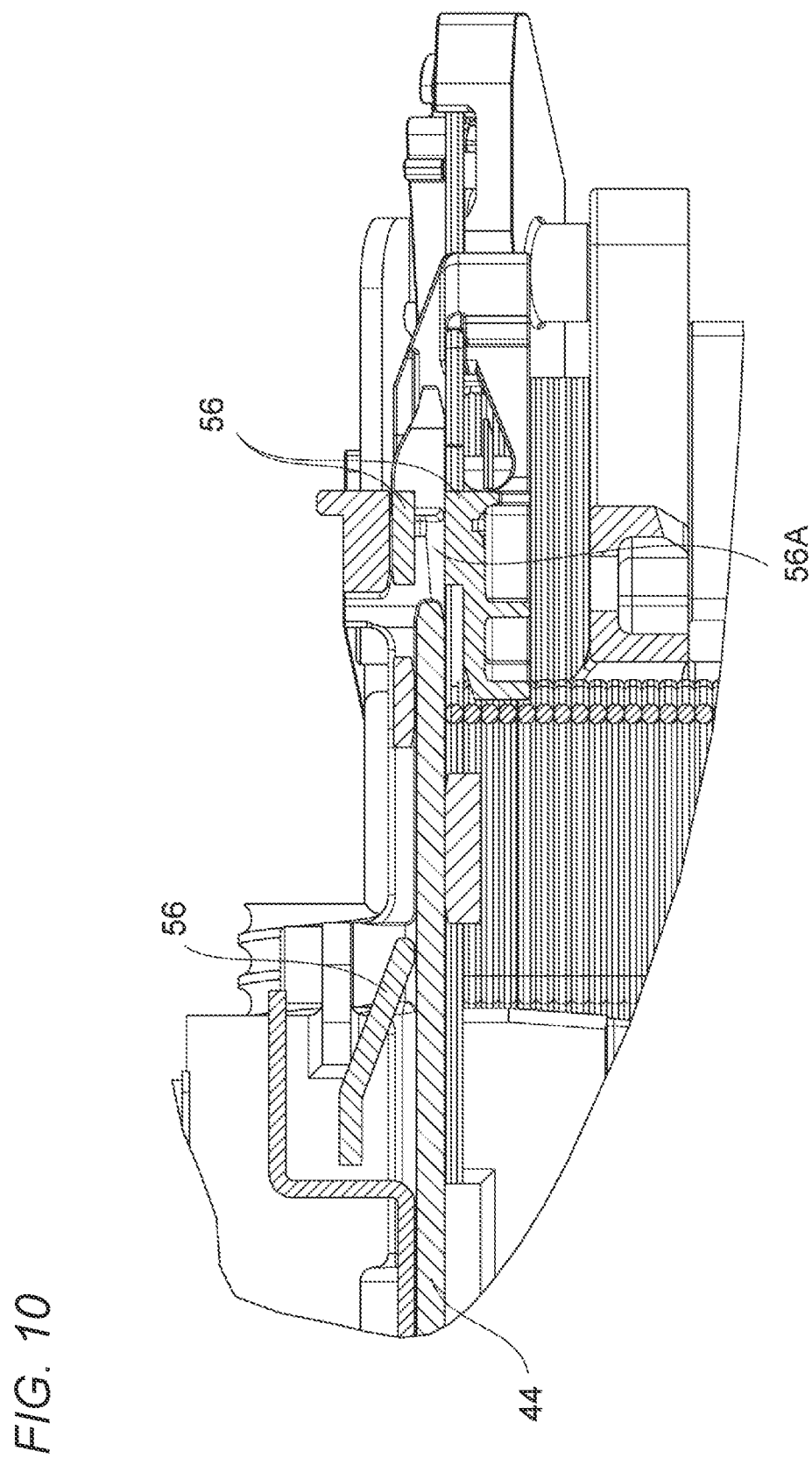
FIG. 10 is a cross-sectional view illustrating a detachment portion and the like of the binding machine according to the embodiment.

As illustrated in FIG. 10, the detachment portion 56 is provided to vertically move as the slider 44 moves. The detachment portion 56 is formed with a gap 56A in which a part of the slider 44 enters as the slider 44 moves. Since a part of the slider 44 enters the gap 56A of the detachment portion 56, a vertical position of the detachment portion 56 can be stabilized, and the staple S can be reliably deformed.

Figure 11A:
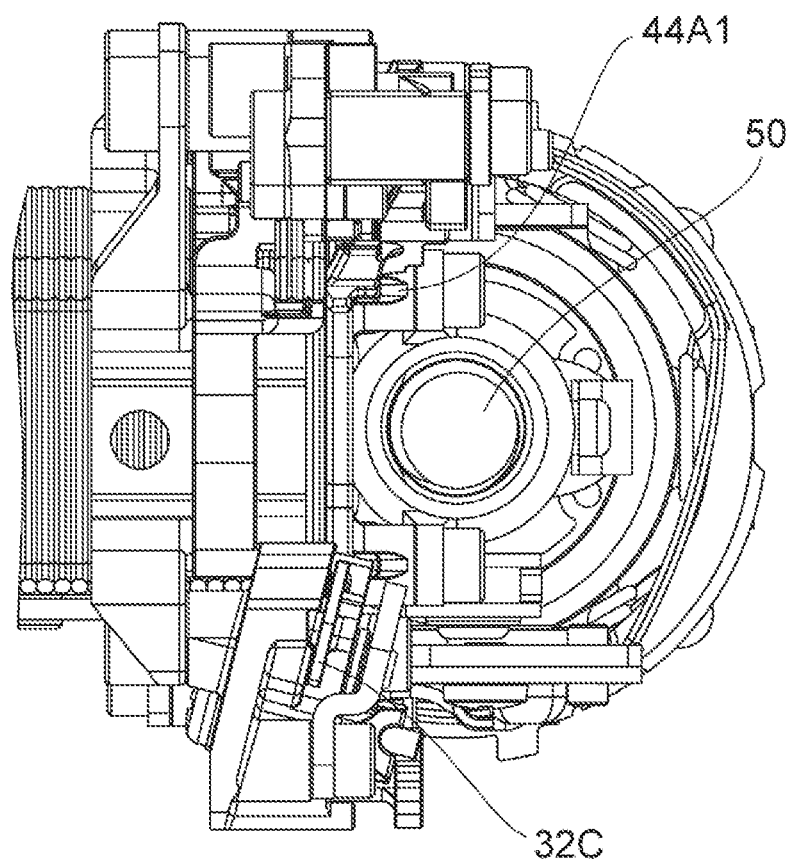
FIG. 11A is a partially enlarged view illustrating an initial state of the binding machine according to the embodiment in the front view.
Figure 11A:
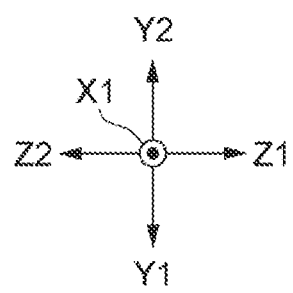
Figure 11B:
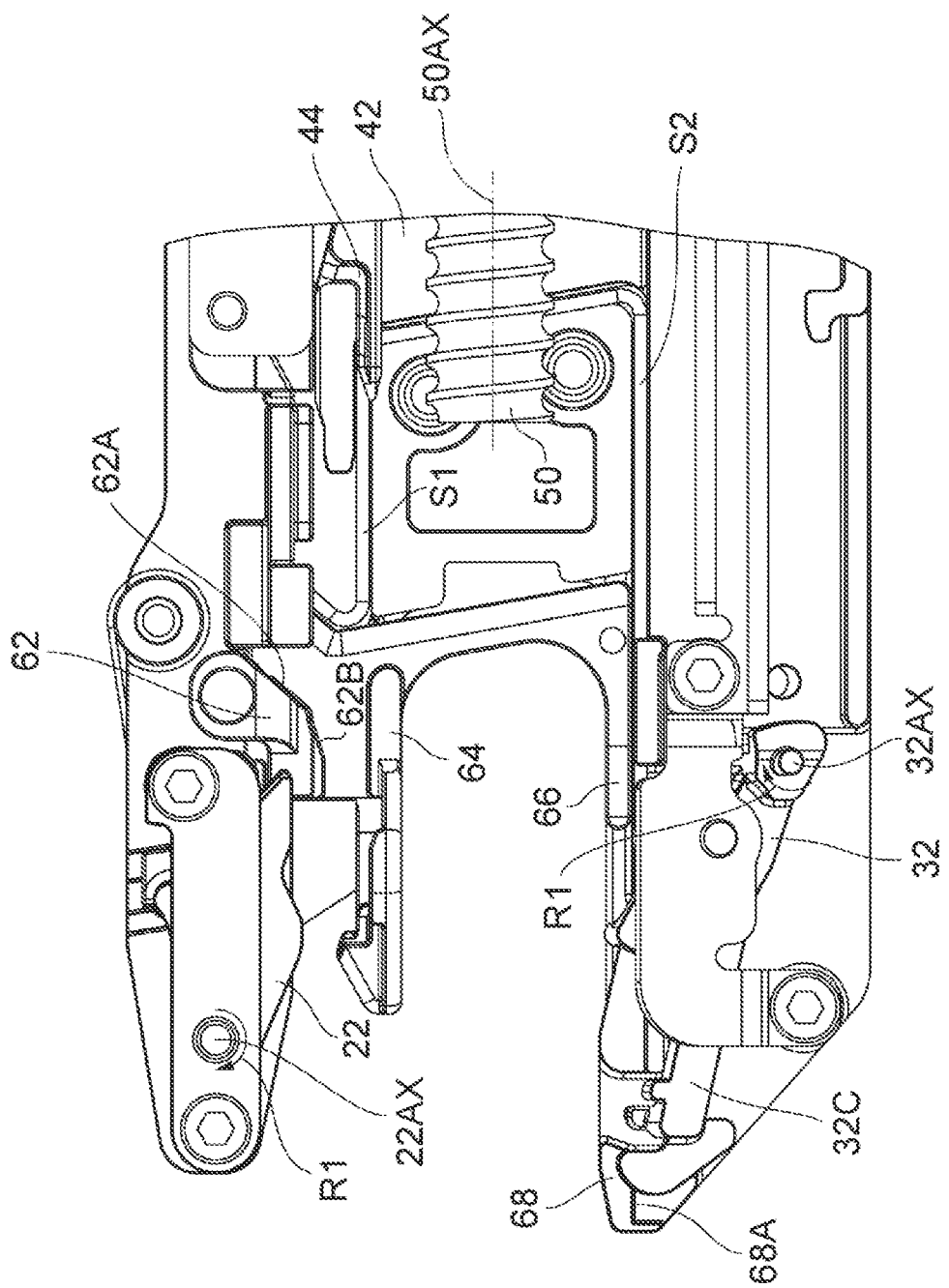
FIG. 11B is a partially enlarged view illustrating the initial state of the binding machine according to the embodiment in the top view.

FIGS. 11A and 11B are partially enlarged views illustrating the front end portion of the binding machine 10 in the initial state (a standby state) in the front view and the top view, respectively.

When the staple S moves in the forward direction X1 by the driver 42, the tip end portion S1A of the first leg portion S1 passes through the first outer wall portion 62 while being in contact therewith, and thus the first outer wall portion 62 executes plastic deformation so as to further reduce the bending angle α1 formed by the tip end portion S1A of the first leg portion S1 and the first portion S1B of the first leg portion S1 (a portion connected to the tip end portion S1A of the first leg portion S1).

Accordingly, the first outer wall portion 62 is provided at a position at which only a part of the tip end portion S1A of the first leg portion S1 of the staple S is in contact with the first outer wall portion 62.

The first inner wall portion 64 is provided inside the first leg portion S1 to support the first leg portion S1 from the inside when the first leg portion S1 of the staple S moves in the forward direction X1 by the driver 42 and when the first leg portion S1 is displaced. The first inner wall portion 64 includes a bottom surface provided along a movement path of the first leg portion S1, and a wall surface provided substantially parallel to the front-rear direction, which is a movement direction of the first leg portion S1, and supporting the first leg portion S1 from the inside.

On the other hand, the first outer wall portion 62 is provided to include a wall surface inclined such that a gap with the wall surface of the first inner wall portion 64 becomes small toward the forward direction X1. According to such a configuration, it is possible to displace the tip end portion such that the bending angle α1 becomes small as the tip end portion S1A of the first leg portion S1 advances in the forward direction X1.

Further, the first outer wall portion 62 according to the present embodiment at least includes a first region 62A (FIG. 9) at which a wall surface in which a gap with the wall surface of the first inner wall portion 64 is relatively largely reduced is formed, and a second region 62B (FIG. 9) that is provided in the forward direction X1 with respect to the first region 62A and at which a wall surface in which a gap with the wall surface of the first inner wall portion 64 is slightly reduced is formed.

When an average reduction rate of the gap (a distance in a left-right direction perpendicular to the forward direction X1) between the wall surface of the first outer wall portion 62 and the wall surface of the first inner wall portion 64 in the first region 62A is set to a first reduction rate, and an average reduction rate of the gap (the distance in the left-right direction perpendicular to the forward direction X1) between the wall surface of the first outer wall portion 62 and the wall surface of the first inner wall portion 64 in the second region 62B is set to a second reduction rate, an absolute value of the first reduction rate is larger than an absolute value of the second reduction rate. In other words, an angle formed by the front-rear direction in the top view and the wall surface of the first region 62A of the first outer wall portion 62 is larger than an angle formed by the front-rear direction in the top view and the wall surface of the second region 62B of the first outer wall portion 62.

As the bending angle α1 of the bent portion decreases, the elastic force repelling the displacement becomes smaller, and thus it is possible to smoothly bend the tip end portion S1A of the first leg portion S1 by the above configuration.

The wall surface with which the first leg portion S1 does not come into contact is not limited to the above configuration. For example, the first inner wall portion 64 may be provided to restrict the displacement of the first portion S1B in the upward direction Z1 by providing a wall surface provided to protrude an upper portion of the first inner wall portion 64 in the outward direction and face an upper surface of the first portion S1B.

Further, the first inner wall portion 64 is formed with a through hole for allowing the tip end portion S1A and the contact member 24 to pass through the downward direction Z2 with respect to the first portion S1B (FIG. 5).

Support Wall of Detachment Portion

The detachment portion further includes the second inner wall portion 66 having a wall surface that is provided inside the second leg portion S2 to support the second leg portion S2 from the inside when the second leg portion S2 is displaced. The second inner wall portion 66 further has a bottom surface provided substantially parallel to the front-rear direction along a movement path of the second leg portion S2.

The front end of the second inner wall portion 66 functions as a fulcrum when the second leg portion S2 is bent. Therefore, the front end of the second inner wall portion 66 is provided at a position by the second distance DS2 from the tip end of the second leg portion S2, which is a bent portion of the second leg portion S2. Since the second leg portion S2 needs to have a distance for closing the opening, the front end of the second inner wall portion 66 needs to be provided at a position separated by a distance equal to or larger than the width of the opening of the staple S from the tip end of the second leg portion S2. The tip end portion S2A of the second leg portion S2 is supported by a tip end supporting portion 68. The width of the opening of the staple S corresponds to a width between the wall surface of the first inner wall portion 64 and the wall surface of the second inner wall portion 66. Therefore, the second inner wall portion 66 is provided such that a distance between the tip end supporting portion 68 (a surface thereof facing the tip end of the second leg portion S2) and the front end of the second inner wall portion 66 is larger than the width between the wall surface of the first inner wall portion 64 and the wall surface of the second inner wall portion 66, which corresponds to the width of the opening of the staple S.

The second displacement portion 30 further includes the tip end supporting portion 68 that supports the tip end portion S2A of the second leg portion S2. The tip end supporting portion 68 includes the support wall portion 68A that has a wall surface provided inside the second leg portion S2 and supporting the tip end portion S2A from the inside.

First Displacement Portion

The first displacement portion 20 has a function of displacing the first leg portion S1 so as to be engageable with the first object G.

The first displacement portion 20 according to the present embodiment includes the first arm 22 that rotates by being pushed by the first front end portion 44A1 of the slider 44, and the contact member 24 (the claw member) that bends the tip end portion S1A of the first leg portion S1 to plastically deform by moving toward the inward direction of the staple S while being in contact with the tip end portion S1A of the first leg portion S1 as the first arm 22 rotates.

First, a configuration of the first front end portion 44A1 of the slider 44 will be described.

As illustrated in FIGS. 7A and 7B, the first front end portion 44A1 of the slider 44 is provided to extend in the forward direction X1 at an end portion of the slider 44 in the leftward direction Y2. The first front end portion 44A1 includes a first protruded portion 44A11 that protrudes in the upward direction Z1 in order to rotate the first arm 22 in the first rotation direction R1 by coming into contact with the first arm 22 at the time of the movement in the forward direction X1, and a second protruded portion 44A12 that rotates the first arm 22 in the second rotation direction R2 opposite to the first rotation direction R1 by coming into contact with the first arm 22 at the time of the movement in the rearward direction X2.

The first protruded portion 44A11 is provided in the rearward direction X2 with respect to the second protruded portion 44A12. Further, the first protruded portion 44A11 is provided outside (in the leftward direction Y2) with respect to the second protruded portion 44A12. According to such a configuration, since a distance between a rotation shaft 22AX of the first arm 22 and the first protruded portion 44A11 can be set to be larger than a distance between the rotation shaft 22AX of the first arm 22 and the second protruded portion 44A12, it is possible to generate a large rotation torque at the time of advance having a high load.

The first front end portion 44A1 of the slider 44 further includes a protruding end portion 44A13 extending in the forward direction X1. The protruding end portion 44A13 restrains the bending of the first portion S1B by pressing the first portion S1B connected to the tip end portion S1A of the first leg portion S1 from the upward direction Z1 at the time of the plastic deformation of the tip end portion S1A of the first leg portion S1.

Next, the first arm 22 of the first displacement portion 20 will be described. The first arm 22 is a member that rotates in the first rotation direction R1 by being pushed in the forward direction X1 by the first front end portion 44A1 of the slider 44, and translates the contact member 24 in the inward direction.

Figure 12A:
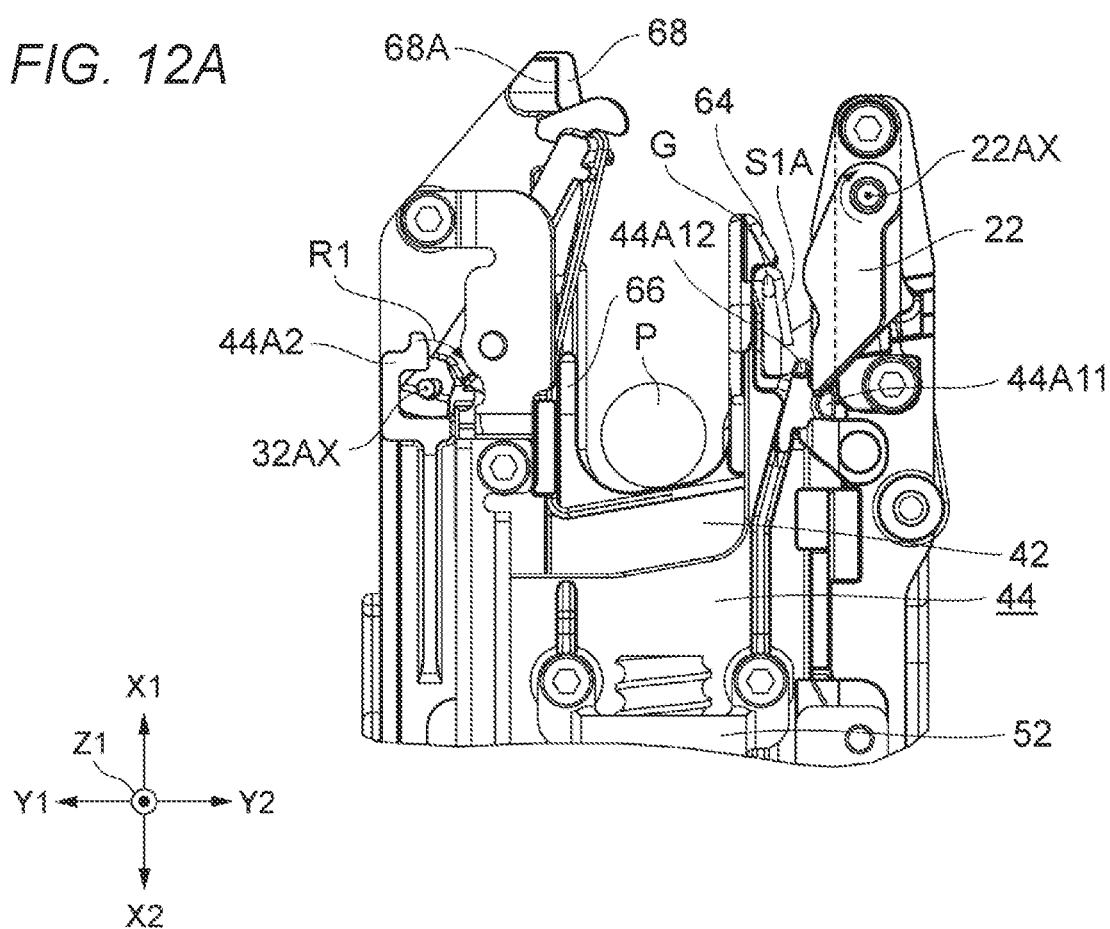
FIG. 12A is a partially enlarged view illustrating a plastic deformation start time of the binding machine according to the embodiment in the top view.
Figure 12B:
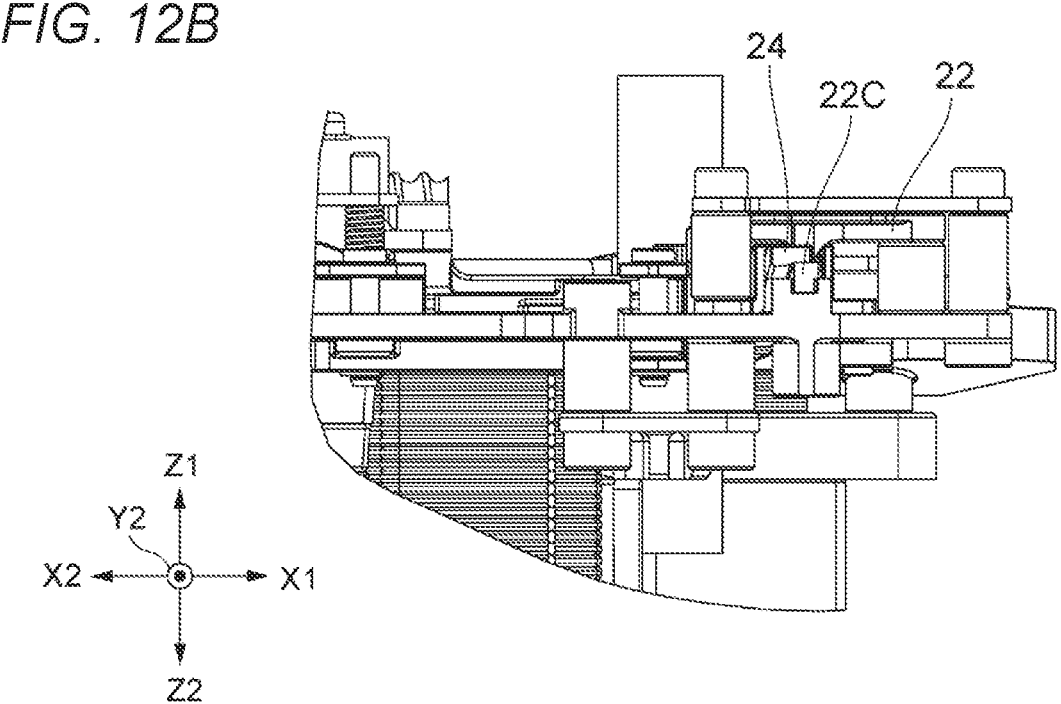
FIG. 12B is a partially enlarged view illustrating the plastic deformation start time of the binding machine according to the embodiment in a side view.
Figure 12C:
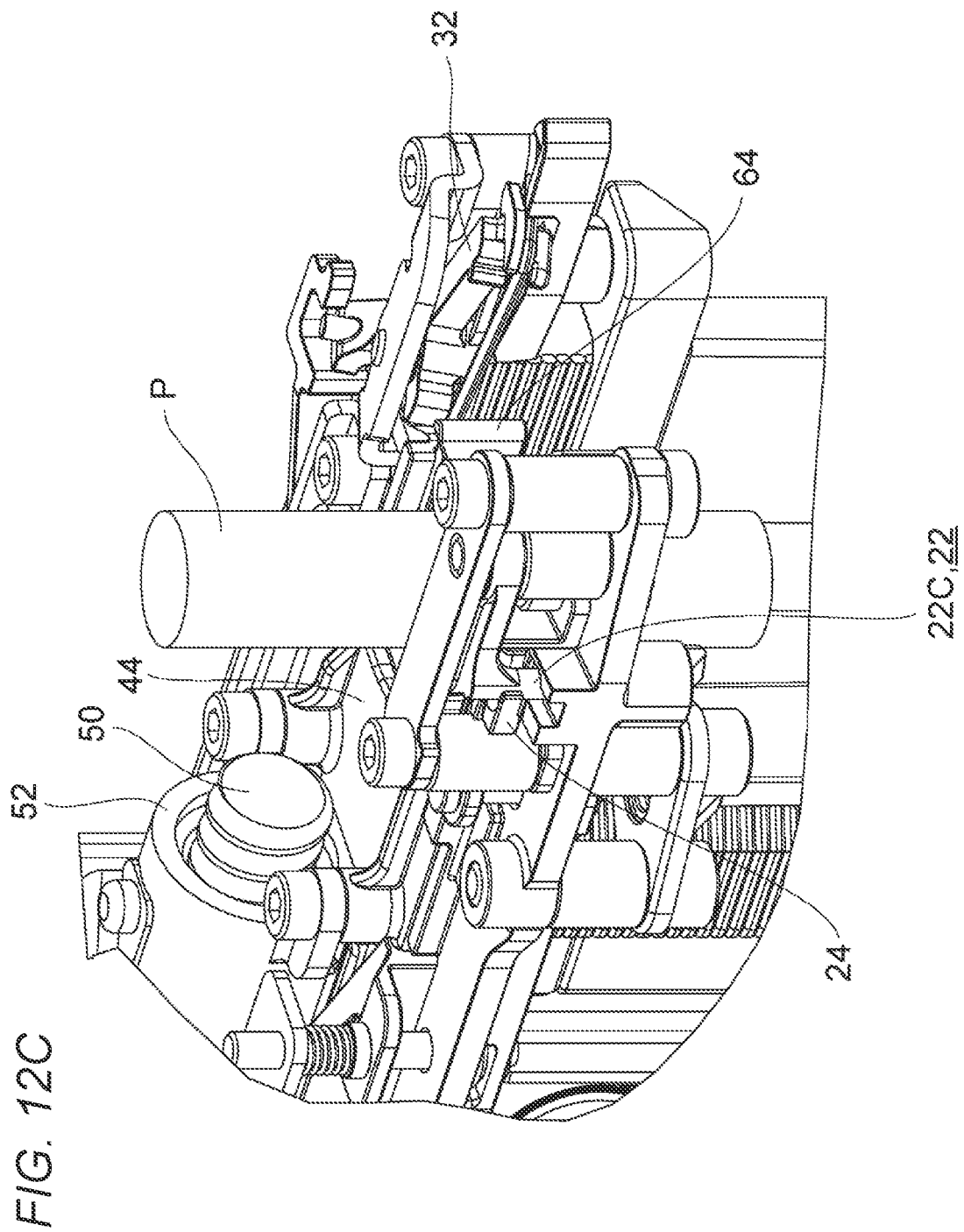
FIG. 12C is a partially enlarged perspective view illustrating a front end portion of the binding machine according to the embodiment.

FIG. 12A is a partially enlarged view illustrating the front end portion of the binding machine 10 during a plastic deformation start time by the first displacement portion 20 in the top view, FIG. 12B is a partially enlarged view of a cross section of the first displacement portion 20 in a left side view, and FIG. 12C is an enlarged perspective view of the front end portion of the binding machine 10. However, for the sake of convenience, parts unnecessary for the description are omitted in FIGS. 12A to 12C.

As illustrated in FIG. 12A and the like, the rotation shaft 22AX of the first arm 22 is provided in the outward direction (in the rightward direction Y1) of the first leg portion S1 of the staple S and in the forward direction X1. Further, the rotation shaft 22AX of the first arm 22 is provided perpendicular to the front-rear direction so as to extend in the up-down direction. The first arm 22 further has a portion that is provided to extend from the rotation shaft 22AX toward the rearward direction X2 at the time of standby, and includes, at a rear end of this portion, a wall portion that protrudes in the downward direction Z2 and extends to be inclined toward the rearward direction X2 and the inward direction. A surface of the wall portion facing the rearward direction X2 faces the rearward direction X2 and the outward direction in the initial state, and a surface of the wall portion facing the forward direction X1 faces the forward direction X1 and the inward direction. The surface of the wall portion facing the rearward direction X2 includes a surface in contact with the advancing first protruded portion 44A11. The wall portion moves to penetrate through a region between the first protruded portion 44A11 and the second protruded portion 44A12 while rotating in the first rotation direction R1 by being in contact with the first protruded portion 44A11. In addition, the surface of the wall portion facing in the forward direction X1 includes a surface in contact with the retracting second protruded portion 44A12. Accordingly, the wall portion returns to an original position while rotating in the second rotation direction R2 opposite to the first rotation direction R1 by being in contact with the second protruded portion 44A12.

As illustrated in FIG. 12C, a protruded portion 22C protruding in the downward direction Z2 is further provided at a rear end portion of the first arm 22. The protruded portion 22C is engaged with a recessed portion 24A provided at an end portion of the contact member 24. Since the protruded portion 22C rotates in the first rotation direction R1 around the rotation shaft 22AX of the first arm 22, the contact member 24 advances toward the inward direction of the staple S.

Figure 13:
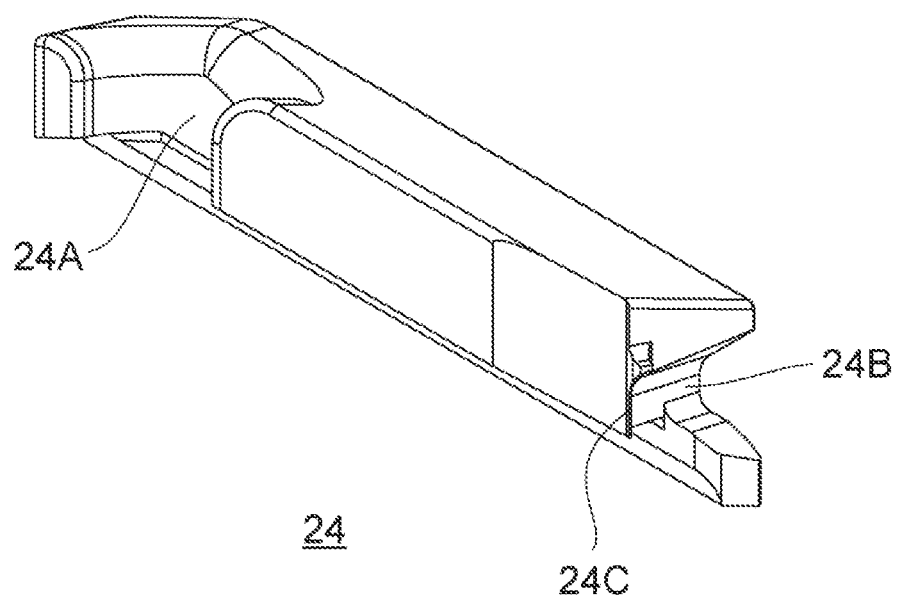
FIG. 13 is a perspective view of a contact member 24 (a claw member) according to the embodiment.

FIG. 13 is a perspective view of the contact member 24 (the claw member). The contact member 24 has a function of plastically deforming the tip end portion S1A of the first leg portion S1 of the staple S by being pressed by the first arm 22 and advancing in a direction inclined toward the inward direction of the staple S and the downward direction Z2. By the contact member 24, the tip end portion S1A of the first leg portion S1 is bent such that the tip end portion S1A intersects the first portion S1B connected to the tip end portion S1A of the first leg portion S1 in the top view and the tip end advances in the downward direction Z2 separated from the plane PL penetrating through the first leg portion S1, the second leg portion S2, and the main body portion S3 before the binding. By plastically deforming the tip end portion S1A of the first leg portion S1 in the inward direction and the downward direction Z2 in a state of sandwiching the first object G, the tip end portion S1A of the first leg portion S1 can sandwich the first object G without interfering with the first portion S1B.

As illustrated in FIG. 13, the recessed portion 24A that is engaged with the protruded portion 22C of the first arm 22 protruding in the downward direction Z2 is provided at a tail end of the contact member 24. When the protruded portion 22C of the first arm 22 rotates in the first rotation direction R1, a side surface of the recessed portion 24A comes into contact with the protruded portion 22C, and the contact member 24 advances in the direction inclined toward the inward direction and the downward direction Z2, when the protruded portion 22C rotates in the second rotation direction R2, another side surface of the recessed portion 24A comes into contact with the protruded portion 22C, and the contact member 24 returns in a direction inclined toward the upward direction Z1 and the outward direction.

A tip end of the contact member 24 includes a contact surface 24B that comes into contact to grip the tip end portion, and a corner portion 24C that is provided at a connection portion between the contact surface 24B and a side surface and applies a stress for plastically deforming the tip end portion. Here, the contact surface 24B is formed to be recessed to conform to a shape of a cross section of the staple S. Further, the contact surface 24B is formed to be inclined so as to come into contact with the tip end portion S1A prior to the corner portion 24C. According to such a configuration, after the tip end portion S1A is taken in so as to be gripped by the contact surface 24B, the tip end portion S1A can be plastically deformed by the corner portion 24C, and thus it is possible to stabilize the position of the tip end portion S1A plastically deformed by the corner portion 24C.

Figure 14:
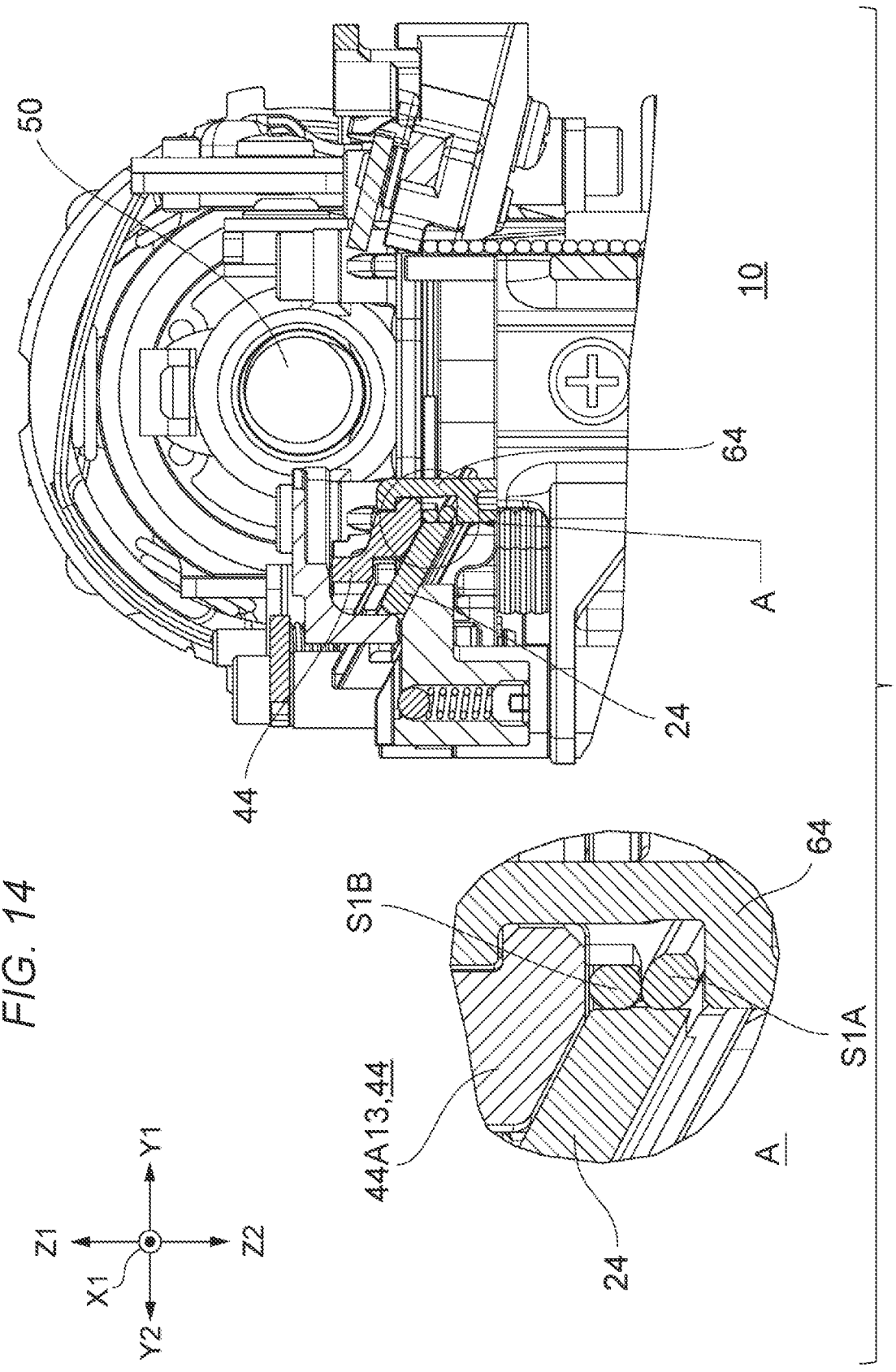
FIG. 14 is a cross-sectional view in the front view during plastic deformation by the contact member 24 (the claw member) according to the embodiment.

FIG. 14 is a cross-sectional view of the tip end portion S1A after the plastic deformation by the contact member 24 in the front view, and is an enlarged view of a region A in this cross section. As illustrated in FIG. 14, the contact member 24 is placed on an inclined surface of the base 46 inclined to descend in the inward direction, and thus the contact member 24 is guided to advance in the direction inclined toward the inward direction of the staple S (a direction approaching the second arm 32) and the downward direction Z2. The first portion S1B of the first leg portion S1 is supported by the bottom surface of the slider 44 from the upward direction Z1 and is supported by the first inner wall portion 64 from the inside and the downward direction Z2 (excluding a portion at which the tip end portion S1A passes through the downward direction Z2 with respect to the first portion S1B). In addition, the contact surface 24B of the contact member 24 faces an outer surface of the first portion S1B at the time of the plastic deformation. Therefore, it is possible to restrain the bending of the first portion S1B at the time of the plastic deformation of the tip end portion S1A of the first leg portion S1.

Second Displacement Portion

The second displacement portion 30 has a function of displacing the second leg portion S2 so as to be engageable with the first object G.

The second displacement portion 30 includes the second arm 32 that bends the second leg portion S2 to plastically deform by rotating in the first rotation direction R1 by the second front end portion 44A2 of the slider 44.

First, a configuration of the second front end portion 44A2 of the slider 44 will be described.

As illustrated in FIGS. 7A and 7B, the second front end portion 44A2 of the slider 44 is provided to extend in the forward direction X1 at an end portion of the slider 44 in the rightward direction Y1. The second front end portion 44A2 includes a first surface 44A21 and a second surface 44A22 formed to face the forward direction X1 in order to rotate the second arm 32 in the first rotation direction R1 by coming into contact with the second arm 32 at the time of the movement in the forward direction X1, and a third surface 44A23 provided in the forward direction X1 with respect to the first surface 44A21 and the second surface 44A22 and formed to face the rearward direction X2. By disposing a rear end portion 32B of the second arm 32 between the first surface 44A21 and the second surface 44A22, and the third surface 44A23, the second arm 32 rotates in the first rotation direction R1 at the time of the advance of the slider 44, and the second arm 32 rotates in the second rotation direction R2 and returns to an original position at the time of the retraction of the slider 44.

The first surface 44A21 of the slider 44 corresponds to a surface on which the first front end portion 44A1 of the advancing slider 44 first comes into contact with the rear end portion 32B of the second arm 32. A surface of the rear end portion 32B of the second arm 32 that comes into contact with the first surface 44A21 is referred to as a first rear end surface 32B1.

The second surface 44A22 of the slider 44 corresponds to a surface on which the second front end portion 44A2 of the slider 44, which further advances after the first surface 44A21 comes into contact with the first rear end surface 32B1 and the second arm 32 starts rotating in the first rotation direction R1, comes into contact with the rear end portion 32B of the second arm 32. A surface of the rear end portion 32B of the second arm 32 that comes into contact with the second surface 44A22 is referred to as a second rear end surface 32B2.

As illustrated in FIG. 7B and the like, the first surface 44A21 is provided in the upward direction Z1 with respect to the second surface 44A22 in terms of the up-down direction, the first surface 44A21 is provided in the rearward direction X2 with respect to the second surface 44A22 in terms of the front-rear direction, and the first surface 44A21 is provided in the rightward direction Y1 with respect to the second surface 44A22 in terms of the left-right direction, that is, the first surface 44A21 is provided in the outward direction (the rightward direction Y1) with respect to the second surface 44A22 with the staple S as a reference.

According to this configuration, the slider 44 can further push the second arm 32 by the second surface 44A22 after pushing the second arm 32 by the first surface 44A21, and thus it is possible to increase a rotation angle of the second arm 32 with respect to a stroke of the slider 44.

Further, the slider 44 and the second arm 32 are formed such that an angle (an example of a "first angle") formed by a normal line of the first rear end surface 32B1 at a contact point (an example of a "first contact point") in contact with the first surface 44A21 of the slider 44 and a straight line connecting the first contact point and a rotation shaft 32AX is closer to 90 degrees than an angle (an example of a "second angle") formed by a normal line of the second rear end surface 32B2 at a contact point (an example of a "second contact point") in contact with the second surface 44A22 of the slider 44 and a straight line connecting the second contact point and the rotation shaft 32AX when there is no first contact point.

When the contact point is switched by the rotation of the second arm 32, the slider 44 and the second arm 32 are formed such that the angle (an example of the "first angle") formed by the normal line of the first rear end surface 32B1 at the contact point (an example of the "first contact point") in contact with the first surface 44A21 of the slider 44 and the straight line connecting the first contact point and the rotation shaft 32AX is equal to an angle (an example of the "second angle") formed by a normal line of the second rear end surface 32B2 at a contact point (an example of the "second contact point") in contact with the second surface 44A22 of the slider 44 and a straight line connecting the second contact point and the rotation shaft 32AX. Alternatively, the slider 44 and the second arm 32 are formed such that the angle (an example of the "second angle") formed by the normal line of the second rear end surface 32B2 at the contact point (an example of the "second contact point") in contact with the second surface 44A22 of the slider 44 and the straight line connecting the second contact point and the rotation shaft 32AX is close to 90 degrees.

According to this configuration, it is possible to set a rotational moment when the first surface 44A21 is in contact with the first rear end surface 32B1 to be relatively larger than a rotational moment when the second surface 44A22 is in contact with the second rear end surface 32B2.

As will be described later, the second leg portion S2 needs to bend two portions simultaneously at the start of rotation of the second arm 32, and thus a large load is applied to the second arm 32 at the start of rotation. Therefore, by pushing the second arm 32 in the forward direction X1 by the first surface 44A21 of the slider 44 at the start of rotation having the load, it is possible to generate a relatively large rotational moment on the second arm 32. In order to increase the rotational moment, a distance between the rotation shaft 32AX of the second arm 32 and the first rear end surface 32B1 may be larger than a distance between the rotation shaft 32AX of the second arm 32 and the second rear end surface 32B2. In other words, the distance between the rotation shaft 32AX of the second arm 32 and the second rear end surface 32B2 may be smaller than the distance between the rotation shaft 32AX of the second arm 32 and the first rear end surface 32B1.

Figure 15:
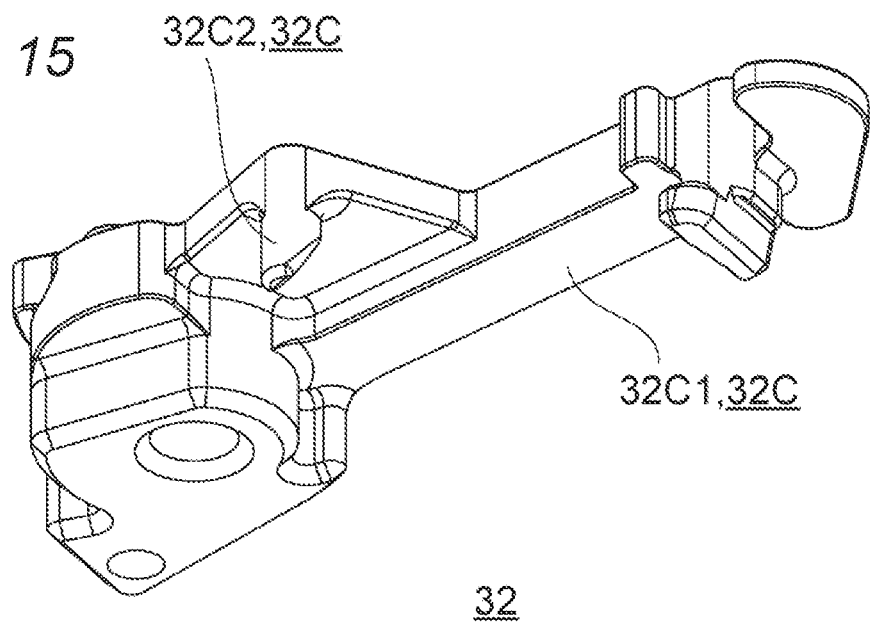
FIG. 15 is a perspective view of a second arm according to the embodiment.
Figure 16A:
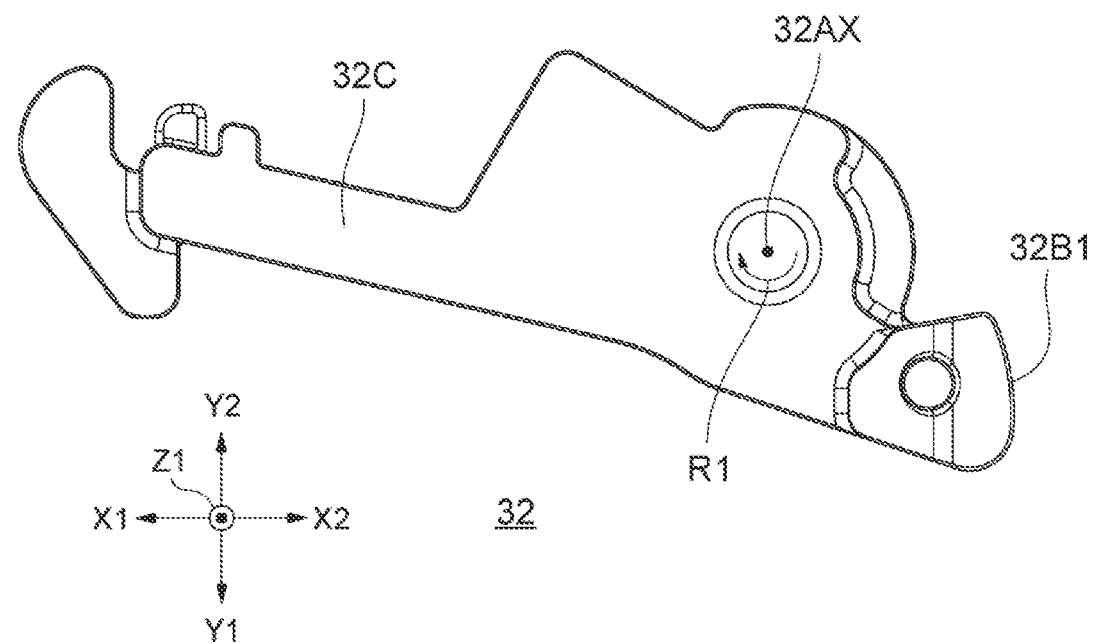
FIG. 16A is a plan view of the second arm according to the embodiment.
Figure 16B:
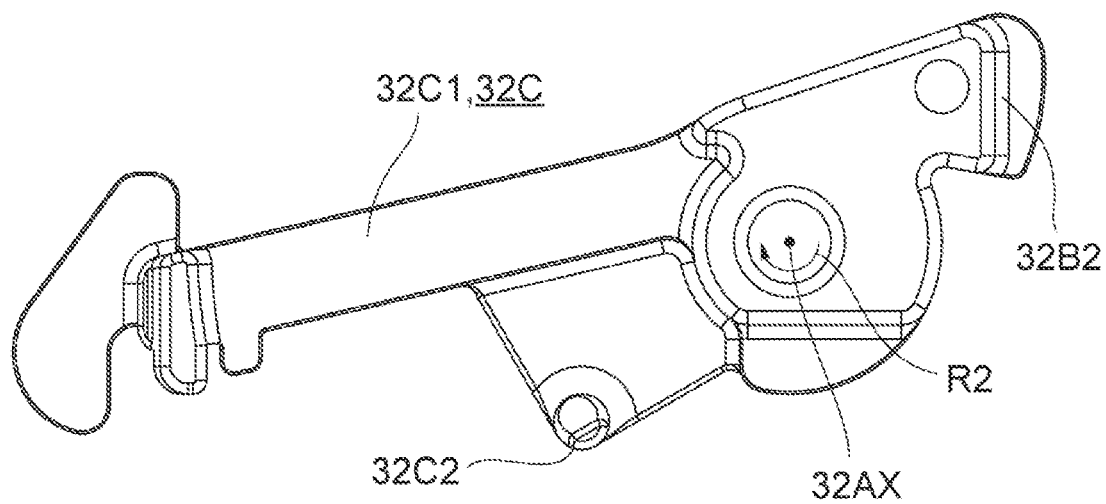
FIG. 16B is a rear view of the second arm according to the embodiment.

Next, the second arm 32 will be described. FIG. 15 is a perspective view of the second arm 32 as viewed from the downward direction. FIGS. 16A and 16B are respectively a plan view and a rear view of the second arm 32.

As illustrated in FIGS. 15, 16A, and 16B, the second arm 32 includes the rear end portion 32B that extends in the rearward direction X2 from the rotation shaft 32AX in the initial state, and a tip end portion 32C that extends in the forward direction X1 with respect to the rotation shaft 32AX.

Since the first rear end surface 32B1 of the rear end portion 32B is provided in the rearward direction X2 with respect to the second rear end surface 32B2, it is possible to bring the first surface 44A21 of the slider 44 into contact with the first rear end surface 32B1 and then bring the second surface 44A22 into contact with the second rear end surface 32B2.

The rotation shaft 32AX is provided in the leftward direction Y2 (the inward direction) which is closer to a center than the first rear end surface 32B1 and the second rear end surface 32B2. Therefore, since the rear end portion 32B is pushed in the forward direction X1, the tip end portion 32C of the second arm 32 rotates in the first rotation direction R1 which is directed to a direction approaching the inward direction of the staple S and the first arm 22.

Further, the rotation shaft 32AX is provided to be inclined so as to advance in the inward direction (the leftward direction Y2) toward the downward direction Z2. Therefore, the tip end portion 32C of the second arm 32 rotating in the first rotation direction R1 is provided to advance in the upward direction Z1 as the tip end portion 32C rotates in the first rotation direction R1. As a result, the second leg portion S2 of the staple S plastically deformed by the second arm 32 also advances in the upward direction Z1 as the second arm 32 rotates, and can be engaged with the first object G at a position in the upward direction Z1 with respect to the plane PL penetrating through the first leg portion S1, the second leg portion S2, and the main body portion S3 before the binding.

The tip end portion 32C of the second arm 32 includes a main body portion 32C1 that comes into contact with the second leg portion S2 and a protrusion 32C2 for bending back. The main body portion 32C1 is provided such that two protruded portions protruding in the first rotation direction R1 are vertically separated from each other at a position separated from the rotation shaft 32AX. By vertically sandwiching the second leg portion S2 by using the protruded portions, it is possible to firmly hold and plastically deform the second leg portion S2.

The second arm 32 includes the protrusion 32C2 for bending back that is provided at a position advanced in the first rotation direction R1 with respect to the main body portion 32C1 and protrudes in the downward direction Z2. By rotating the second arm 32 in the second rotation direction R2 and returning the second leg portion S2 in the second rotation direction R2 by the protrusion 32C2 after rotating the second arm 32 in the first rotation direction R1 and bending the second leg portion S2, it is possible to engage the tip end portion S2A of the second leg portion S2 with the first object G.

The protrusion 32C2 for bending back is formed to be inclined so as to protrude in the downward direction Z2 as advancing in the first rotation direction R1. According to such a configuration, when the second arm 32 is rotated in the second rotation direction R2, the protrusion 32C2 for bending back can smoothly move over the second leg portion S2 engaged with the first object G while returning the second leg portion S2 in the second rotation direction R2. A biasing force toward the upward direction Z1 by the pusher 16 is applied to the plastically deformed staple S via the staple S in the downward direction Z2. An elevation angle of the second leg portion S2 at the time of the displacement (for example, 10 degrees to 45 degrees with respect to the plane PL penetrating through the first leg portion S1, the second leg portion S2, and the main body portion S3 before the binding) and an inclined angle of the protrusion 32C2 for bending back are designed such that the protrusion moves over the second leg portion S2 against the biasing force.

Binding Method Using Binding Machine

Hereinafter, a binding method using the binding machine 10 will be described.

As described above, FIGS. 11A and 11B are partially enlarged views illustrating the front end portion of the binding machine 10 in the initial state (the standby state) in the front view and the top view, respectively.

At this time, the staple S positioned at the upper end is connected to one or more staples S accommodated in the magazine 14 in the downward direction Z2. Further, the driver 42 is positioned in the rearward direction X2 with respect to the main body portion S3 of the staple S positioned at the upper end. There is a slight gap between a front end of the driver 42 and the main body portion S3 of the staple S positioned at the upper end. The protruding end portion 44A13 of the slider 44 provided at a left end slightly overlaps with the staple S.

Figure 17A:
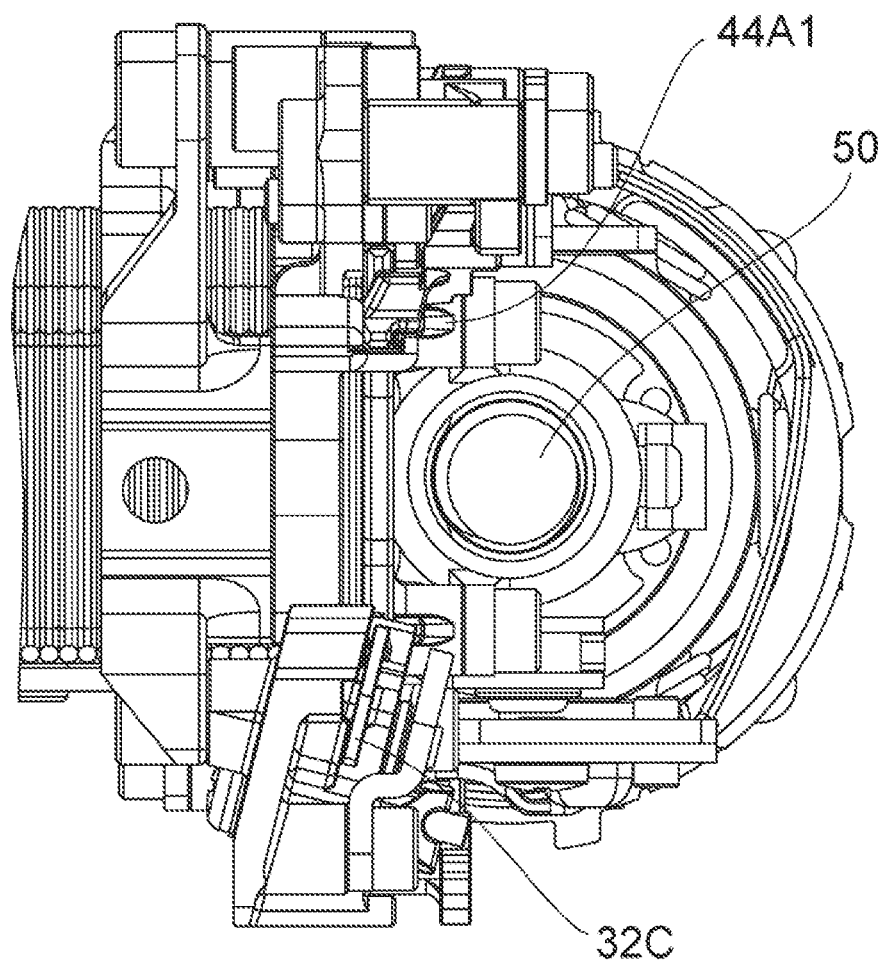
FIG. 17A is a partially enlarged view illustrating a driver movement start time of the binding machine according to the embodiment in the front view.
Figure 17A:
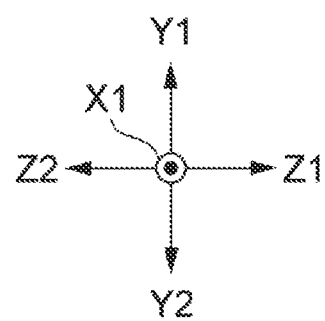

FIGS. 17A and 17B are partially enlarged views illustrating the front end portion of the binding machine 10 in the front view and the top view immediately after the user operates the switch and the driver 42 starts moving, respectively. When the user operates the switch, the motor 54 starts rotating, and the ball screw 50 accordingly rotates clockwise, and thus the nut part 52 and the slider 44 fixed to the nut part 52 start moving toward the forward direction X1. The first claw portion 48C1 and the third claw portion 48C3 of the switching block 48 held by the nut part 52 are inserted into the first groove 42G1 and the third groove 42G3, and thus the front surface of the first claw portion 48C1 and the front surface of the third claw portion 48C3 are in contact with the side surface of the first groove 42G1 facing the rearward direction X2 and the side surface of the third groove 42G3 facing the rearward direction X2, respectively, and the movement of the driver 42 toward the forward direction X1 is started. Accordingly, the first moving operation in which the driver 42 and the slider 44 advance together is started.

As illustrated in FIG. 8A, the base 46 is provided such that a height of the driver 42 substantially coincides with the staple S positioned at the upper end. Therefore, the front end surface 42S of the driver 42 moving on the base 46 in the forward direction X1 comes into contact with the main body portion S3 of the staple S positioned at the upper end, and presses the main body portion S3 of the staple S in the forward direction X1. A separation block 18 (FIG. 5) for prohibiting the movement of the staple S in the downward direction Z2 toward the forward direction X1 is provided inside the staple S in the downward direction Z2. Therefore, only the staple S positioned at the upper end is separated from the staple S in the downward direction Z2 and moves on the separation block 18 in the forward direction X1.

FIG. 18 is a partially enlarged view illustrating the front end portion of the binding machine 10 in the top view when the driver 42 advances and the tip end portion S1A of the first leg portion S1 of the staple S advances on a guiding path of the detachment portion. Since a front view thereof is the same as FIG. 17A, the front view is omitted.

Since the ball screw 50 continuously rotates clockwise, the slider 44 moves in the forward direction X1. Therefore, the first front end portion 44A1 of the slider 44 advances such that the protruding end portion 44A13 is positioned on the first leg portion S1, and the second front end portion 44A2 advances along a right end of the binding machine 10. The driver 42 advances together with the slider 44. The tip end portion S1A of the first leg portion S1 comes into contact with the wall surface of the first region 62A corresponding to an entering portion of the first outer wall portion 62. In addition, the inside of the first portion S1B of the first leg portion S1 comes into contact with the wall surface of the first inner wall portion 64. Since the distance between the wall surface of the first outer wall portion 62 and the wall surface of the first inner wall portion 64 decreases as the driver 42 advances in the forward direction X1, the first leg portion S1 is plastically deformed such that the bending angle α1 is reduced as the driver 42 advances. At this time, the protruding end portion 42B of the driver 42 supports the first portion S1B and a left end of the main body portion S3 from the outside, and the protruding end portion 44A13 of the slider 44 comes into contact with an upper surface of the first leg portion S1 to press the first leg portion S1 from the upward direction Z1, and thus the bending of the first portion S1B is restrained. Since the distance between the wall surface of the first outer wall portion 62 and the wall surface of the first inner wall portion 64 in the first region 62A is relatively largely reduced, an angle between the tip end portion S1A and the first portion S1B of the first leg portion S1 is relatively largely reduced. Since the distance between the wall surface of the first outer wall portion 62 and the wall surface of the first inner wall portion 64 in the subsequent second region 62B is relatively slightly reduced, the bending angle is relatively slightly reduced.

Figure 19:
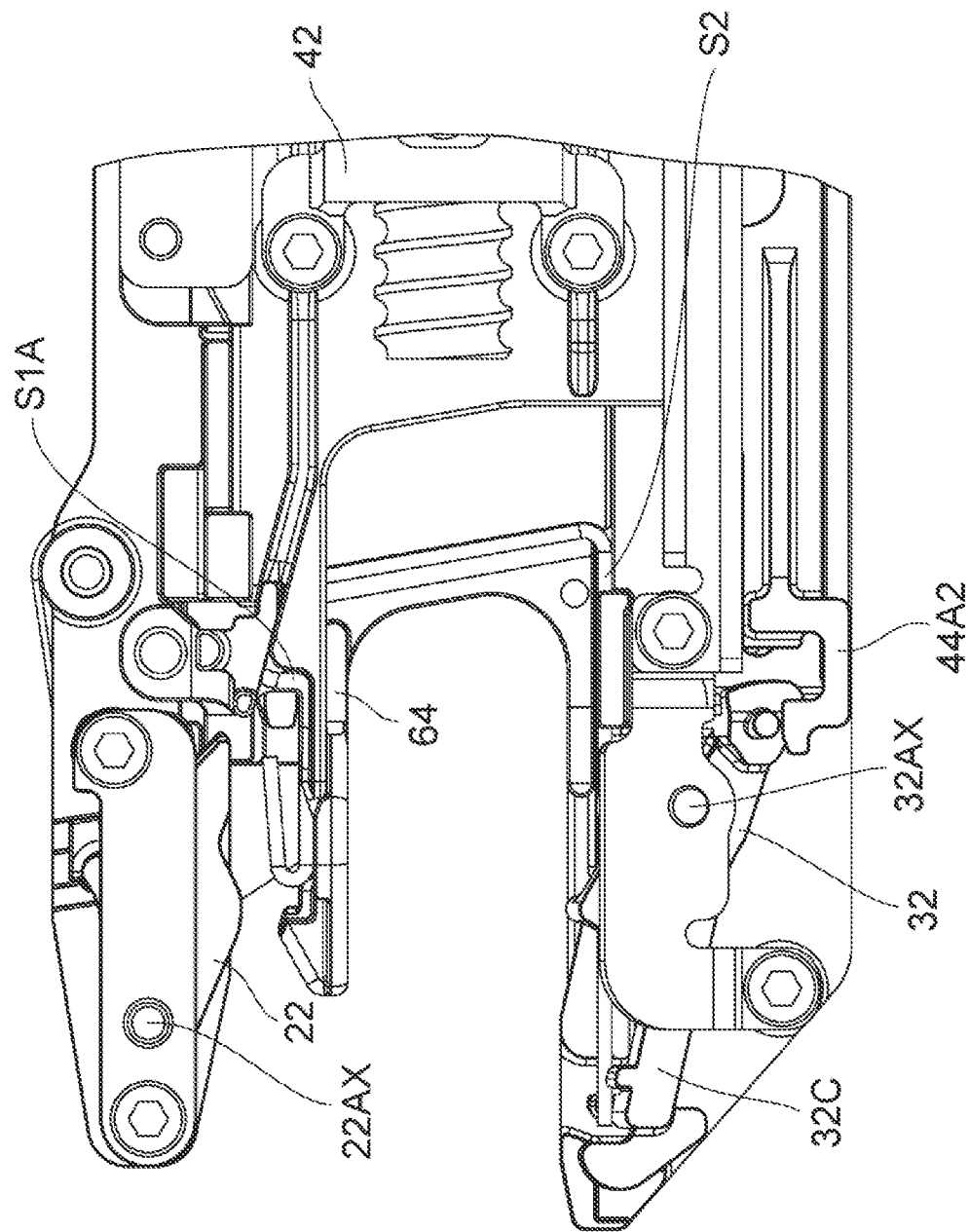
FIG. 19 is a partially enlarged view illustrating a state in which the staple has passed through a first outer wall portion by the binding machine according to the embodiment in the top view.

FIG. 19 is a partially enlarged view of the front end portion of the binding machine 10 in the top view when the driver 42 advances and the tip end portion S1A of the first leg portion S1 of the staple S passes through the first outer wall portion 62. Since a front view thereof is the same as FIG. 17A, the front view is omitted. As illustrated in FIG. 19, when the tip end portion passes through the first outer wall portion 62, the tip end portion is plastically deformed, and the bending angle α1 is largely reduced.

Figure 20:
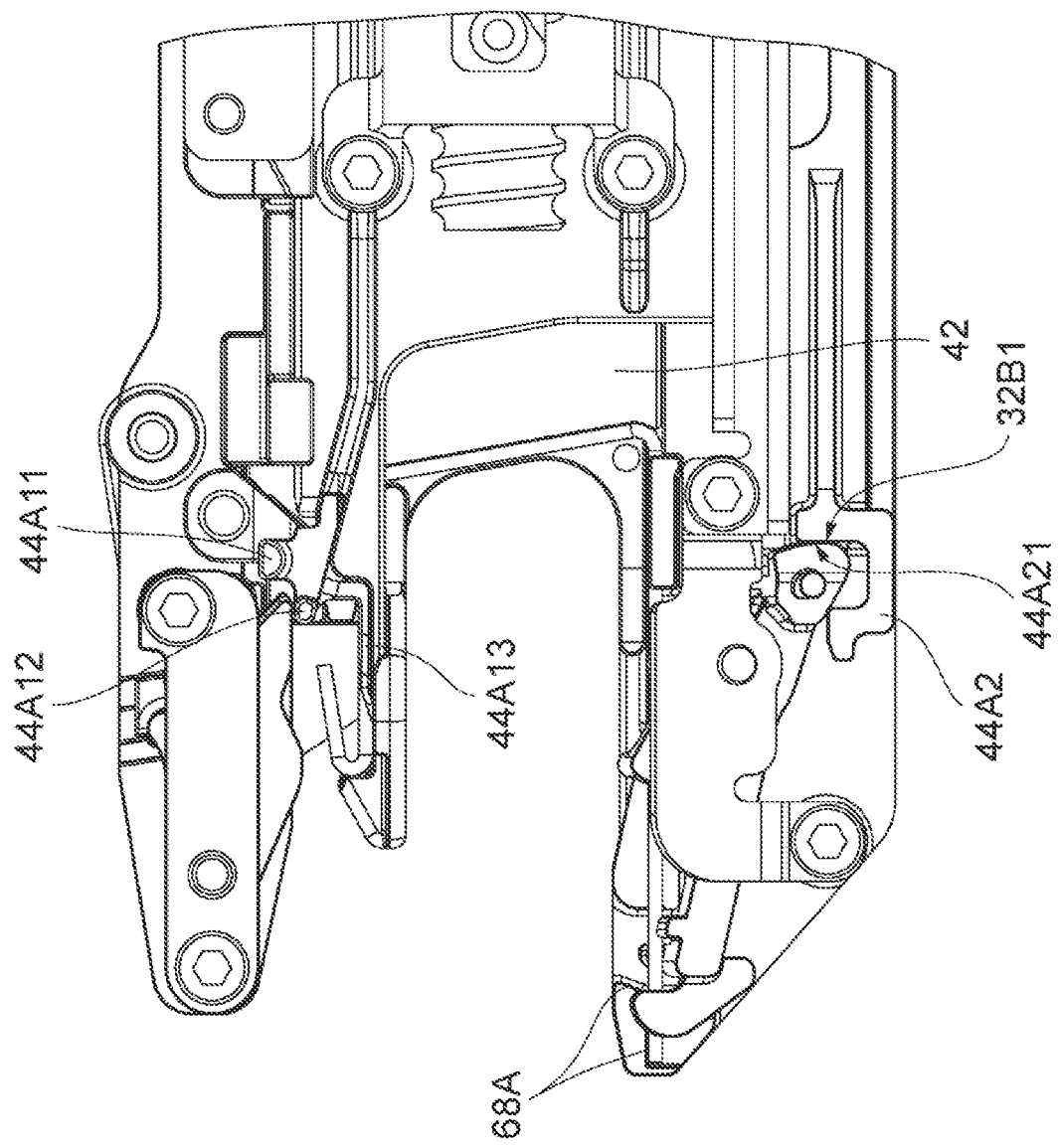
FIG. 20 is a partially enlarged view illustrating a state in which the staple has reached a displacement start position by the binding machine according to the embodiment in the top view.
Figure 20:
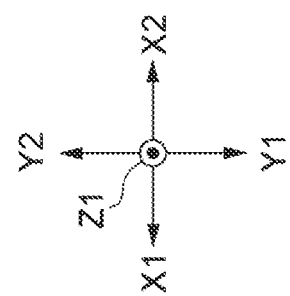

FIG. 20 is a partially enlarged view illustrating a state in which the driver 42 advances most and the staple S reaches a displacement start position in the top view. At this time, the bent portion of the first leg portion S1 of the staple S reaches a front end of the first inner wall portion 64 (an inner wall surface of the first inner wall portion 64 facing the rearward direction X2), and the tip end portion S2A of the second leg portion S2 reaches a front end of the tip end supporting portion 68 (an inner wall surface of the tip end supporting portion 68 facing the rearward direction X2). Since a front view thereof is the same as FIG. 17A, the front view is omitted.

At this time, the bent portion of the first leg portion S1 and an inner side surface and a lower surface of the first portion S1B are supported by the first inner wall portion 64 from the downward direction Z2 and the rightward direction Y1 (the inward direction). Further, the bent portion of the first leg portion S1 is also supported by the first inner wall portion 64 from the forward direction X1. Further, the upper surface of the first portion S1B is supported from the upward direction Z1 by the protruding end portion 44A13 of the first front end portion 44A1 of the slider 44.

On the other hand, an inner side surface and a lower surface of the tip end portion S2A of the second leg portion S2 are supported by the tip end portion from the downward direction Z2 and the leftward direction Y2 (the inward direction).

Further, an inner side surface of the main body portion S3 and an inner side surface of a connection portion between the second leg portion S2 and the main body portion S3 are supported by the second inner wall portion 66 from the inward direction.

At this time, the second claw portion 48C2 of the switching block 48, which pushes the driver 42 in the forward direction X1, moves in the upward direction Z1 by the second protrusion 46A2. As a result, since the switching block 48 moves on the driver 42, the driver 42 stops moving in the forward direction X1, and the first moving operation ends. At the same time, the ball biased in the upward direction Z1 from the hole formed in the base 46 is fitted into the recessed portion provided in the bottom surface of the driver 42 and functions as a stopper, and thus the movement of the driver 42 toward the forward direction X1 or the rearward direction X2 is restrained by a frictional force with the switching block 48.

The first protruded portion 44A11 and the second protruded portion 44A12 of the first front end portion 44A1 of the slider 44 approach a rear end of the first arm 22. In addition, the first surface 44A21 of the second front end portion 44A2 of the slider 44 approaches or comes into contact with the first rear end surface 32B1 of the second arm 32.

After the first moving operation ends, the motor 54 stops rotating by the control device. At this time, the user sets the first object G and the second object P at predetermined positions of the binding machine 10. In the present embodiment, the first object G is a string that functions as a guide element. Accordingly, the user inserts the string, which is the first object G, into the bent portion of the first leg portion S1. In the present embodiment, the second object P is a stem. Accordingly, the user inserts the stem, which is the second object P, into the region surrounded by the staple S. The portions of the binding machine 10 into which the first object G and the second object P are inserted may be referred to as a first insertion portion and a second insertion portion. In the present embodiment, the first object G is inserted into the bent portion of the first leg portion S1 supported by the first inner wall portion 64, and thus the first inner wall portion 64 corresponds to the first insertion portion. Further, the second object P is inserted into the recessed portion of the binding machine 10 provided to be recessed in the rearward direction X2 so as to be sandwiched by the first inner wall portion 64 and the second inner wall portion 66, and thus the recessed portion corresponds to the second insertion portion.

Figure 21A:
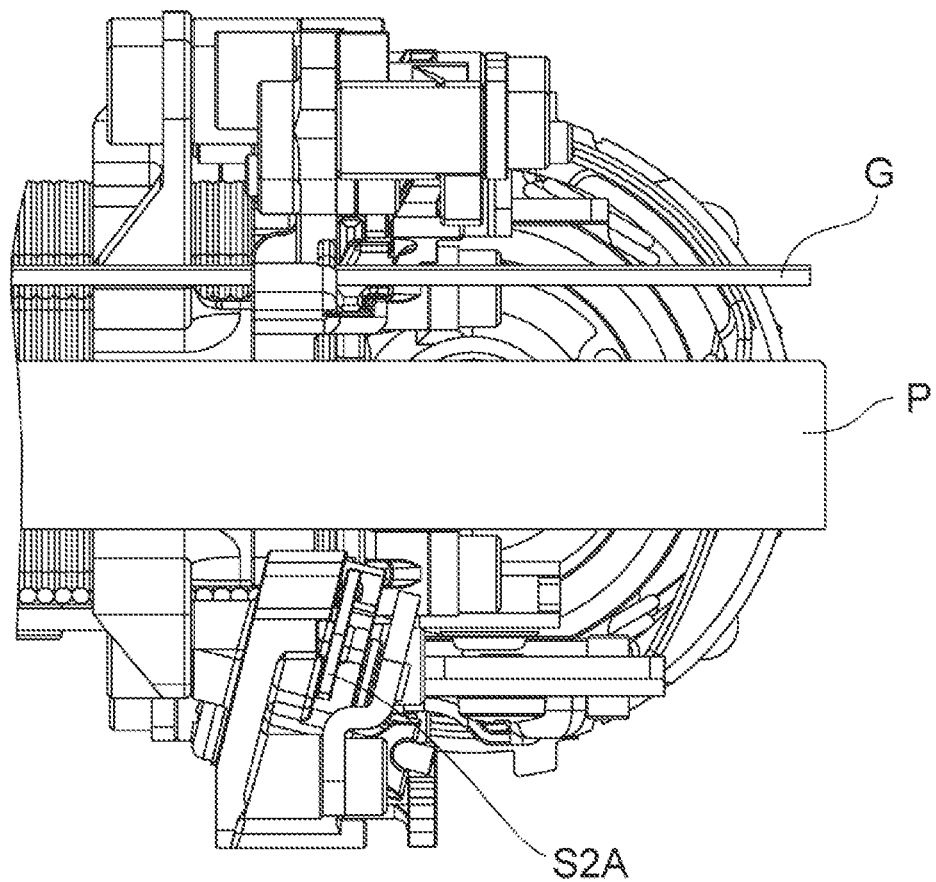
FIG. 21A is a partially enlarged view illustrating the front end portion of the binding machine in the front view when a user inserts a first object into a first insertion portion and inserts a second object into a second insertion portion.
Figure 21B:
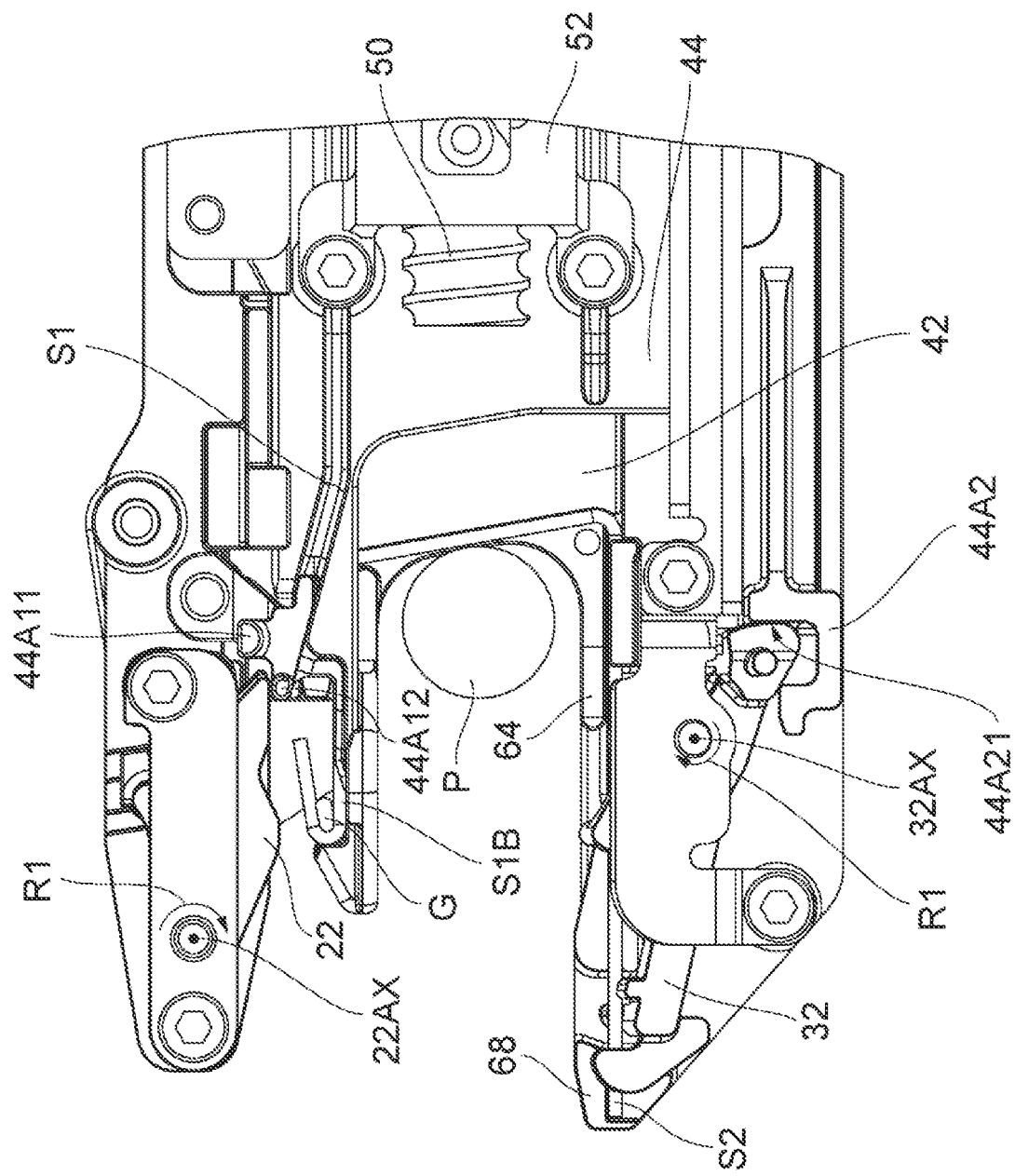
FIG. 21B is a partially enlarged view illustrating the front end portion of the binding machine in the top view when the user inserts the first object into the first insertion portion and inserts the second object into the second insertion portion.

FIGS. 21A and 21B are partially enlarged views illustrating the front end portion of the binding machine 10 in the front view and the top view when the user inserts the first object G into the first insertion portion and inserts the second object P into the second insertion portion, respectively.

Thereafter, when the user operates the switch, or when it is detected that the first object G and the second object P are inserted by sensors such as contact sensors respectively provided in the first insertion portion and the second insertion portion, the motor 54 starts rotating again. The motor 54 restarts rotating, and the ball screw 50 accordingly rotates clockwise, and thus the nut part 52 and the slider 44 fixed to the nut part 52 start moving in the forward direction X1. Since the switching block 48 advances on the driver 42, the driver 42 does not advance. Therefore, the second moving operation in which only the slider 44 of the driver 42 and the slider 44 advances is started.

Figure 22A:
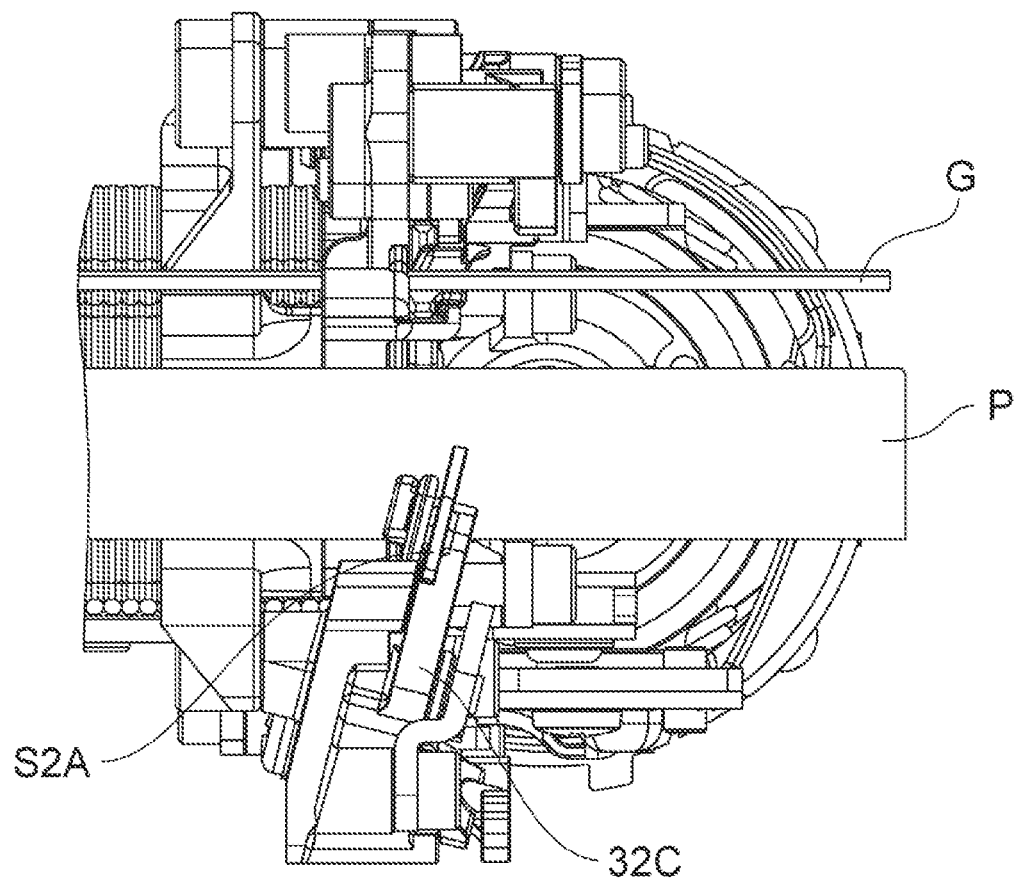
FIG. 22A is a partially enlarged view illustrating the front end portion of the binding machine in the front view when the slider restarts advancing after the first object and the second object are inserted.
Figure 22A:
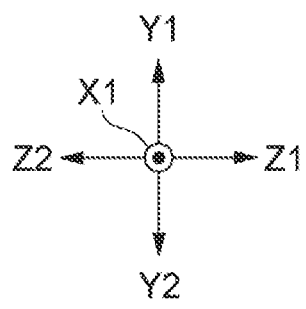

FIGS. 22A and 22B are partially enlarged views illustrating the front end portion of the binding machine 10 in the front view and the top view when the slider 44 further advances in the second moving operation, respectively. In the second moving operation, the driver 42 does not advance. Therefore, the inner side surface of the main body portion S3 of the staple S is supported by the first inner wall portion 64 and the second inner wall portion 66, and an outer side surface thereof is supported by the driver 42 and is static.

The first protruded portion 44A11 of the first front end portion 44A1 of the slider 44 comes into contact with the surface of the wall portion facing the rearward direction X2, which extends in a direction inclined to protrude in the downward direction Z2 with respect to the rear end portion of the first arm 22, and pushes the first arm 22 in the forward direction X1. The rotation shaft 22AX of the first arm 22 is provided at a position in the forward direction X1 and the outward direction (the leftward direction Y2) with respect to the first protruded portion 44A11 at this time. Therefore, the first arm 22 starts rotating in the first rotation direction R1. The wall portion of the rear end portion of the first arm 22 rotates in the first rotation direction R1 while passing through a region of a gap between the first protruded portion 44A11 and the second protruded portion 44A12. At this time, the first leg portion S1 is not plastically deformed by the first displacement portion 20.

On the other hand, the first surface 44A21 of the second front end portion 44A2 comes into contact with the first rear end surface 32B1 of the second arm 32, and pushes the second arm 32 in the forward direction X1. At this time, the rotation shaft 32AX of the second arm 32 is positioned in the forward direction X1 and the inward direction (the leftward direction Y2) with respect to the first rear end surface 32B1, and thus the second arm 32 also starts rotating in the first rotation direction R1. The second leg portion S2 vertically sandwiched by the two protruded portions of the main body portion 32C1 of the second arm 32 is bent toward the inward direction with the front end of the second inner wall portion 66 as a fulcrum.

At this time, the tip end portion S2A of the second leg portion S2 is supported from the inward direction by the wall surface of the support wall portion 68A of the tip end supporting portion 68 provided inside the second leg portion S2. Therefore, the second leg portion S2 is bent toward the inward direction of the staple S with the front end of the second inner wall portion 66 as a fulcrum, and at the same time, the tip end portion S2A of the second leg portion S2 is bent in the opposite direction (the outward direction) by passing through the support wall portion 68A while being in contact with the wall surface of the support wall portion 68A of the tip end supporting portion 68.

As described above, since the rotation shaft 32AX of the second arm 32 is inclined such that the second arm 32 advances in the inward direction as advancing in the downward direction Z2, the tip end portion S2A of the second leg portion S2 advances in the upward direction Z1 while approaching the first leg portion S1 as rotating in the first rotation direction R1.

In addition, a period during which the tip end portion S2A of the second leg portion S2 of the staple S and the wall surface of the support wall portion 68A are in contact with each other and a period during which the first surface 44A21 of the slider 44 and the first rear end surface 32B1 of the second arm 32 are in contact with each other overlap with each other in at least a partial period, and thus it is possible to generate a relatively large rotational moment at the time of high load.

Figure 23A:
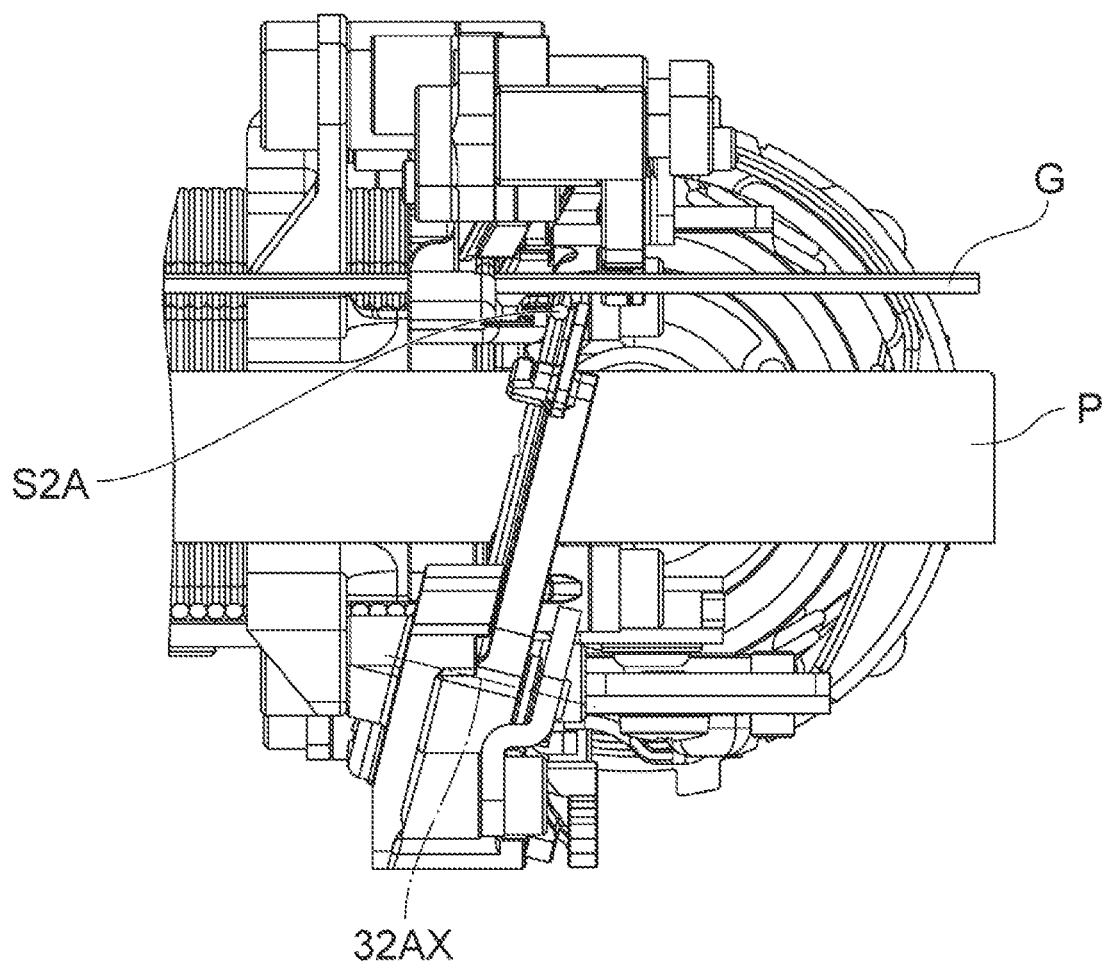
FIG. 23A is a partially enlarged view illustrating the front end portion of the binding machine in the front view when the slider advances and a second leg portion is deformed.
Figure 23A:
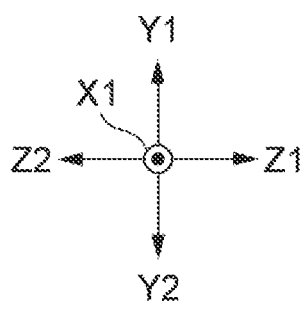
Figure 23B:
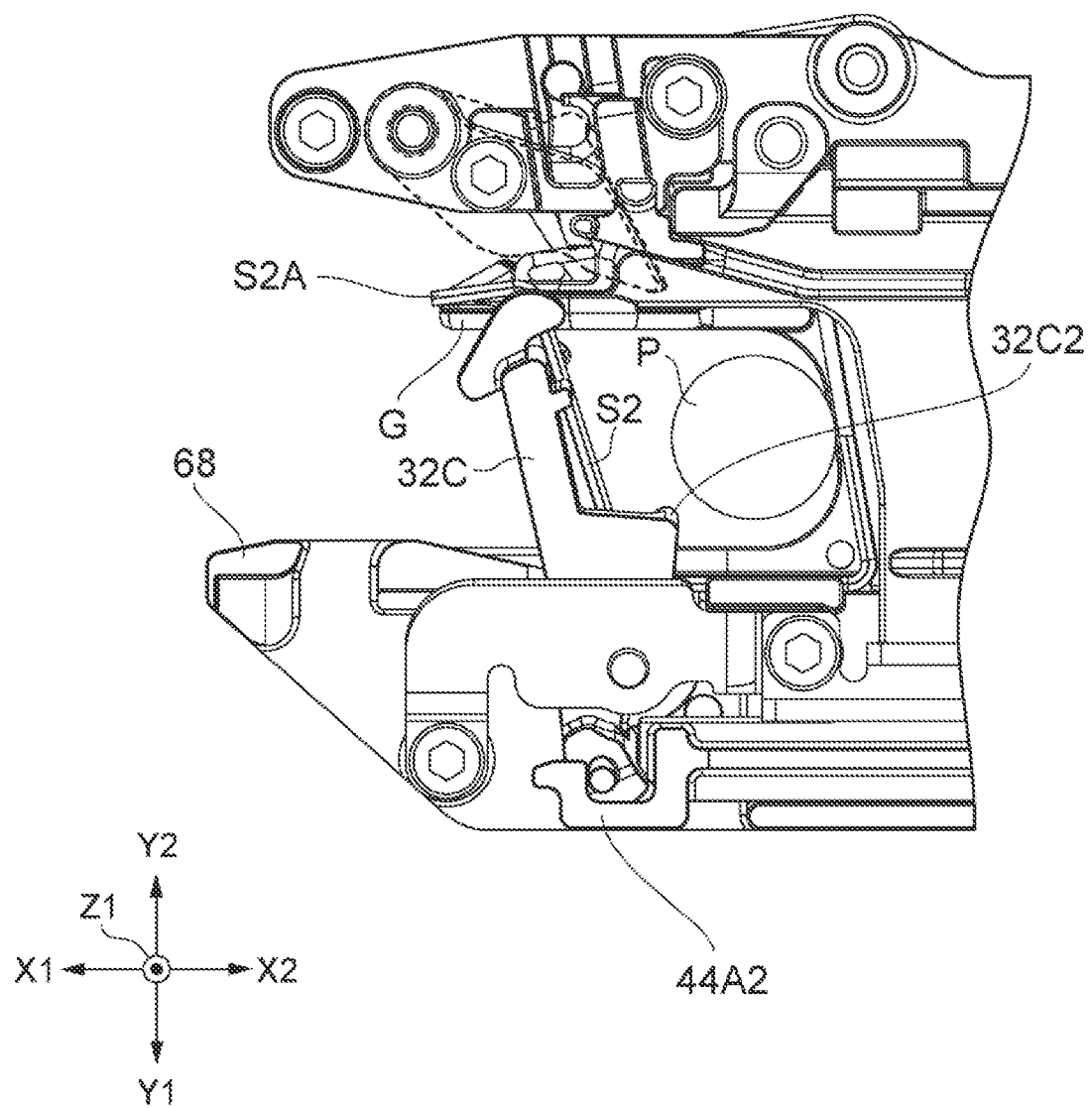
FIG. 23B is a partially enlarged view illustrating the front end portion of the binding machine in the top view when the slider advances and the second leg portion is deformed.

FIGS. 23A and 23B are partially enlarged views illustrating the front end portion of the binding machine 10 in the front view and the top view when the slider 44 further advances in the second moving operation, respectively.

The first arm 22 further rotates in the first rotation direction R1 by being pushed by the first protruded portion 44A11 of the first front end portion 44A1 of the slider 44. At this time, since the protruding end portion 44A13 of the first front end portion 44A1 of the slider 44 reaches the front end of the first inner wall portion 64, the slider 44 presses the upper surface of the first portion S1B of the first leg portion S1 from the upward direction Z1. Therefore, the first portion S1B of the first leg portion S1 is supported by the slider 44 and the first inner wall portion 64 from the upward direction Z1, the downward direction Z2, and the inward direction.

The second rear end surface 32B2 of the second arm 32 further rotates in the first rotation direction R1 by being pushed by the second surface 44A22 of the second front end portion 44A2 of the slider 44. As illustrated in FIG. 23B, since the second leg portion S2 held by the second arm 32 is bent to the position at which the second leg portion S2 intersects the first leg portion S1, the opening provided in the staple S before the binding is closed in the top view, and the first leg portion S1, the second leg portion S2, and the main body portion S3 of the staple S surround the second object P in the top view. In the front view illustrated in FIG. 23A, the tip end portion S2A of the second leg portion S2 moves in the upward direction Z1 and approaches the first object G.

Further, the second surface 44A22 of the slider 44 and the second rear end surface 32B2 of the second arm 32 are in contact with each other after the period during which the tip end portion S2A of the second leg portion S2 of the staple S and the support wall portion 68A are in contact with each other elapses, and thus it is possible to generate a relatively small rotational moment at the time of relatively low load.

Figure 24A:
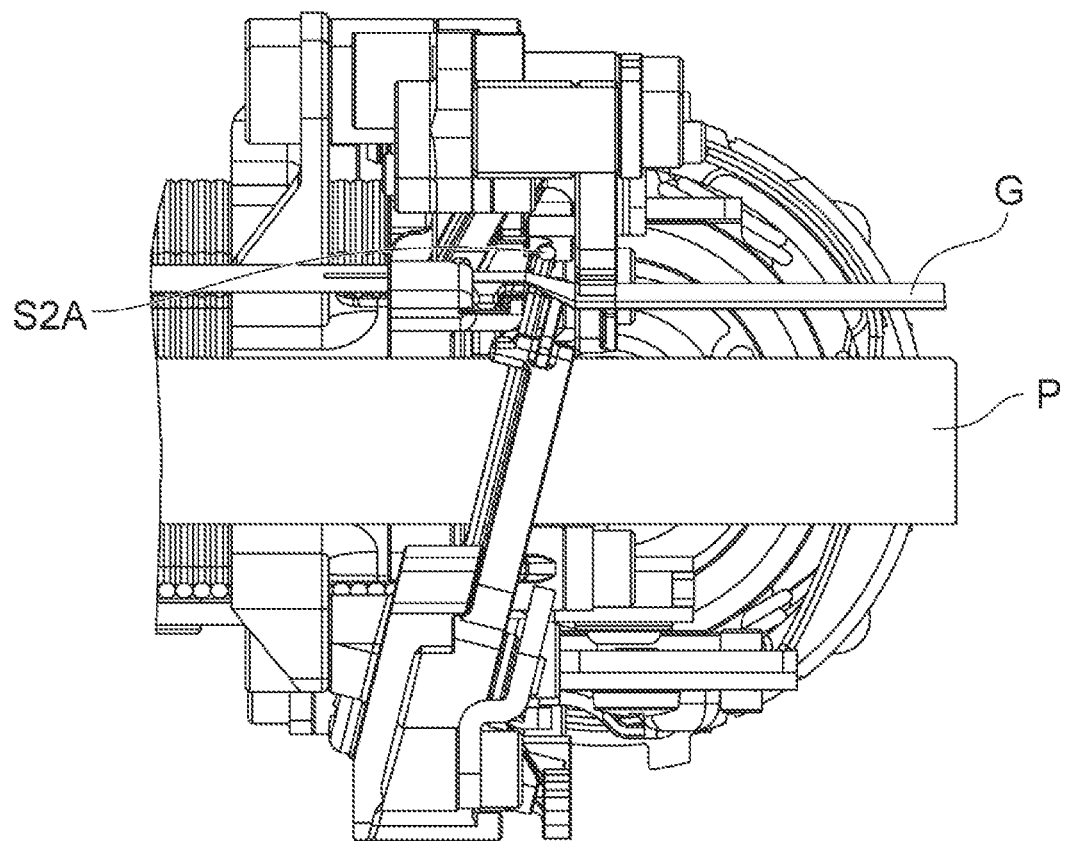
FIG. 24A is a partially enlarged view illustrating the front end portion of the binding machine in the front view immediately before the slider most advances.
Figure 24B:
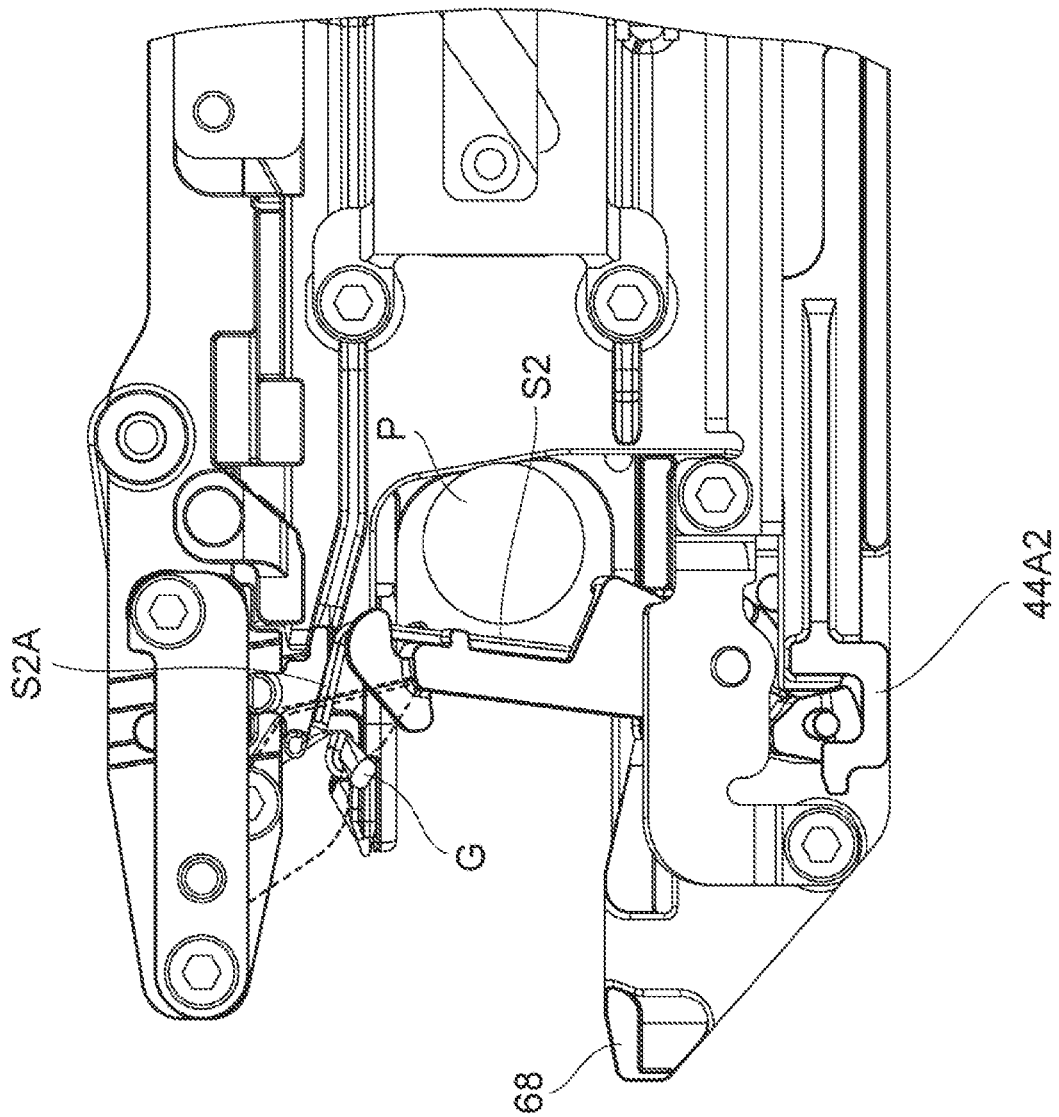
FIG. 24B is a partially enlarged view illustrating the front end portion of the binding machine in the top view immediately before the slider most advances.

FIGS. 24A and 24B are partially enlarged views illustrating the front end portion of the binding machine 10 in the front view and the top view immediately before the slider 44 most advances in the second moving operation, respectively.

The first arm 22 further rotates in the first rotation direction R1 by being pushed by the first protruded portion 44A11 of the first front end portion 44A1 of the slider 44, comes into contact with the first object G, and pushes and displaces the first object G. Further, the protruded portion 22C of the first arm 22 protruding in the downward direction Z2 is in contact with the recessed portion 24A provided at the tail end of the contact member 24. Therefore, as the protruded portion 22C of the first arm 22 rotates, the contact member 24 starts advancing in the direction inclined toward the inward direction of the staple S and the downward direction Z2. First, the contact surface 24B of the contact member 24 comes into contact with the tip end portion S1A of the first leg portion S1, and then the corner portion 24C of the contact member 24 comes into contact with the tip end portion S1A of the first leg portion S1, and plastically deforms the tip end portion to fold back. The tip end portion S1A of the first leg portion S1 folded back by the contact member 24 passes through the downward direction Z2 with respect to the first portion S1B and is bent to intersect the first portion S1B in the top view. As illustrated in FIG. 14 corresponding to a cross-sectional view at the position at which the first portion S1B intersects the tip end portion S1A, the tip end portion S1A can be plastically deformed such that the first portion S1B (the upward direction) and the tip end portion S1A (the downward direction) are vertically adjacent to each other. At this time, the tip end of the contact member 24 and the tip end of the second leg portion S2 are formed in the first inner wall portion 64 and enter the inside of the through hole communicating with the region surrounded by the staple S in the top view. As illustrated in FIGS. 24A and 24B, since the first portion S1B is surrounded by the slider 44 and the first inner wall portion 64 from the upward direction, the downward direction (excluding the portions through which the folded-back tip end portion S1A and the contact member 24 pass), and the inward direction, the bending thereof is restrained.

According to the above process, the first leg portion S1 sandwiches the first object G. Since the first leg portion S1 is plastically deformed, the first leg portion S1 and the first object G are less likely to be disengaged from each other.

On the other hand, the second rear end surface 32B2 of the second arm 32 further rotates in the first rotation direction R1 by being pushed by the second surface 44A22 of the second front end portion 44A2 of the slider 44. Therefore, the second leg portion S2 approaches the second object P beyond the first object G in the top view.

Thereafter, the motor 54 rotates the ball screw 50 counterclockwise, and thus the slider 44 starts retracting.

Figure 25A:
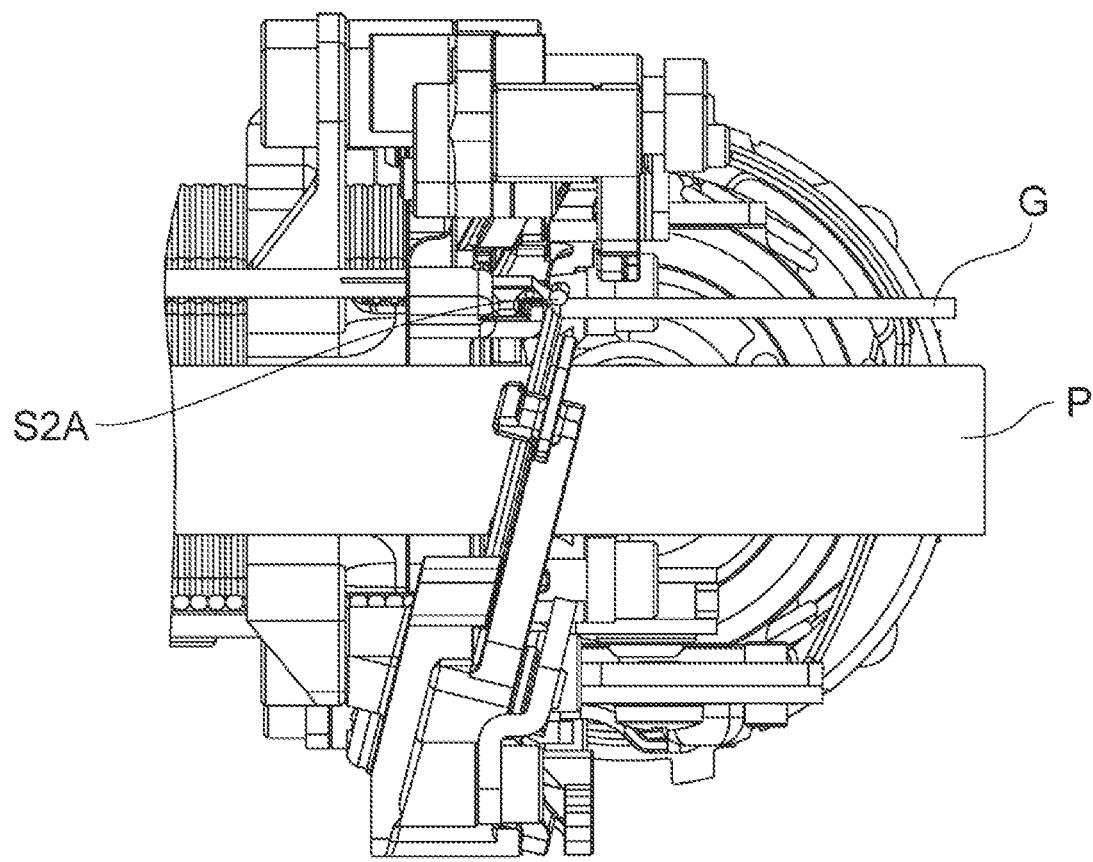
FIG. 25A is a partially enlarged view and an enlarged perspective view of the front end portion of the binding machine in the front view after the slider starts retracting.
Figure 25C:
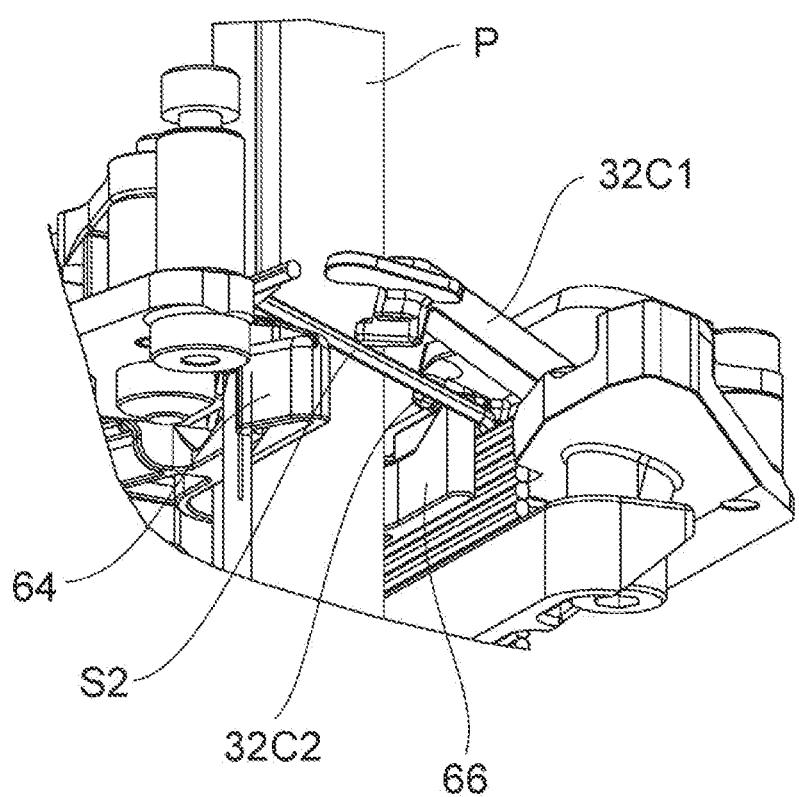
FIG. 25C is a partially enlarged perspective view of the front end portion of the binding machine after the slider starts retracting.

FIGS. 25A, 25B, and 25C are partially enlarged views and a partially enlarged perspective view of the front end portion of the binding machine 10 in the front view and the top view after the slider 44 starts retracting.

When the slider 44 starts retracting, the second protruded portion 44A12 of the first front end portion 44A1 of the slider 44 comes into contact with a surface of the wall portion of the first arm 22 facing the forward direction X1 and pushes the wall portion in the rearward direction X2, the wall portion of the first arm 22 moves to penetrate through the region between the first protruded portion 44A11 and the second protruded portion 44A12, and thus the first arm 22 is rotated in the second rotation direction R2.

Further, the third surface of the second front end portion 44A2 of the slider 44 comes into contact with the rear end portion of the second arm 32 and pushes the second arm 32 in the rearward direction X2, and thus the second arm 32 is rotated in the second rotation direction R2. When the second arm 32 rotates in the second rotation direction R2, the protrusion 32C2 for bending back of the second arm 32, which is provided to protrude in the downward direction Z2 at the position advanced in the first rotation direction R1 with respect to the main body portion S3, comes into contact with the second leg portion S2 and pushes the second leg portion S2 in the second rotation direction R2. Therefore, the second leg portion S2 is displaced in the second rotation direction R2, and as a result, the bent portion of the second leg portion S2 is engaged with the first object G. As illustrated in FIG. 25A, the second leg portion S2 is engaged with the first object G, and thus the first object G is displaced, and the tension is generated between the engagement position of the first object G with the first leg portion S1 and an engagement position of the second object P with the second leg portion S2. Therefore, the first object G is bent, and it is possible to restrain the first object G and the second leg portion S2 from being disengaged from each other.

Figure 26A:
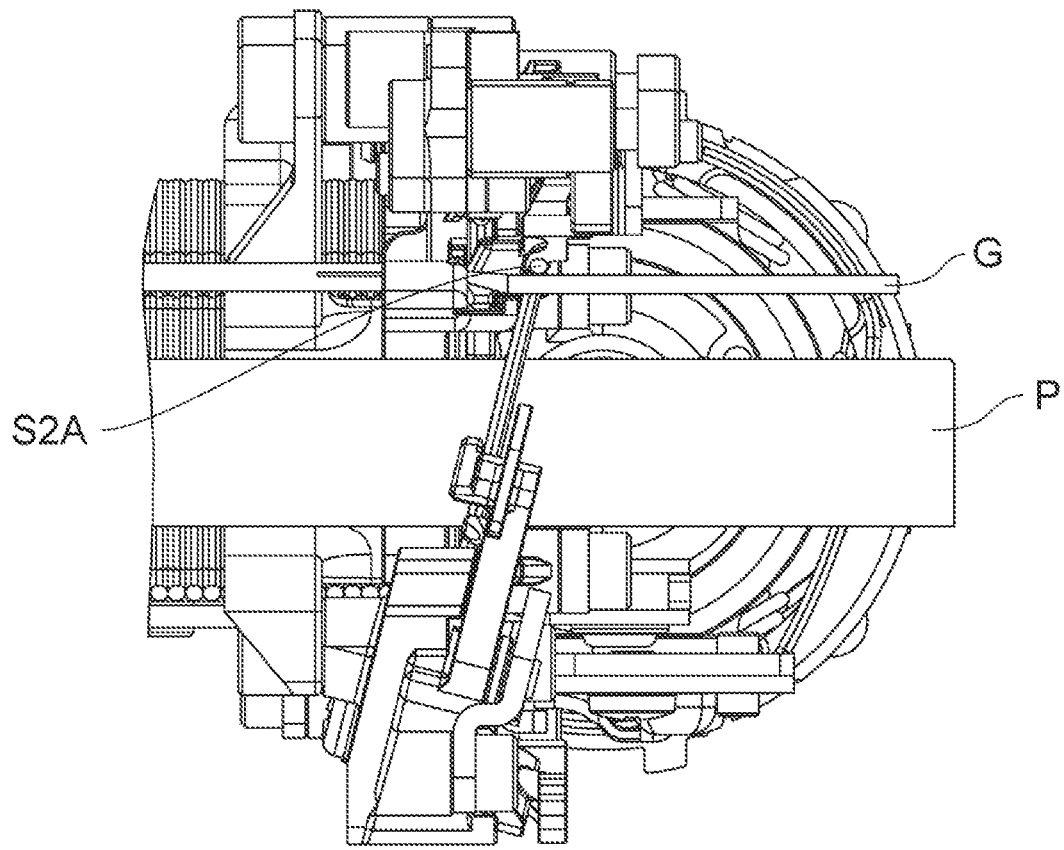
FIG. 26A is a partially enlarged view and an enlarged perspective view of the front end portion of the binding machine in the front view when the slider further retracts.
Figure 26B:
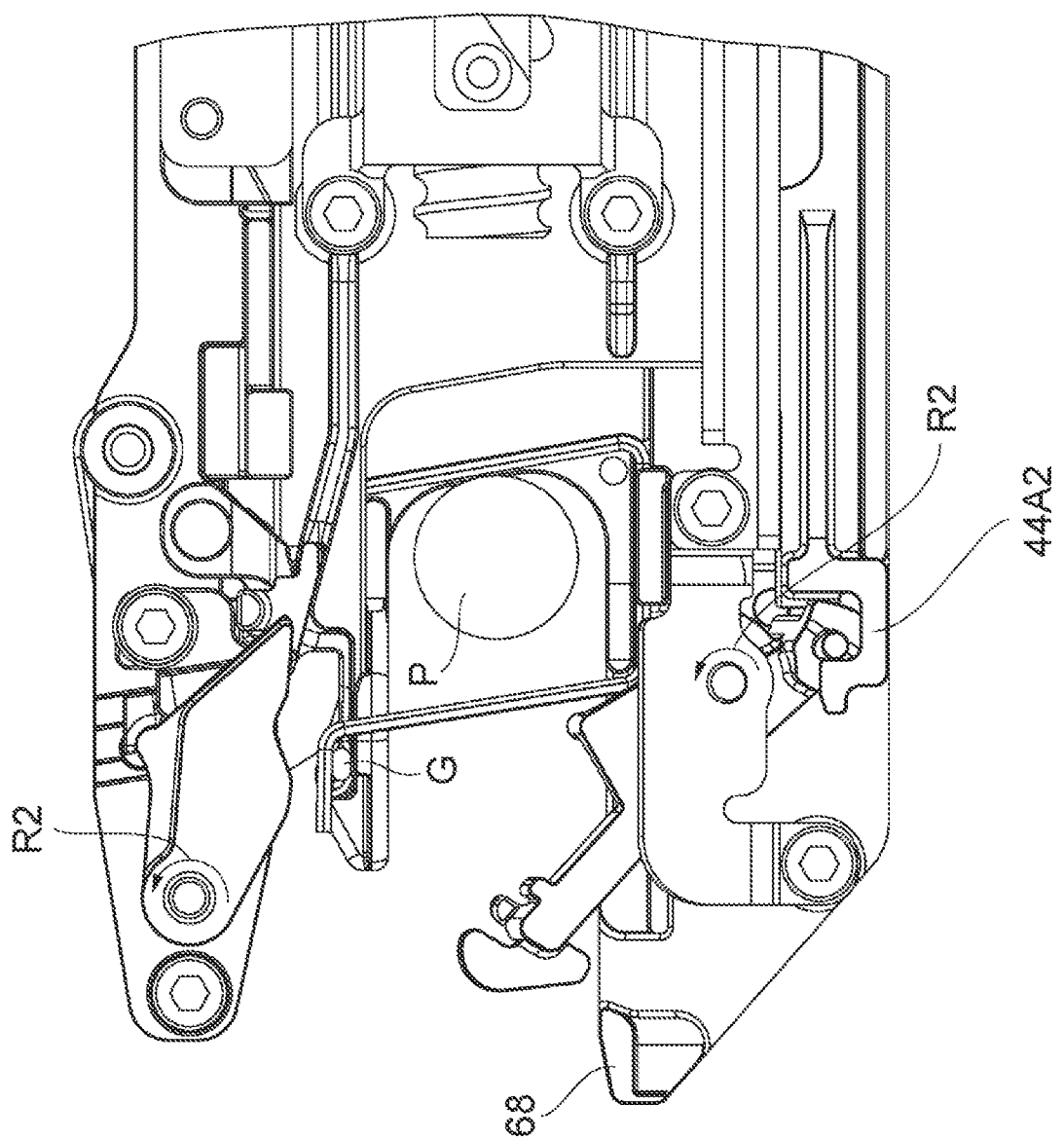
FIG. 26B is a partially enlarged view and an enlarged perspective view of the front end portion of the binding machine in the top view when the slider further retracts.
Figure 26C:
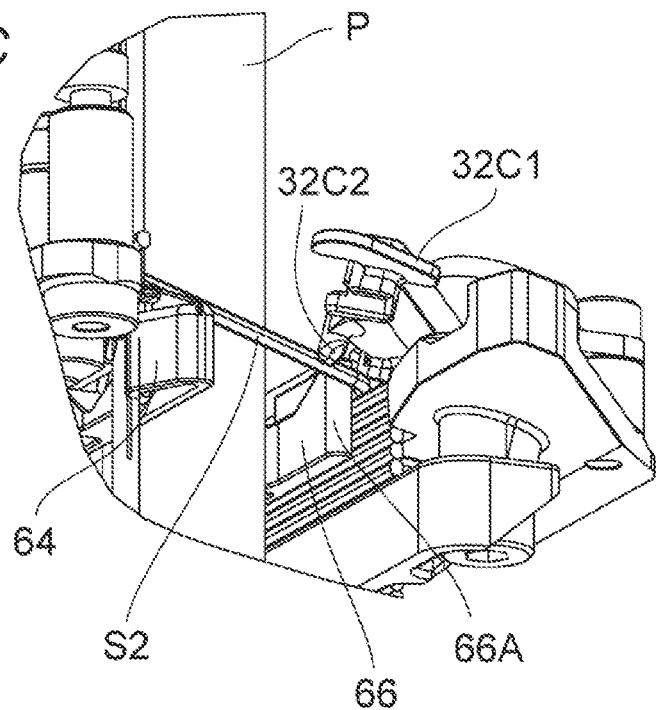
FIG. 26C is a partially enlarged perspective view of the front end portion of the binding machine when the slider further retracts.

FIGS. 26A, 26B, and 26C are partially enlarged views and a partially enlarged perspective view of the front end portion of the binding machine 10 in the front view and the top view when the slider 44 further retracts.

The second protruded portion 44A12 of the first front end portion 44A1 of the slider 44 pushes the surface of the wall portion of the first arm 22 facing the forward direction X1 in the rearward direction X2 while being in contact with the surface, the wall portion of the first arm 22 moves to penetrate through the region between the first protruded portion 44A11 and the second protruded portion 44A12, and thus the first arm 22 is further rotated in the second rotation direction R2.

When the first arm 22 further rotates in the second rotation direction R2 and rotates to an initial position illustrated in FIG. 21B from this state, the ball member biased by the elastic member is fitted into a recessed portion provided in a lower surface of the first arm 22. Therefore, the first arm 22 is held at the initial position.

The third surface of the second front end portion 44A2 of the slider 44 pushes the surface of the rear end portion of the second arm 32 facing the forward direction X1 in the rearward direction X2 while being in contact with the surface, and thus the second arm 32 is further rotated in the second rotation direction R2. Since the second leg portion S2 is engaged with the first object G, the protrusion 32C2 for bending back of the second arm 32 cannot further displace the second leg portion S2 in the second rotation direction R2. Therefore, the protrusion 32C2 for bending back of the second arm 32 moves over the second leg portion S2 while slightly pushing down the second leg portion S2 in the downward direction Z2. As illustrated in FIG. 26C, the binding machine 10 has a configuration in which the biasing force toward the upward direction Z1 by the pusher 16 is applied to the staple S via the staple S in the downward direction Z2, and thus the protrusion 32C2 for bending back moves over the second leg portion S2 against the biasing force.

When the second arm 32 further rotates in the second rotation direction R2 and rotates to the initial position illustrated in FIG. 21B from this state, the ball member biased by the elastic member is fitted in a recessed portion provided in a lower surface of the second arm 32. Therefore, the second arm 32 is held at the initial position.

After the binding operation ends, when the motor 54 further rotates the ball screw 50 counterclockwise, the second claw portion 48C2 of the switching block 48 moves in the downward direction Z2 while moving in the rearward direction X2 along the inclined surface of the second protrusion 46A2 provided on the base 46, and thus the first claw portion 48C1, the second claw portion 48C2, and the third claw portion 48C3 of the switching block 48 are respectively inserted into the regions inside the first groove 42G1, the second groove 42G2, and the third groove 42G3. At this time, the first arm 22 and the second arm 32 approximately return to positions in the initial state. In addition, when the motor 54 rotates the ball screw 50 counterclockwise, the switching block 48 moves in the rearward direction X2, and the rear surface of the second claw portion 48C2 of the switching block 48 comes into contact with the side surface of the second groove 42G2 facing the forward direction X1. Therefore, the switching block 48 moves the driver 42 in the rearward direction X2 by the rear surface of the second claw portion 48C2 while pressing the surface of the base 46 in the downward direction Z2 by the elastic member 49. Therefore, the driver 42 can be returned to the position in the initial state.

According to the above process, the second leg portion S2 is engaged with the first object G. As described above, since the second leg portion S2 is engaged with the first object G in a state in which the second leg portion S2 has passed (penetrated) through the gap between the first object G and the second object P in the top view, the second object P is surrounded by the staple S. Therefore, the second object P and the staple S are restrained from being easily disengaged from each other. Further, even when the second object P grows and the second leg portion S2 is bent, the engagement with the first object G is strengthened, and thus the first object G and the staple S are also restrained from being easily disengaged from each other.

However, the binding machine 10 according to the present embodiment can be modified. For example, the first displacement portion 20 may plastically deform the tip end portion S1A of the first leg portion S1 by the first arm 22 without using the contact member 24. For example, a part obtained by integrating the first arm 22 and the contact member 24 may be provided, and the tip end portion S1A of the first leg portion S1 may be plastically deformed by rotating the part. At this time, by providing the first arm 22 such that the rotation shaft 22AX of the first arm 22 is inclined and the first arm 22 descends as rotating in the first rotation direction R1, the first arm 22 may have a configuration in which the tip end portion passes under the first portion S1B. On the contrary, by providing the first arm 22 such that the first arm 22 rises as rotating in the first rotation direction R1, the first arm 22 may have a configuration in which the tip end portion passes above the first portion S1B. For example, the tip end portion S1A of the first leg portion S1 folded back by the contact member 24 may pass through the upward direction Z1 with respect to the first portion S1B and may be bent to intersect the first portion S1B in the top view. On the other hand, the second leg portion S2 may be bent to advance in the downward direction Z2 separated from the plane PL penetrating through the second leg portion S2 and the main body portion S3.

Second Embodiment

Hereinafter, a detailed configuration of a binding machine 100 according to the present embodiment will be described. The description of the same or similar configurations and functions will be omitted or simplified by using the same or similar names or reference numerals, and different parts will be mainly described.

Configuration of Staple S0

Figure 27:
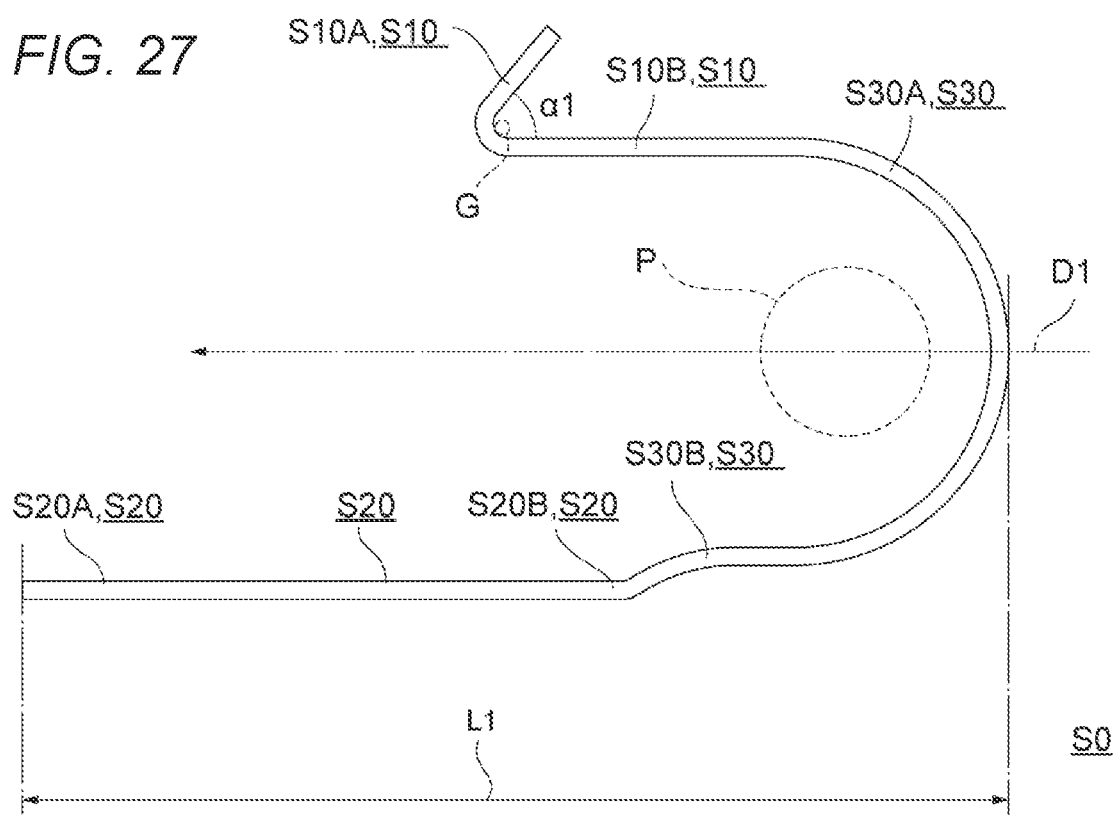
FIG. 27 is a diagram illustrating an example of the staple before the binding in the top view.

FIG. 27 illustrates a staple S0 according to the present embodiment before binding.

The staple S0 is in common with the staple S in that the staple S0 includes a first leg portion S10, a second leg portion S20, and a main body portion S30 connecting the first leg portion S10 and the second leg portion S20. Similar to the staple S, in a state before the binding, the first leg portion S10 and the second leg portion S20 of the staple S0 are separately provided, and thus an opening is provided between the first leg portion S10 and the second leg portion S20. A direction from a closed portion of the main body portion S30 toward the opening (a leftward direction of a paper surface in FIG. 27) is referred to as the opening direction D1. When the staple S0 is set in the binding machine 100, the opening direction D1 of the staple S0 coincides with the forward direction X1. Therefore, the user can insert the second object P into the staple S0 through the opening.

The first leg portion S10 is a portion including one end portion of the staple S0, and includes a first portion S10B extending in the opening direction D1 and a tip end portion S10A bent from the first portion S10B and extending outward or in an outward direction. An angle formed by the first portion S10B and the tip end portion S10A is referred to as the bending angle α1, and a portion of the tip end portion S10A that is bent to be connected to the first portion S10B is referred to as the bent portion. In the present embodiment, the bending angle α1 is 90 degrees or less, and is preferably an acute angle less than 90 degrees.

The second leg portion S20 is a portion including the other end portion of the staple S0, and includes a second portion extending in the opening direction D1. In a bound state, the second leg portion S20 is bent to intersect the first leg portion S10 and closes the opening in a top view. Accordingly, the second leg portion S20 according to the present embodiment is formed to be longer than a width of the opening, that is, a distance between the first leg portion S10 and the second leg portion S20. In addition, the second leg portion S20 is formed to be longer than the first leg portion S10.

The main body portion S30 is a portion connecting the first leg portion S10 and the second leg portion S20. The main body portion S30 according to the present embodiment includes a curved portion S30A curved to protrude in the outward direction, and a curved portion S30B curved to protrude in an inward direction. A length of the curved portion S30A is larger than a length of the curved portion S30B, and a curvature of the curved portion S30A is larger than a curvature of the curved portion S30B. The curved portion S30A is connected to the first portion S10B of the first leg portion S10 and is curved to protrude toward the outward direction at one end, and is connected to the curved portion S30B at the other end. The curved portion S30B is connected to the curved portion S30A and is curved to protrude toward the inward direction at one end, and is connected to the second leg portion S20 at the other end.

A shape of the staple is not limited to the staple S0, and each of the first leg portion S10, the second leg portion S20, and the main body portion S30 may include one or more side portions and one or more curved portions.

Furthermore, for convenience, in the present embodiment, a portion including one end portion of the staple S0 is referred to as the first leg portion S10, and a portion including the other end portion is referred to as the second leg portion S20. However, the "first leg portion" according to the present disclosure is not limited to the first leg portion described in embodiments, and the "second leg portion" according to the present disclosure is not limited to the second leg portion described in the embodiments. For example, in the present disclosure, the second leg portion S20 may be referred to as a first leg portion, and the first leg portion S10 may be referred to as a second leg portion.

The staple S0 binds the first object G and the second object P by being bent in the same manner as the staple S. The tip end portion S10A of the first leg portion S10 of the staple S0 is bent by a first displacement portion 200 (FIG. 30) of the binding machine 100 to be engaged with the first object G sandwiched by the first leg portion S10. The second leg portion S20 of the staple S0 is bent by a second displacement portion 300 of the binding machine 100 to close the opening of the staple S0 while surrounding the second object P in the top view. At the same time, the tip end portion S20A of the second leg portion S20 is bent in the outward direction by the second displacement portion 300 of the binding machine 100 so as to be engageable with the first object G. In this way, since both the tip end portion S10A and the tip end portion S20A of the staple S0 are engaged with the first object G while the second object P is surrounded by using the staple S0, it is possible to bind the first object G and the second object P.

The inventors of the present application have focused on the fact that at the time of binding using a binding machine, a magazine for accommodating staples may come into contact with an object and damage the object. In particular, when an object to be bound is a soft plant or the like, if the object is damaged, the value may be impaired. Therefore, the user of the binding machine needs to bind while changing an angle, position, and the like of the binding machine so that the magazine does not come into contact with the object. However, since plants and the like have individual differences, the user needs to change the angle, position, and the like of the binding machine in accordance with a size and shape of the object every time the binding is performed. When the angle, position, or the like of the heavy binding machine is changed every time the binding is performed, a large load is imposed on the user, and as a result, the work efficiency (binding efficiency) decreases.

Therefore, the binding machine 100 (FIGS. 28 to 30 and the like) according to the present embodiment moves the staple S0 toward the forward direction X1 of a magazine 140 by including the magazine 140 capable of accommodating or holding a plurality of staples S0 stacked in the up-down direction and a driver 420 separating the staple S0 positioned at the upper end from another staple S0 and moves the staple S0 to the forward direction X1. Further, the binding machine 100 may bind at a predetermined position in the forward direction X1 with respect to the magazine 140 by including a displacement portion that displaces the staple S0 moved to the predetermined position (binding position) in the forward direction X1. The details will be described below.

Configuration of Binding Machine 100

Hereinafter, the configuration of the binding machine 100 according to the present embodiment will be described focusing on a difference from the binding machine 10. Since the binding machine 100 is different from the binding machine 10 in the configuration related to the magazine 140, this point will be mainly described.

Figure 28:
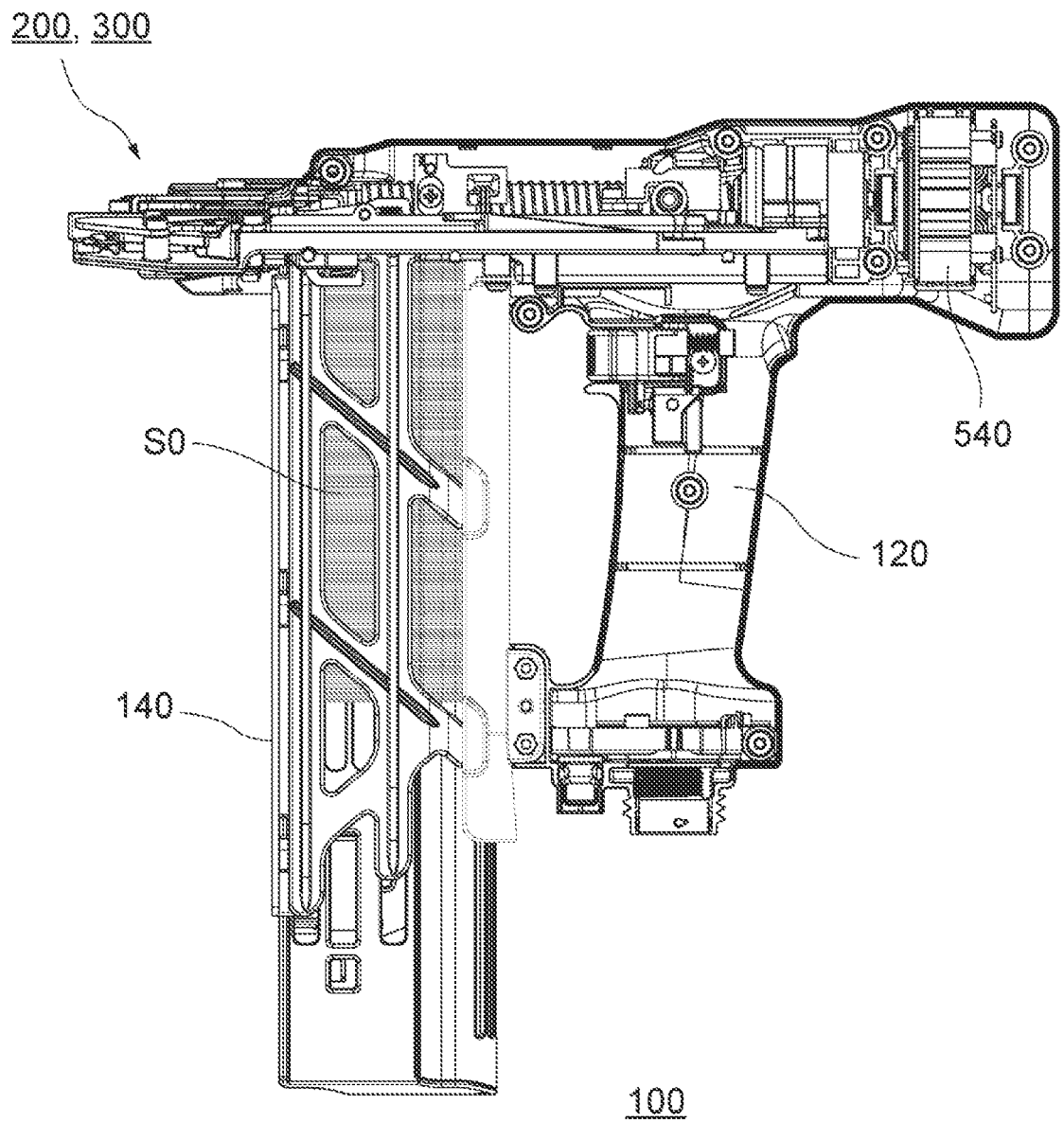
FIG. 28 is a cross-sectional view of a binding machine according to an embodiment in the right side view.
Figure 29:
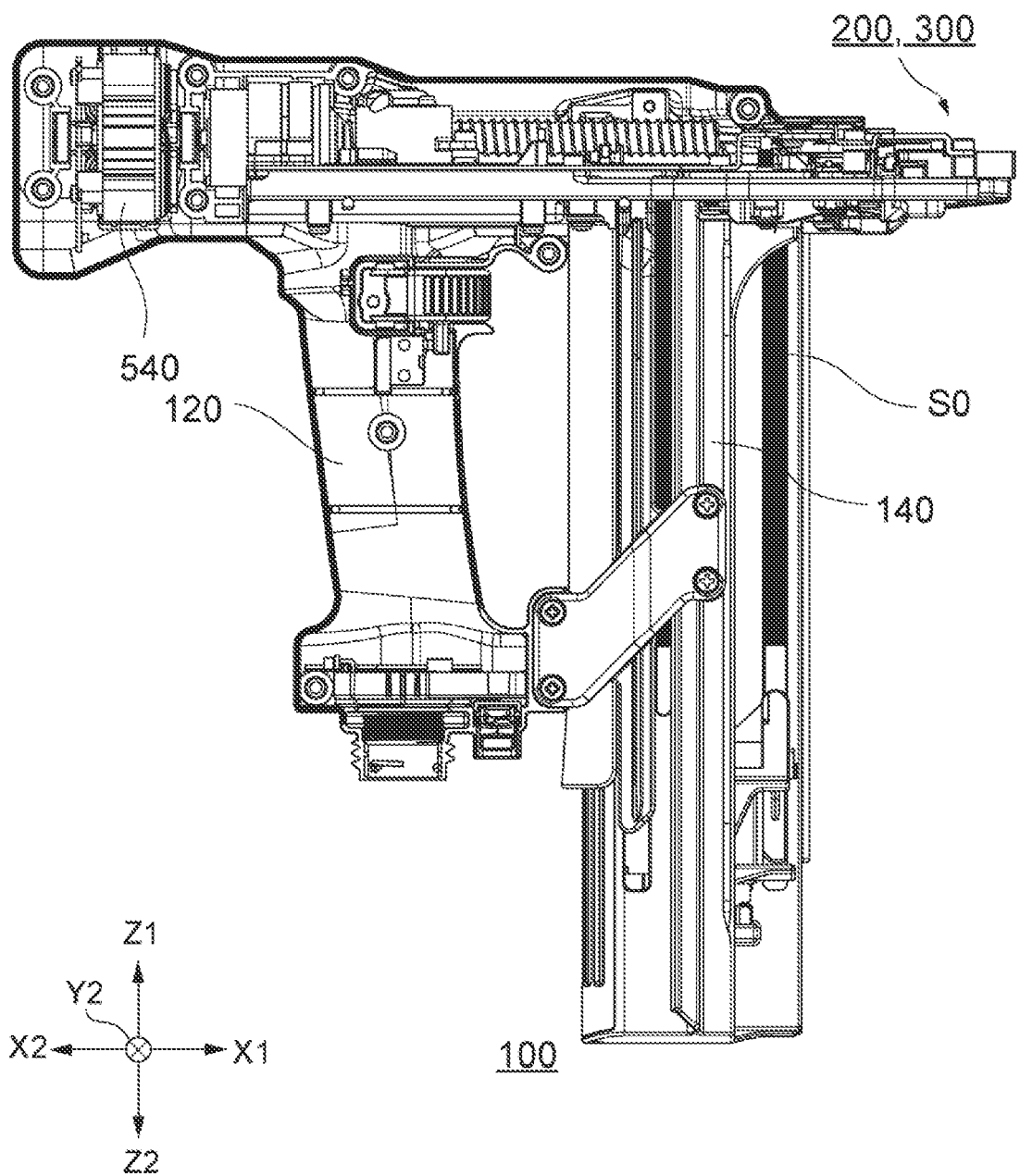
FIG. 29 is a cross-sectional view of the binding machine according to the embodiment in a left side view.
Figure 30:
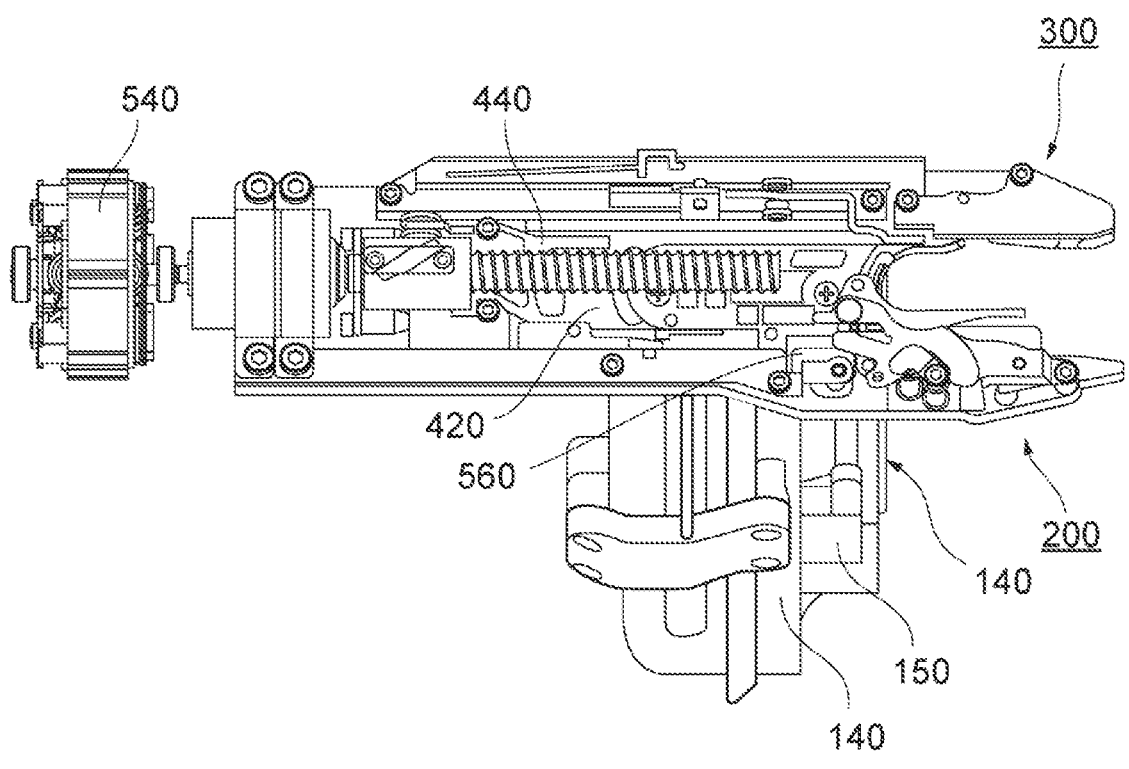
FIG. 30 is a perspective view of the binding machine according to the embodiment as viewed obliquely in an upward direction.

FIG. 28 is a cross-sectional view of the binding machine 100 in a right side view, FIG. 29 is a cross-sectional view of the binding machine 100 in a left side view, and FIG. 30 is a perspective view of the binding machine 100 as viewed obliquely in an upward direction (however, in order to make the description easier to understand, configurations not described in the description (for example, a housing of the binding machine 100 in FIG. 30) may be omitted in the following drawings).

Similar to the binding machine 10, the binding machine 100 binds the first object G and the second object P by using the staple having the formed opening. Here, since the first object G and the second object P are the same as the first object G and the second object P described in the first embodiment, the description thereof is omitted. The first object G is, for example, a string that functions as a guide element, and the second object P is, for example, a plant. Similar to the binding machine 10, the binding machine 100 displaces the first leg portion S10 of the staple S0 so as to engage with the first object G, and displaces the second leg portion S20 so as to engage with the first object G while surrounding the second object P in the top view. As a result, since the movement of the second object P with respect to the first object G is restricted, it is possible to bind the first object G and the second object P.

In order to displace the staple S0 in this manner, the binding machine 100 includes the first displacement portion 200 (FIG. 29) that displaces the first leg portion S10 of the staple S0 so as to be engageable with the first object G, and the second displacement portion 300 that displaces the second leg portion S20 of the staple S0 so as to be engageable with the first object G. The second displacement portion 300 displaces the second leg portion S20 to engage the tip end portion S20A of the second leg portion S20 with the first object G in a state in which the second object P is surrounded by the first leg portion S10, the second leg portion S20, and the main body portion S30 of the staple S0.

Specifically, the binding machine 100 includes a grip 120 (FIG. 28) for the user to grasp, the magazine 140 that can accommodate a plurality of staples S0 stacked in the up-down direction, a pusher 150 (may be referred to as an "upward-movement means" for moving the staple in the upward direction) for moving the staple S0 positioned at an upper end in the forward direction X1 by biasing the plurality of staples S0 accommodated in the magazine 140 toward the upward direction Z1, and then moving other staples S0 in the upward direction Z1, a driver 420 (FIG. 30) that pushes the staple S0 positioned at the upper end toward the forward direction X1 to separate the staple S0 positioned at the upper end from the another staple S0 and move the staple S0 in the forward direction X1, a motor 540 and a movement mechanism for executing a first moving operation of moving both the driver 420 and a slider 440 in the forward direction X1 and a second moving operation of moving only the slider 440 of the driver 420 and the slider 440 in the forward direction X1, the first displacement portion 200 (an example of the "displacement portion") for displacing the first leg portion S10 of the staple S0 by providing a first arm that rotates in contact with the slider 440 that advances in the second moving operation, the second displacement portion 300 (an example of the "displacement portion") for displacing the second leg portion S20 of the staple S0 by providing a second arm that rotates in contact with the slider 440 that advances in the second moving operation, and a detachment portion 560 that provides a movement path for the staple S0 separated from the another staple S0 and moving in the forward direction X1.

Here, it will be understood by a person skilled in the art that the respective configurations of the grip 120, the pusher 150, the driver 420, the slider 440, the motor 540 for moving the driver 420 and the slider 440 and the movement mechanism for executing the first moving operation and the second moving operation, the first displacement portion 200, the second displacement portion 300, and the detachment portion 560, which are provided in the binding machine 100, are the same as or similar to the corresponding configurations of the grip 12, the pusher 16, the driver 42, the slider 44, the motor 54 for moving the driver 42 and the slider 44 and the movement mechanism for executing the first moving operation and the second moving operation, the first displacement portion 20, the second displacement portion 30, and the detachment portion 56, which are described in the first embodiment and are provided in the binding machine 10, and thus the respective configurations can be implemented, and the detailed description thereof is omitted.

Configuration of Magazine 140

Hereinafter, the detailed configuration of the magazine 140 according to the present embodiment will be described.

Figure 31A:
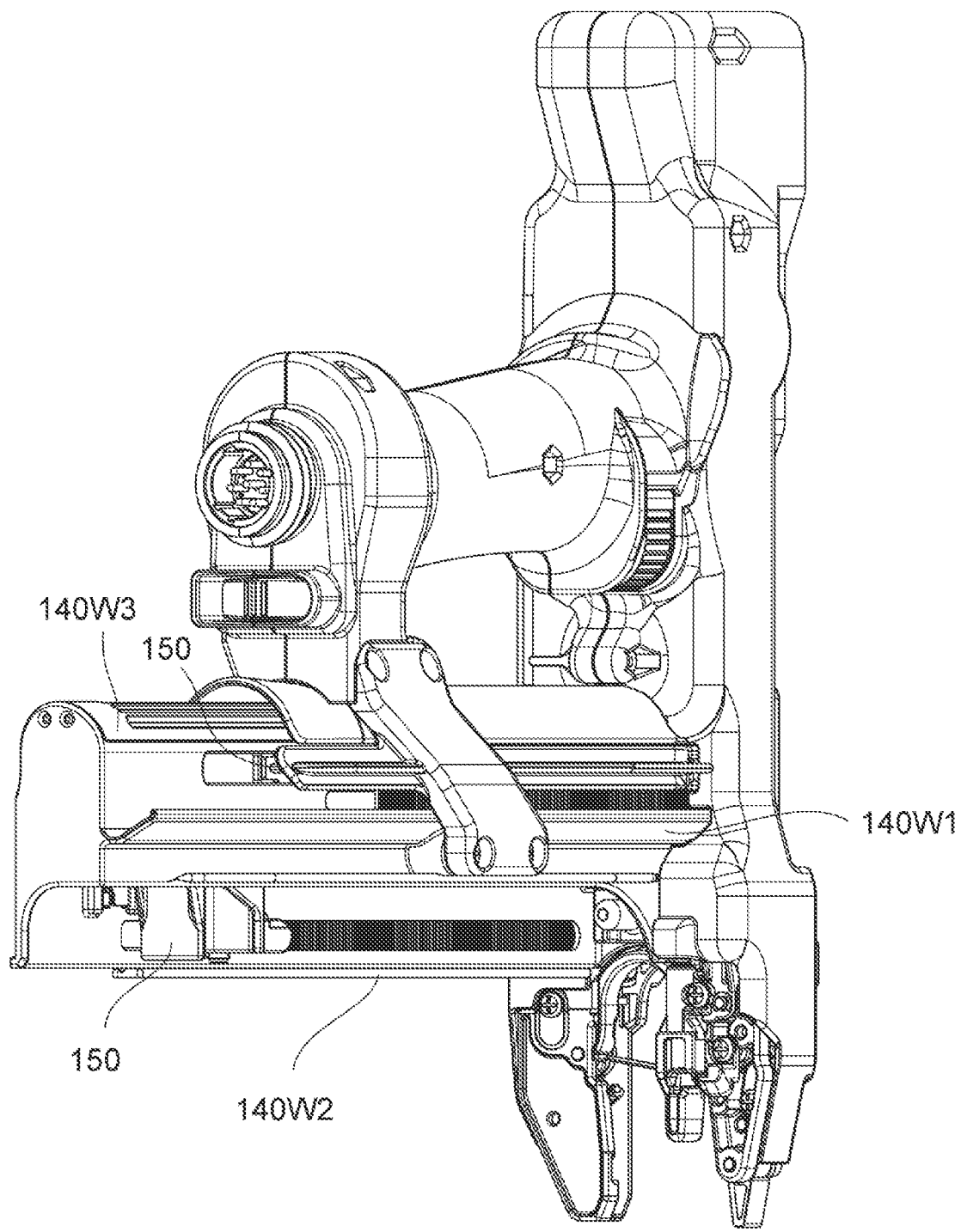
FIG. 31A is a perspective view of the binding machine according to the embodiment as viewed in a downward direction.
Figure 31B:
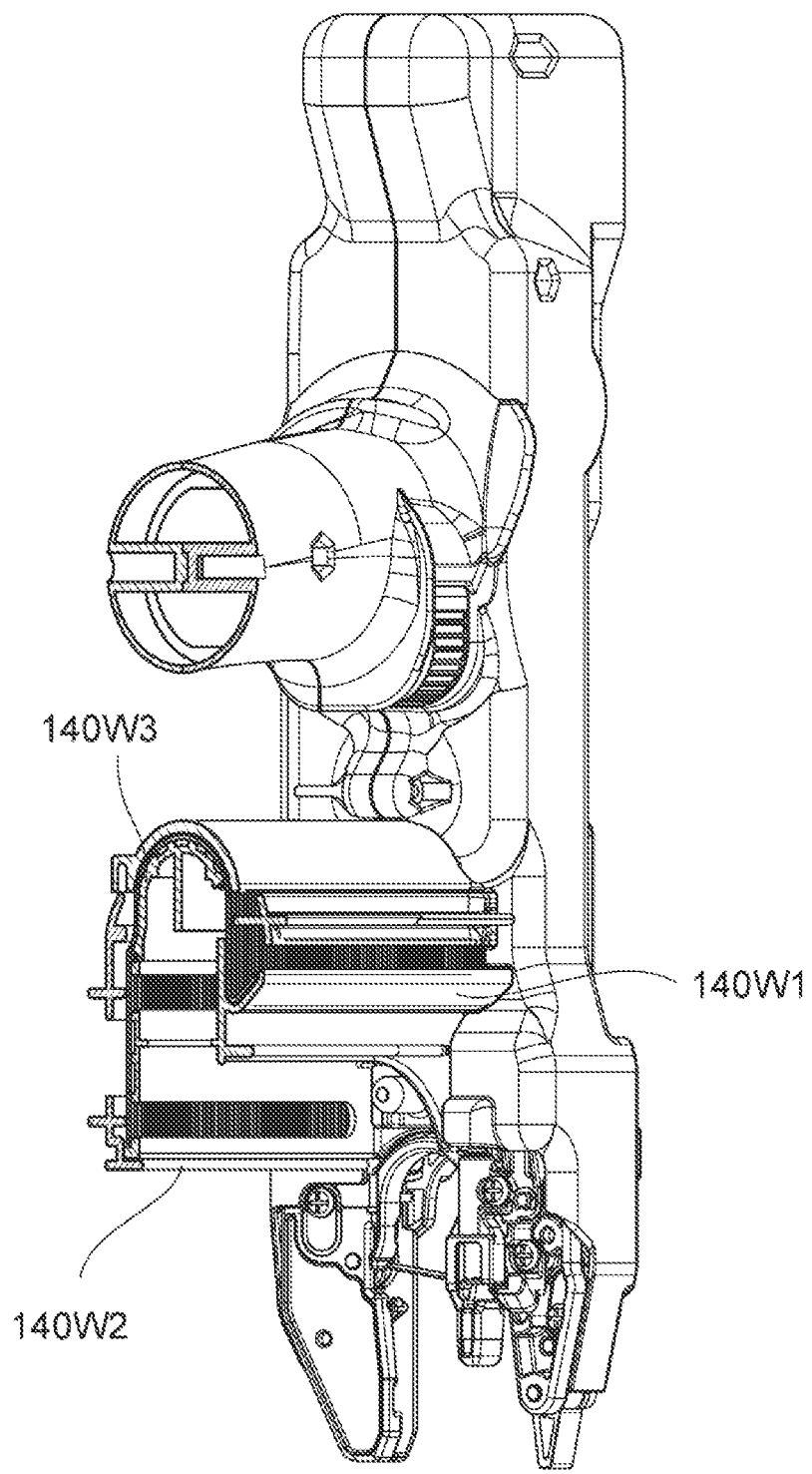
FIG. 31B is a perspective cross-sectional view of the binding machine according to the embodiment taken along a plane perpendicular to an up-down direction and viewed from the downward direction.
Figure 32:
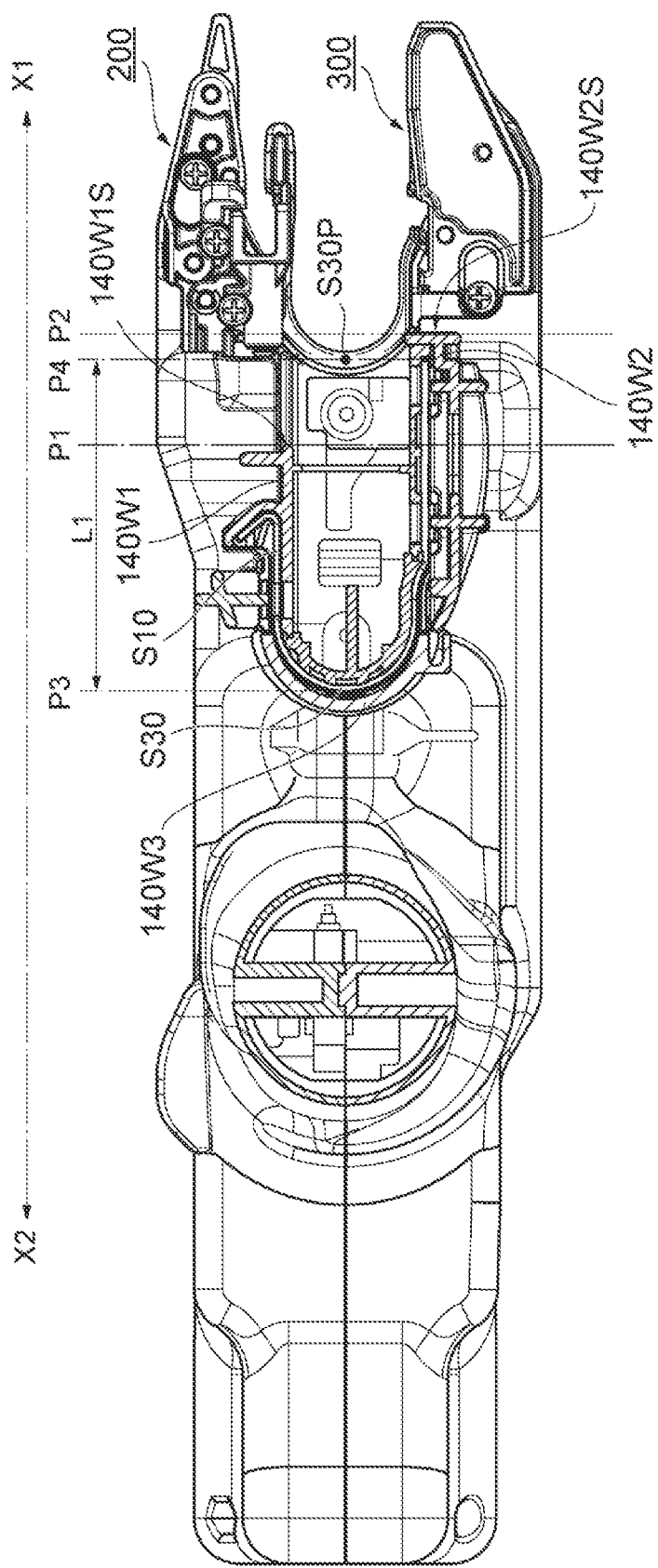
FIG. 32 is a cross-sectional view of the binding machine according to the embodiment taken along the plane perpendicular to the up-down direction and viewed from the downward direction.

FIG. 31A is a perspective view of the binding machine 100 as viewed from the downward direction. FIG. 31B is a perspective cross-sectional view of the binding machine 100 taken along a plane perpendicular to the up-down direction (a plane parallel to the left-right direction and the front-rear direction) as viewed from the downward direction Z2. FIG. 32 is a cross-sectional view of the binding machine 100 taken along the plane perpendicular to the up-down direction and viewed from the downward direction Z2.

As illustrated in FIGS. 31A, 31B, and 32, the magazine 140 is formed in a non-symmetrical manner with respect to a plane passing through a center of the binding machine 100 and parallel to the front-rear direction and the up-down direction. By forming the magazine 140 in a non-symmetrical manner in accordance with the staple S0 (FIG. 27) formed in a non-symmetrical manner with respect to the straight line parallel to the opening direction D1, it is possible to restrain the contact with the object.

The magazine 140 includes a plurality of wall portions (an example of a "magazine wall portion") extending in the up-down direction in order to accommodate or protect the plurality of staples S0 stacked in the up-down direction.

Specifically, the magazine 140 includes a first wall portion 140W1 for accommodating or protecting the first leg portions S10 of the plurality of staples S0 stacked in the up-down direction as the magazine wall portion. The first wall portion 140W1 includes a wall portion extending in the up-down direction and the front-rear direction so as to face the first portion S10B (FIG. 27) in accordance with the shape of the first leg portion S10 and having a wall surface perpendicular to the left-right direction, a wall portion connected to this wall portion and extending in the up-down direction and extending in a direction inclined with respect to the front-rear direction so as to face the tip end portion S10A, and a wall portion connected to these two wall portions, corresponding to a front end portion (the end portion in the forward direction X1) of the first wall portion 140W1, and extending in the up-down direction. The wall portion includes a first surface 140W1S extending in the up-down direction and formed to face the forward direction X1. As illustrated in FIG. 32, the first surface 140W1S is formed at a position P1 in the front-rear direction.

Further, the magazine 140 includes a second wall portion 140W2 for accommodating or protecting the second leg portions S20 of the plurality of staples S0 stacked in the up-down direction as the magazine wall portion. The second wall portion 140W2 includes a wall portion extending in the up-down direction and the front-rear direction so as to face a side of the second portion S20B in accordance with the shape of the second leg portion S20 and having a wall surface perpendicular to the left-right direction, a wall portion extending in the up-down direction so as to face the front end of the second portion S20B, and a wall portion extending in the up-down direction and corresponding to a front end portion (the end portion on the forward direction X1) of the second wall portion 140W2. The wall portion includes a second surface 140W2S extending in the up-down direction and formed to face the forward direction X1. As illustrated in FIG. 32, the second surface 140W2S also corresponds to the front end surface of the magazine 140, and is formed at a position P2 in the front-rear direction. As illustrated in FIG. 32, since the second wall portion 140W2 includes a portion formed on the front side X1 with respect to the first wall portion 140W1, the position P2 is positioned in the forward direction X1 with respect to the position P1. In other words, the position P1 is positioned in the rearward direction X2 with respect to the position P2.

Further, the magazine 140 includes a third wall portion 140W3 for accommodating the main body portion S30 of the plurality of staples S0 stacked in the up-down direction as the magazine wall portion. The third wall portion 140W3 includes a wall portion extending in the up-down direction so as to face a surface toward the rearward direction X2 of the curved portion S30A in accordance with the shape of the curved portion S30A of the main body portion S30 and having a curved wall surface that is convex toward the rearward direction X2, and a wall portion extending in the up-down direction so as to face a surface toward the forward direction X1 of the curved portion S30A and having a wall surface that is convex toward the rearward direction X2, and can accommodate the plurality of staples S0 stacked in the up-down direction such that the curved portion S30A is sandwiched between the two wall portions from the front and the rear. As illustrated in FIG. 32, the third wall portion 140W3 includes a portion formed in the rearward direction X2 with respect to the first wall portion 140W1.

According to the above configuration, the first wall portion 140W1 is provided on the rearward direction X2 with respect to the second wall portion 140W2, and thus it is possible to secure a space in the forward direction X1 of the first wall portion 140W1 and the downward direction Z2 of the first displacement portion 200. In this way, by also forming, in a non-symmetrical manner, the magazine 140 for accommodating the non-symmetric staple S0 and securing the space in the forward direction X1 of the first wall portion 140W1, it is possible to restrain the contact with the second object P as compared with a binding machine having no such a space.

As illustrated in FIG. 31A, the pusher 150 is disposed in a region between the first wall portion 140W1 and the second wall portion 140W2. However, the pusher 150 may be disposed at a different position and may be replaced with pushers of other known configurations.

Positional Relation Between Magazine 140 and Staple S0 After Movement

Figure 33A:
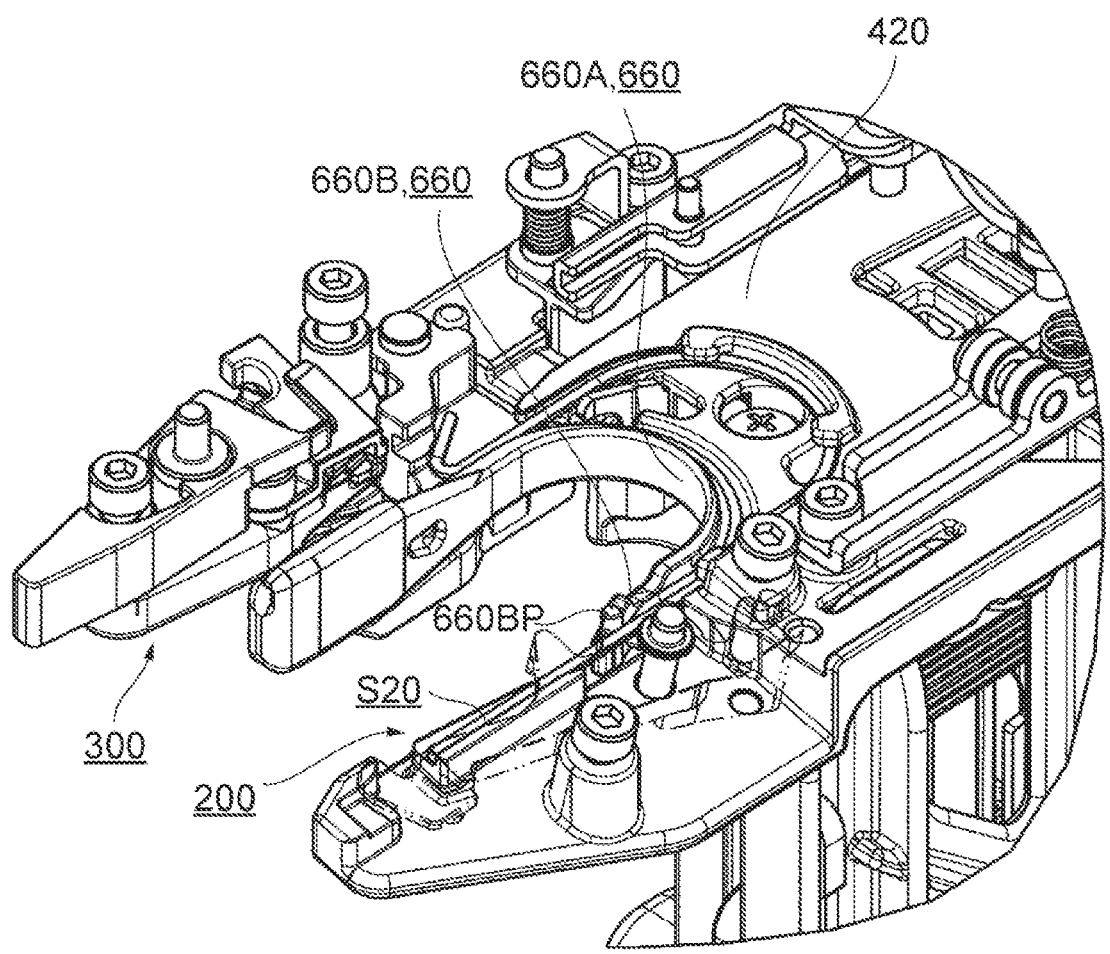
FIG. 33A is a perspective view illustrating a state in which a staple is moving in a forward direction by a driver of the binding machine according to the embodiment.
Figure 33B:
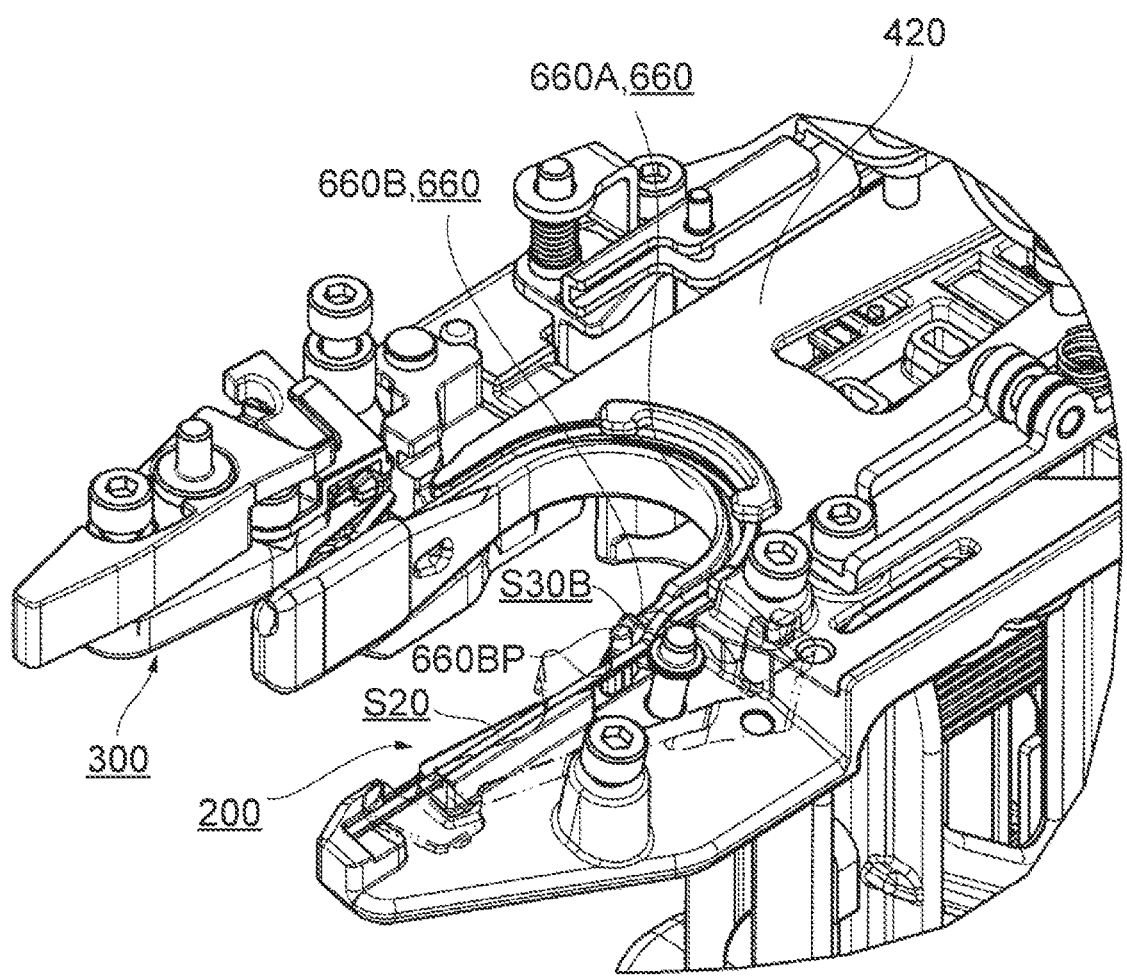
FIG. 33B is a perspective view illustrating the staple that is moving in the forward direction by the driver of the binding machine according to the embodiment and reaches a binding position.

Next, a positional relation between the magazine 140 and the staple S0 after movement will be described. The driver 420 of the binding machine 100 according to the present embodiment separates the staple S0 accommodated in the magazine 140 and positioned at the upper end from the another staple S0 and can move the separated staple S0 to the predetermined position in the forward direction X1. FIG. 33A is a perspective view illustrating a state in which the staple S0 positioned on the upper end is moving in the forward direction X1 by the driver 420, and FIG. 33B is a perspective view illustrating a state of the staple S0 which moves in the forward direction X1 by the driver 420 and reaches the predetermined position. The staple S0 is displaced by the displacement portion at the predetermined position to bind the second object P and the first object G. Therefore, the predetermined position may be referred to as the binding position. As illustrated in FIGS. 33A and 33B, the binding machine 100 includes an inner wall portion 660 for supporting a surface of the staple S0 facing the inward direction of the main body portion S30. In accordance with a shape of the main body portion S30, the inner wall portion 660 includes a curved portion 660A that is curved to protrude in the outward direction (the rearward direction X2) and can support the inside of the curved portion S30A, and a curved portion 660B that is recessed in the inward direction (curved to protrude in the inward direction) and can support the inside of the curved portion S30B. As will be described later, a front end of the curved portion 660B includes a fulcrum 660BP that functions as a bending fulcrum of the second leg portion S20. As illustrated in FIGS. 33A and 33B, the fulcrum 660BP is provided at a position facing an inward surface of the connection portion between the curved portion S30B and the second leg portion S20. The staple S0 is displaced by the displacement portion to the predetermined position and is bound. Therefore, the predetermined position may be referred to as the binding position.

The binding machine 100 according to the present embodiment can make a movement amount of the staple S0 to the forward direction X1 larger than that of the binding machine 10, thereby restraining a situation in which the magazine 140 comes into contact with the object to damage the object.

Specifically, when a length of the staple S0 accommodated in the magazine 140 in the front-rear direction is a staple length L1 (an example of a "first length" in FIG. 32), the driver 420 can move the staple S0 in the forward direction by a distance of 50% or more of the length L1, preferably a distance of 75% or more of the length L1, and more preferably a distance of 100% or more of the length L1. Therefore, for example, a total of a length of the driver 420 and an extension amount of the ball screw in the forward direction X1 from a position of a rear end S30P of the staple S0 held in the magazine 140, is at least equal to or larger than a half of a total length of the staple S0.

In the present embodiment, the driver 420 moves the staple S0 in the forward direction X1 by a distance of about 100% of the length L1. As a result, as illustrated in FIG. 32, a rear end S30P of the staple S0 accommodated in the magazine 140 before the movement is present at a position P3 in the front-rear direction. Then, at the predetermined position (binding position) after the movement, the rear end S30P of the staple S0 is present at a position P4 in the front-rear direction in front of a distance corresponding to the length L1 from the position P3.

Therefore, in FIG. 32 illustrating a cut surface obtained by cutting the magazine wall portion in a virtual plane perpendicular to the up-down direction, a second surface 140W2S corresponding to the front end surface of the magazine 140 is positioned in the forward direction X1 with respect to the rear end S30P of the staple S0 disposed at the predetermined position after the movement in the forward direction X1. A first surface 140W1S corresponding to the front end of the first wall portion 140W1 is also positioned in the rearward direction X2 with respect to the rear end S30P of the staple S0 disposed at the predetermined position after the movement in the forward direction X1.

Further, a region in which the staple S0 accommodated in the magazine 140 before the movement is projected in the up-down direction and a region in which the staple S0 disposed at the predetermined position after the movement to the forward direction X1 by the driver 420 is projected in the up-down direction are separated from each other without overlapping with each other.

Therefore, it is possible to secure a space in a region on the downward direction Z2 of the staple S0 disposed at the predetermined position and on the forward direction X1 of the magazine 140. Therefore, when the second object P extending a region in the forward direction Z1 of the magazine 140 in the up-down direction and penetrating a region between the first displacement portion 200 and the second displacement portion 300 is displaced and bound so as to be surrounded by the staple S0, it is possible to restrain the binding machine 100 from coming into contact with and damaging the second object P.

In order to move the staple S0 so that the staple S0 before the movement and the staple S0 after the movement do not overlap with each other, it is necessary to move the staple S0 in the forward direction X1 by a distance equal to or larger than a length of a portion of the staple S0 extending parallel to the opening direction D1 (the forward direction X1). Since the second leg portion S20 is formed to be longer than the first leg portion S10 of the staple S0 illustrated in the present embodiment, it is necessary to move the staple S0 in the forward direction X1 by a distance equal to or larger than a length of a portion of the second leg portion S20 extending parallel to the opening direction D1 (forward direction X1). Here, in the staple S0 illustrated in the present embodiment, the curved portion S30B is inserted between the curved portion S30A and the second leg portion S20. Therefore, it is possible to shorten the length of the portion of the second leg portion S20 extending parallel to the opening direction D1 (forward direction X1) as compared to a case in which the curved portion S30A and the second leg portion S20 are directly connected with each other.

Figure 34:
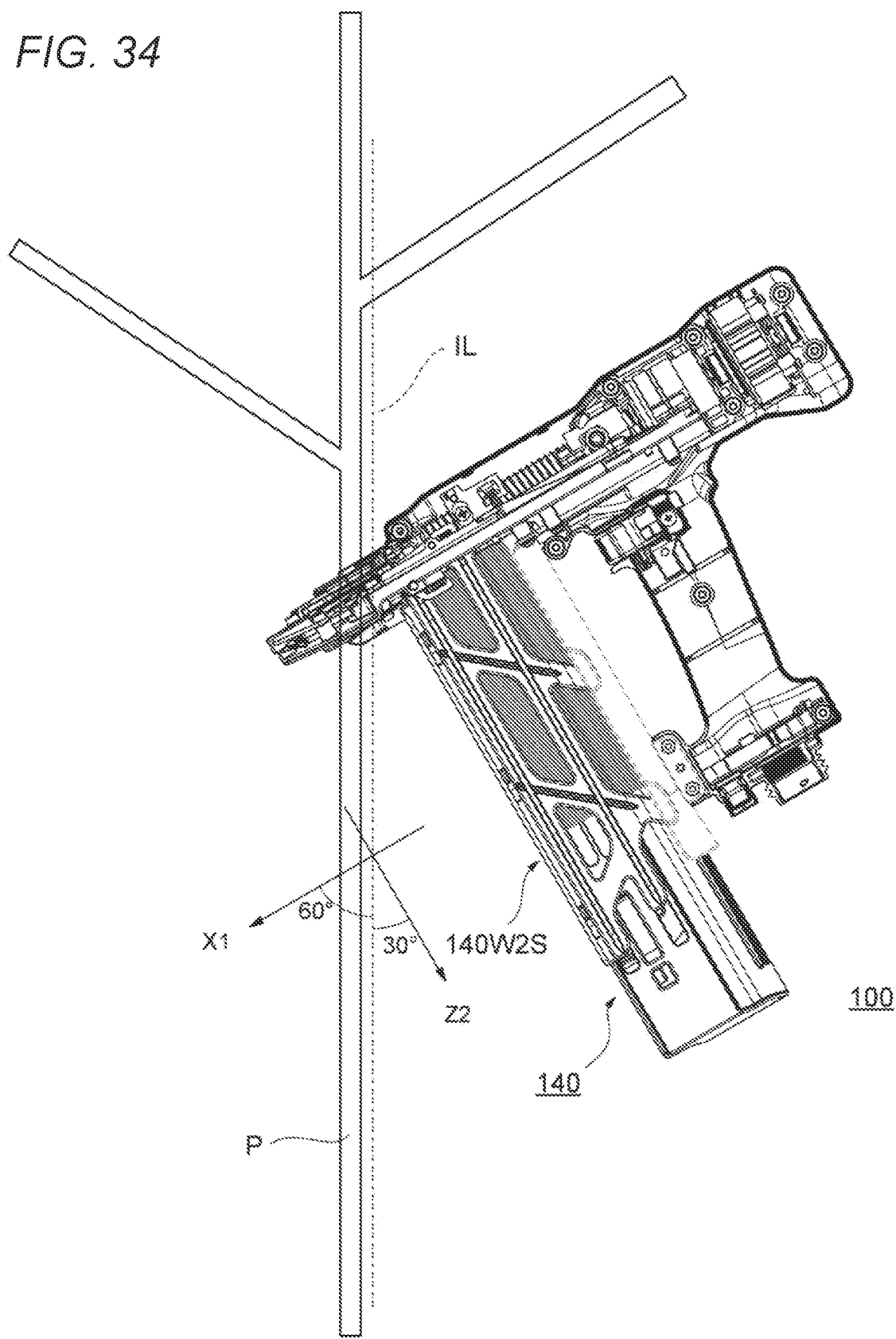
FIG. 34 is a side surface view illustrating a state in which an object P is bound using the binding machine according to the embodiment.

Further, as illustrated in the side view of FIG. 34, the magazine 140 of the binding machine 100 is disposed on the rearward direction X2 with respect to a virtual straight line IL which passes through the rear end S30P of the staple S0 disposed at the binding position, is inclined by 60 degrees with respect to the forward direction X1, and is inclined by 30 degrees with respect to the downward direction Z2.

When a plant stem or the like extending vertically upward is set as the second object P and the binding machine 100 is inclined by 30 degrees from a horizontal direction, the second object P extends substantially parallel to the virtual straight line IL. The binding is performed in a region on the forward direction X1 with respect to the rear end S30 of the staple S0 disposed at the binding position. Therefore, the second object P is bound in a region on the forward direction X1 with respect to the virtual straight line IL that passes through the rear end S30P of the staple S0 disposed at the binding position. Meanwhile, the magazine 140 is disposed in the rearward direction X2 with respect to the virtual straight line IL. Therefore, according to such a configuration, it is possible to restrain the magazine 140 of the binding machine 100 from coming into contact with and damaging the second object P.

In addition, as illustrated in FIG. 34, not an upper part of a node but a lower part of the node at which leaves and branches of the stem are present is bound. Here, since the magazine 140 of binding machine 100 extends in the downward direction Z2 with respect to a binding region, it is also possible to restrain the magazine 140 from coming into contact with leaves and branches as compared with a binding machine in which a magazine extends in the upward direction Z1.

Positional Relation Between Magazine 140 and Binding Region

Next, a positional relation between the magazine 140 and the binding region will be described. The binding region is a region at which the binding can be performed using the staple, and corresponds to a region at which the second object P can exist for the binding using the staple S0 in the present embodiment.

In the present embodiment, the staple S0 disposed at the binding position on the forward direction X1 is bent by the second displacement portion 300 with the fulcrum 660BP corresponding to the front end of the inner wall portion 660 as a fulcrum in a state of being supported by the inner wall portion 660 (FIG. 33B). That is, the second arm of the second displacement portion 300 bends the second leg portion S20 with the fulcrum 660BP as a fulcrum so as to intersect the first leg portion S10 in the top view, thereby engaging the second leg portion S20 with the first object G in a state in which the second object P is surrounded. In order to surround the second object P, the second object P needs to exist in a region surrounded by the displaced staple S0 in the top view. Therefore, in the present embodiment, the binding region corresponds to the region surrounded by the displaced staple S0.

Figure 35:
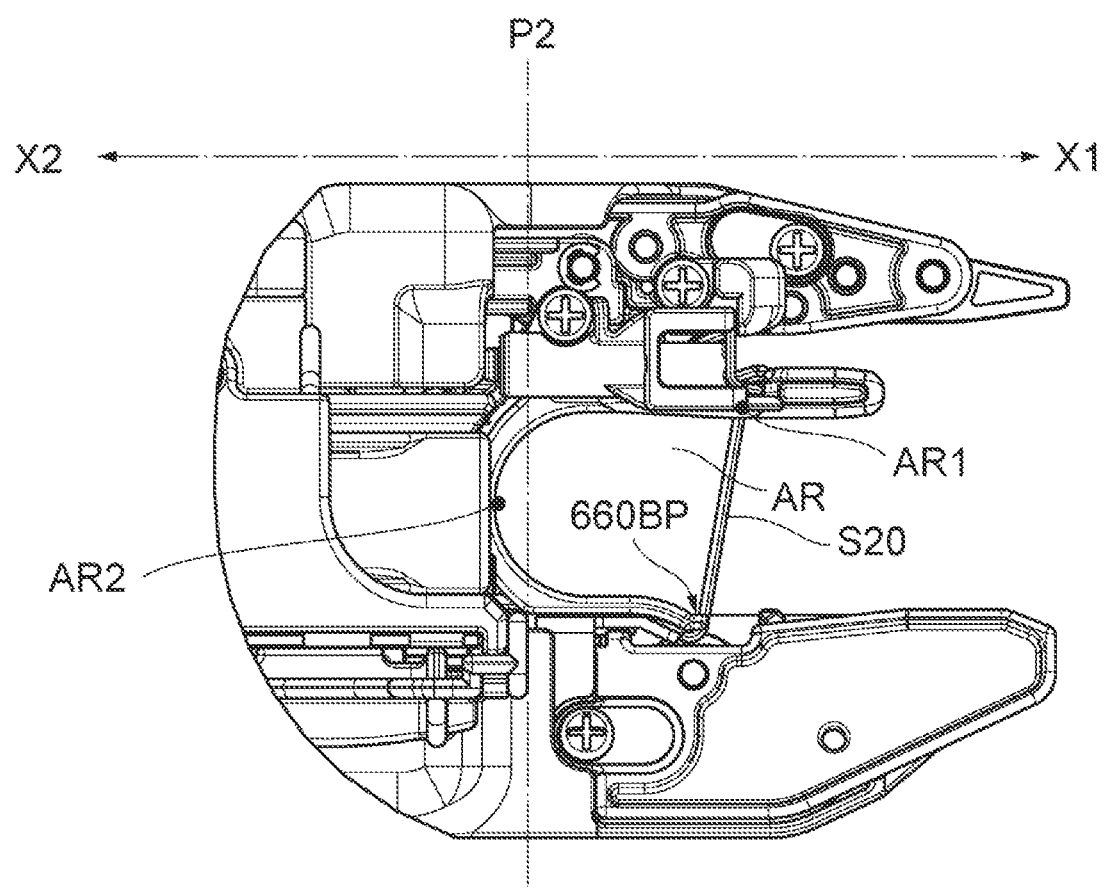
FIG. 35 is a rear view illustrating the staple displaced by the binding machine according to the embodiment.

FIG. 35 is a rear view of the binding machine 100 seen from the downward direction Z2, illustrating a binding region AR surrounded by the displaced staple S0. As illustrated in FIG. 35, in a state after the displacement, the second leg portion S20 is bent with the fulcrum 660BP of the inner wall portion 660 as a fulcrum and intersects the first leg portion S10 in the top view. The binding region AR corresponds to a region surrounded by the main body portion S30, the first leg portion S10, and the second leg portion S20 supported by the inner wall portion 660, and a front end AR1 of the binding region AR corresponds to an intersection point at which the first leg portion S10 and the second leg portion S20 intersect.

As illustrated in FIG. 35, the position P2 (the position in the front-rear direction in which the second surface 140W2S of the second wall portion 140W2 corresponding to the front end surface of the magazine 140 is formed) is positioned in the rearward direction X2 with respect to the front end AR1 of the binding region AR (the intersection point of the first leg portion S10 and the second leg portion S20). Therefore, it is possible to restrain a situation in which the magazine 140 comes into contact with the second object P penetrating through the binding region AR and damages the second object P.

The binding machine 100 may be modified such that (the second surface 140W2S corresponding to) the front end surface of the magazine 140 is further positioned in the rearward direction X2 with respect to the rear end AR2 of the region AR surrounded by the staple S0. According to such a configuration, in the top view, the front end surface of the magazine 140 is positioned in the rearward direction X2 with respect to the region AR in which the second object P can exist, and thus it is possible to further restrain the contact between the binding machine 100 and the second object P.

Next, a positional relation between a displaced portion of the staple S0 and the magazine 140 will be described. The second leg portion S20 of the staple S0 disposed at the predetermined position after the movement in the forward direction X1 is bent by the second displacement portion 300 with the fulcrum 660BP as a fulcrum in a state of being supported by the inner wall portion 660. Therefore, a portion on the forward direction X1 from a portion of the second leg portion S20 facing the fulcrum 660BP (a connection portion between the second leg portion S20 and the curved portion S30B) serves as the displaced portion. On the other hand, since the staple S0 cannot be displaced by the inner wall portion 660, a portion of the staple S0 supported by the inner wall portion 660, such as the main body portion S30, corresponds to a portion that is not displaced. In addition, similarly to the description in the first embodiment, in the first leg portion S10, the vicinity of the tip end portion S10A is displaced in order to engage with the first object G, and the first portion S10B is not displaced. As described above, as illustrated in FIG. 32, the displaced portion of the staple S0 in the front-rear direction corresponds to the portion of the forward direction X1 from the fulcrum 660BP.

On the other hand, the position P2 in the front-rear direction at which the front end surface (the second surface 140W2S of the second wall portion 140W2 in the present embodiment) of the magazine 140 is formed is positioned in the rearward direction X2 with respect to the fulcrum 660BP, and thus the position P2 is positioned in the rearward direction X2 with respect to the displaced portion of the staple S0. In other words, the binding machine 100 is formed such that the staple S0 is displaced at the region in the forward direction X1 with respect to the front end surface of the magazine 140. With such a configuration, it is possible to restrain the situation in which the magazine 140 comes into contact with the second object P penetrating through the binding region AR and damages the second object P.

A displacing method and a binding method of the staple are not limited to the method illustrated in the present embodiment. For example, the staple may be displaced so that one leg portion of the staple is engaged with the first object and the other leg portion is engaged with the second object. Even in such an embodiment, when the binding machine is formed such that the front end surface of the magazine is positioned in the rearward direction of the portion at which the staple is displaced in the top view and the rear view, it is possible to restrain the magazine from coming into contact with and damaging the first object or the second object.

Binding Method

Hereinafter, a binding method using the binding machine 100 according to the present embodiment will be described. However, it will be understood by a person skilled in the art that the binding machine 10 and the binding machine 100 can be implemented by the same or similar configuration except for the configuration related to the magazine 140, and the detailed description thereof is omitted.

First, the plurality of staples S0 stacked in the up-down direction are accommodated and held by the magazine 140 of the binding machine 100.

Next, the staple S0 positioned at the upper end is separated from the another staple S0 positioned in the downward direction and moves toward the forward direction X1. The separation and the movement of the staple S0 toward the forward direction X1 can be achieved, for example, by using the driver 420 moving toward the forward direction X1 by the movement mechanism, based on the configuration described in detail in the first embodiment.

Thereafter, the staple S0 is static at the predetermined position (the binding position) in the forward direction X1. Further, in a state in which the staple S0 is static, the user operates the binding machine 100 such that the first object G (for example, a string functioning as the guide element) is inserted into the bent portion of the first leg portion S10 and the second object P (for example, a plant) is inserted into the region in the opening of the staple S0. Therefore, according to the binding machine 100 according to the present embodiment, it is possible to restrain the magazine 140 from coming into contact with and damaging the second object P.

Then, the binding machine 100 displaces the first leg portion S10 and the second leg portion S20 of the staple S0. For example, the displacement of the staple S0 is schematically illustrated in FIG. 2, and can be achieved by using the slider 440 that moves toward the forward direction X1 by the movement mechanism, the first displacement portion 200 for displacing the first leg portion S10 of the staple S0, and the second displacement portion 300 for displacing the second leg portion S20 of the staple S0 by the slider 440, based on the configuration described in detail in the first embodiment. That is, a mechanism for converting the movement toward the forward direction into a rotational motion is known, and thus it is possible to press the first arm of the first displacement portion 200 by the slider 440 moving toward the forward direction X1 by the motor 540, and rotate the first arm. According to the same configuration as that described in the first embodiment, it is possible to move the slider, bend and displace the first leg portion S10, and engage the first leg portion S10 with the first object G as the first arm rotates.

Similarly, it is possible to press the second arm of the second displacement portion 300 by the slider 440 moving toward the forward direction X1 and rotate the second arm. According to the same configuration as that described in the first embodiment, as the second arm rotates, it is possible to bend and displace the second leg portion S20, bend the tip end portion S20A of the second leg portion S20 in the opposite direction, and engage the tip end portion S20A with the first object G while surrounding the second object P (see (A) to (E) of FIG. 2).

As described above, according to the binding machine 100 and the binding method according to the present embodiment, it is possible to secure a space in the forward direction of the magazine 140. Therefore, it is possible to restrain the magazine 140 from damaging the second object P. Moreover, since the need to change the angle, position, and the like of the binding machine 100 so as not to damage the second object P is relatively reduced, it is possible to improve work efficiency.

Third Embodiment

Hereinafter, a configuration of a binding machine according to the present embodiment will be described. The present embodiment discloses an example in which the structure disclosed in the second embodiment is applied to a binding machine including the binding machine described in Patent Literature 3 as a basic configuration. Therefore, the description of a configuration exhibiting configurations or functions that are the same as or similar to those of the binding machines disclosed in Patent Literature 3 and the other embodiments of the present application will be appropriately omitted or simplified by using the same or similar names.

Configuration of Staple S4

First, a configuration of a staple S4 according to the present embodiment will be described. Since a material and the like of the staple S4 are the same as that of the staple S and the like, the description thereof is omitted.

Figure 36A:
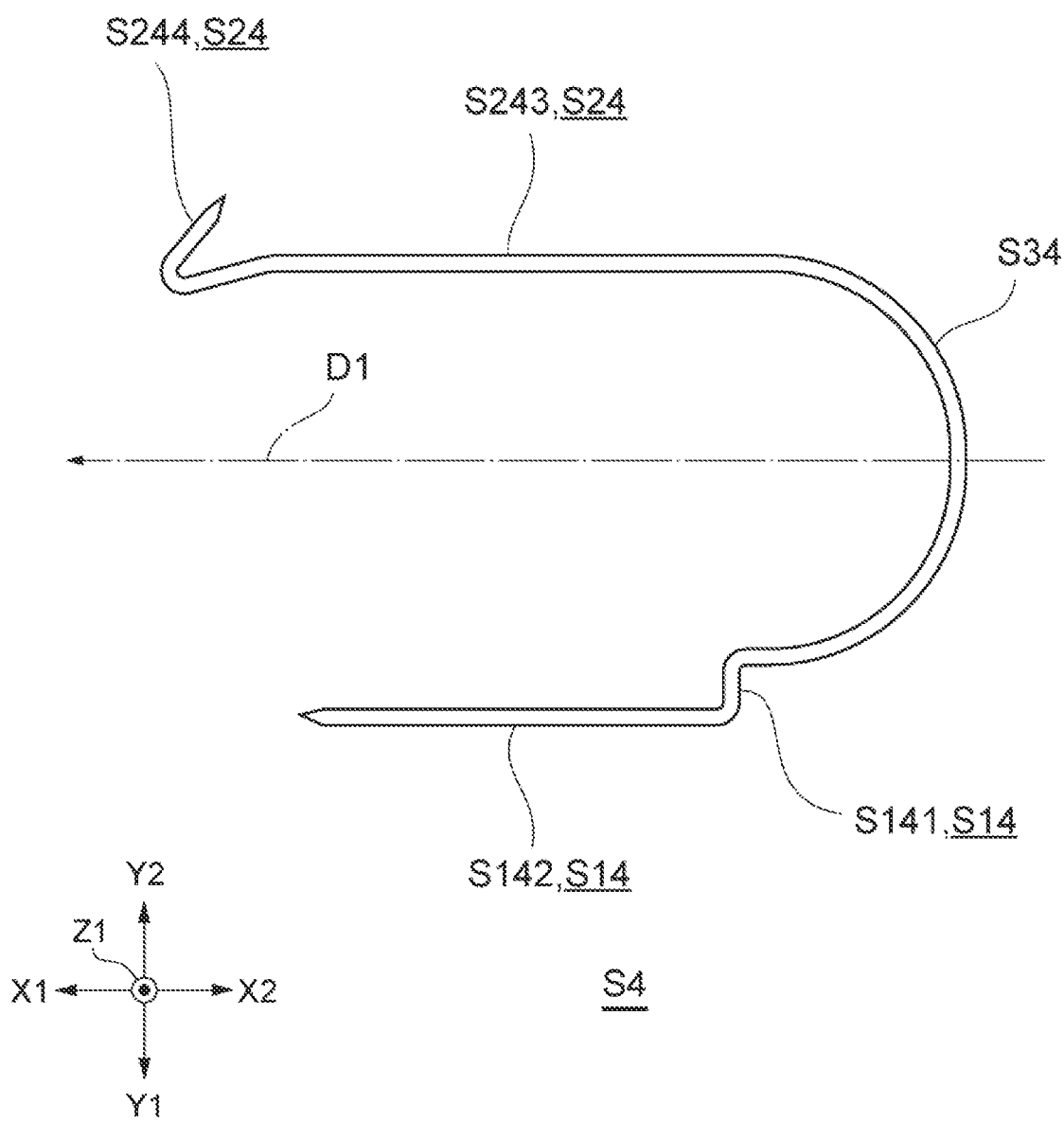
FIG. 36A is a plan view of a staple according to an embodiment.
Figure 36B:
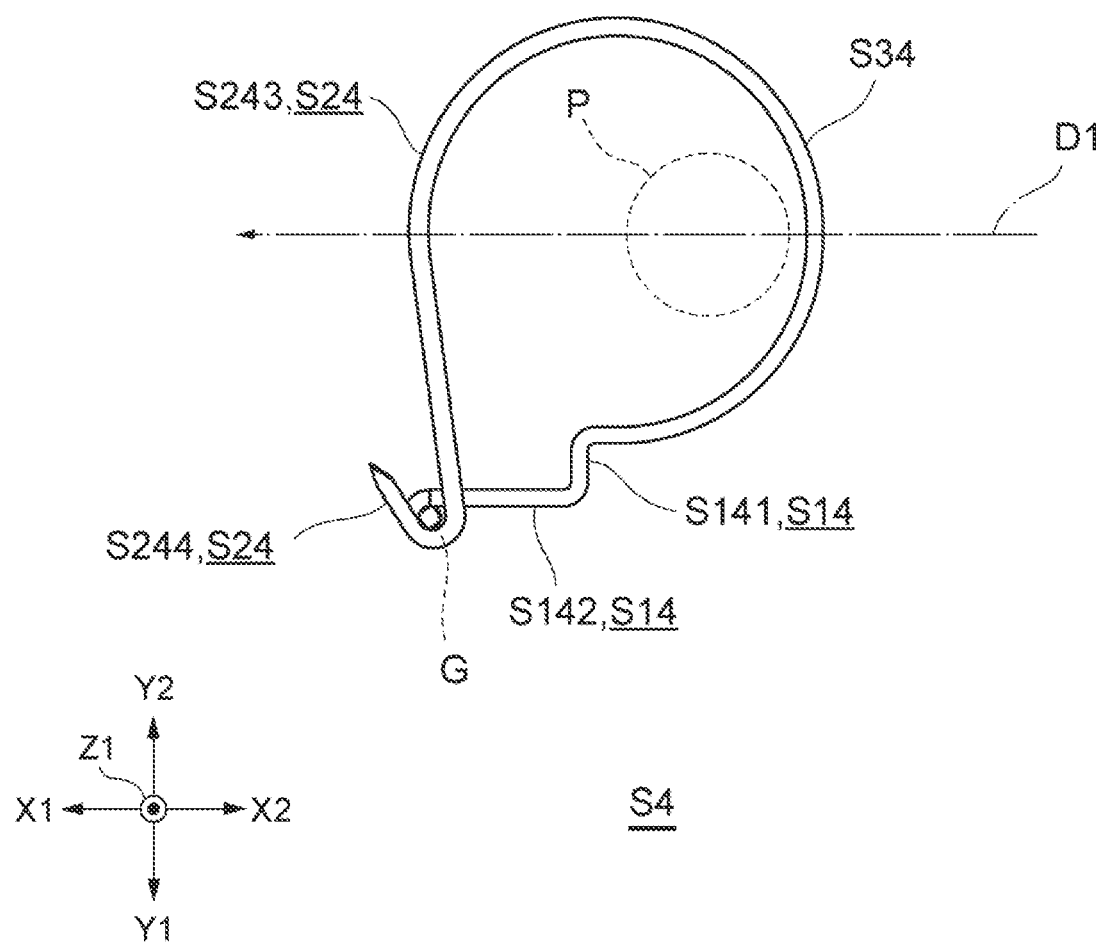
FIG. 36B is a plan view of the staple according to the embodiment.

FIG. 36A illustrates the staple S4 before binding according to the present embodiment, and FIG. 36B illustrates a top view of the staple S4 in a bound state after the binding.

The staple S4 is common to the staple S and the like in that the staple S4 includes a first leg portion S14, a second leg portion S24, and a main body portion S34 connecting the first leg portion S14 and the second leg portion S24. Similar to the staple S, in a state before the binding, the first leg portion S14 and the second leg portion S24 of the staple S4 are separately provided, and thus an opening is provided between the first leg portion S14 and the second leg portion S24. In the present embodiment, a direction from the main body portion S34, that is a closed portion of the main body portion S34, toward the opening (a leftward direction of a paper surface in FIG. 36A) is referred to as the opening direction D1. The opening direction D1 of the staple S4 when set in a binding machine 104 (to be described later) according to the present embodiment coincides with the forward direction X1, which is a movement direction of the staple S4. Therefore, a user can insert the second object P into the staple S4 from the opening of the staple S4 by moving the binding machine 104 in the forward direction with respect to the second object P.

The staple S4 includes the main body portion S34 that connects the first leg portion S14 and the second leg portion S24 and surrounds the second object P such as a stem, the first leg portion S14 that includes a first portion S141 that is connected to one end portion of the main body portion S34 and that is bent and extends outward and a second portion S142 that is further bent from the first portion S141 and extends in the opening direction D1, and a second leg portion S24 that includes a third portion S243 that is connected to the other end portion of the main body portion S34 and that extends in the opening direction D1 and a fourth portion S244 that is bent outward from a tip end portion of the third portion S243. As illustrated in FIG. 36A, the main body portion S34 is curved into a C-shape or a semicircular arc shape. The first portion S141 that connects the main body portion S34 and the second portion S142 may be referred to as a crank portion, and the fourth portion S244 may be referred to as a hook portion or a tip end portion.

As will be described later, a tip end portion of the first leg portion S14 is engaged with the first object G by being bent so as to be curved in a spiral shape around the first object G, which is a guide element. On the other hand, as illustrated in FIG. 36B, the second leg portion S24 is largely bent in a direction approaching the first object G so as to close the opening in the top view, and thus the hook portion, that is, the fourth portion S244, is engaged with the first object G. Since the third portion S243 has elasticity in a direction in which the closed opening is expanded and returns to an original position, the fourth portion S244 can apply tension to the first object G in a direction in which the opening is expanded, that is, a direction separated from the first leg portion S14. Accordingly, it is possible to restrain the first object G from being bent and the staple S4 from falling off and the like.

Schematic Configuration of Binding Machine 104

An example of a configuration of the binding machine 104 for bending the staple S4 illustrated in FIG. 36A as illustrated in FIG. 36B will be described below. Except for the horizontal inversion of the elements (that is, in the binding machine disclosed in Patent Literature 3, the first displacement portion 200 is provided in the leftward direction Y2 and the second displacement portion 300 is provided in the rightward direction Y1, whereas in the binding machine 104 disclosed in the present embodiment, the first displacement portion 204 is provided in the rightward direction Y1 and the second displacement portion 304 is provided in the leftward direction Y2, and thus the staple is also formed to be horizontally inverted), the basic configurations of the binding machine disclosed in Patent Literature 3 and the basic configurations of the binding machine 104 disclosed in the present embodiment are common, and thus the configurations of the binding machine 104 will be described by appropriately omitting or simplifying the configurations of the binding machine 104 to the extent that it can be carried out by a person skilled in the art based on the description of Patent Literature 3, the description of the specification of the present application, and the technical level at the time of the present application.

Figure 37:
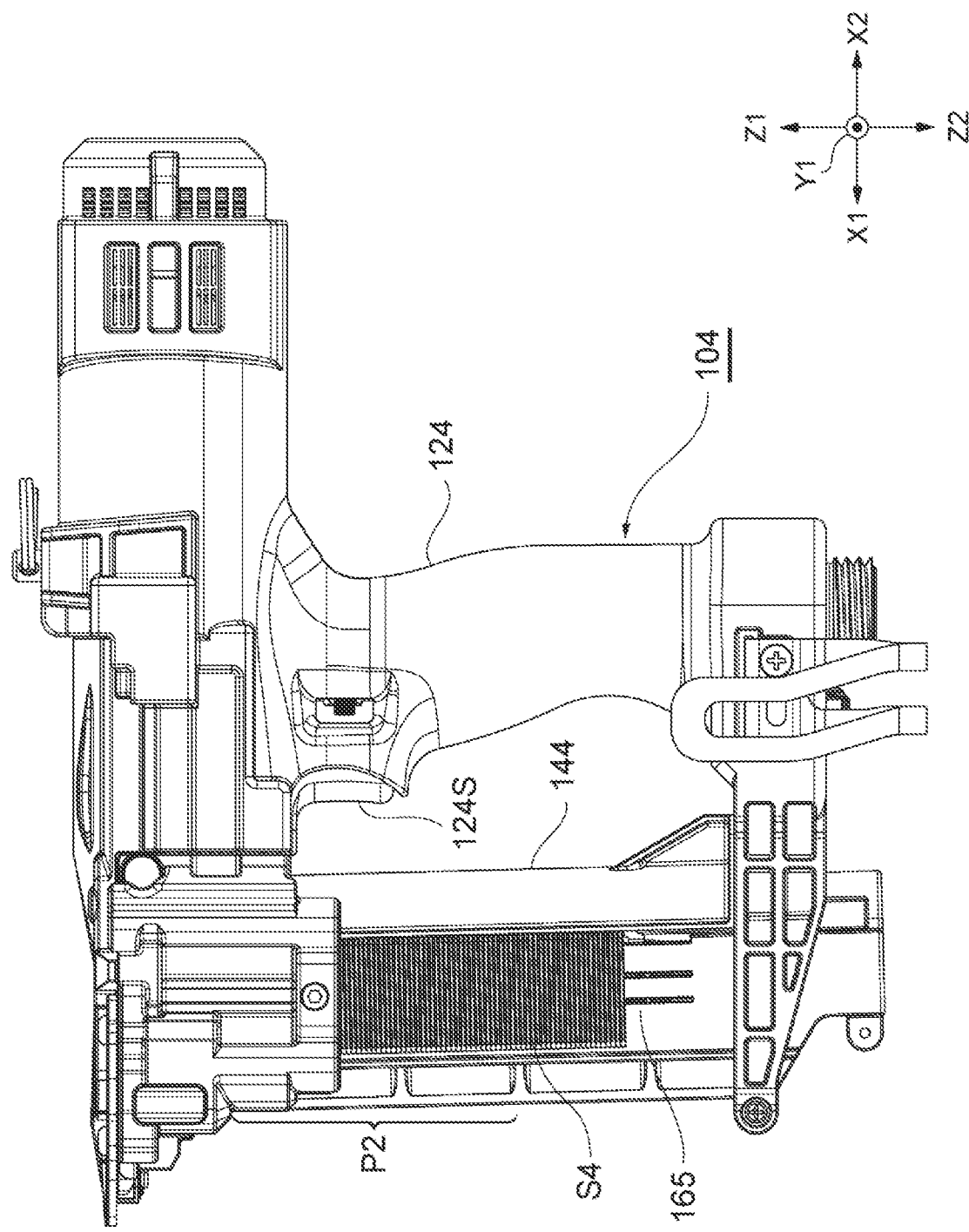
FIG. 37 is a right side view of a binding machine according to the embodiment.
Figure 38:
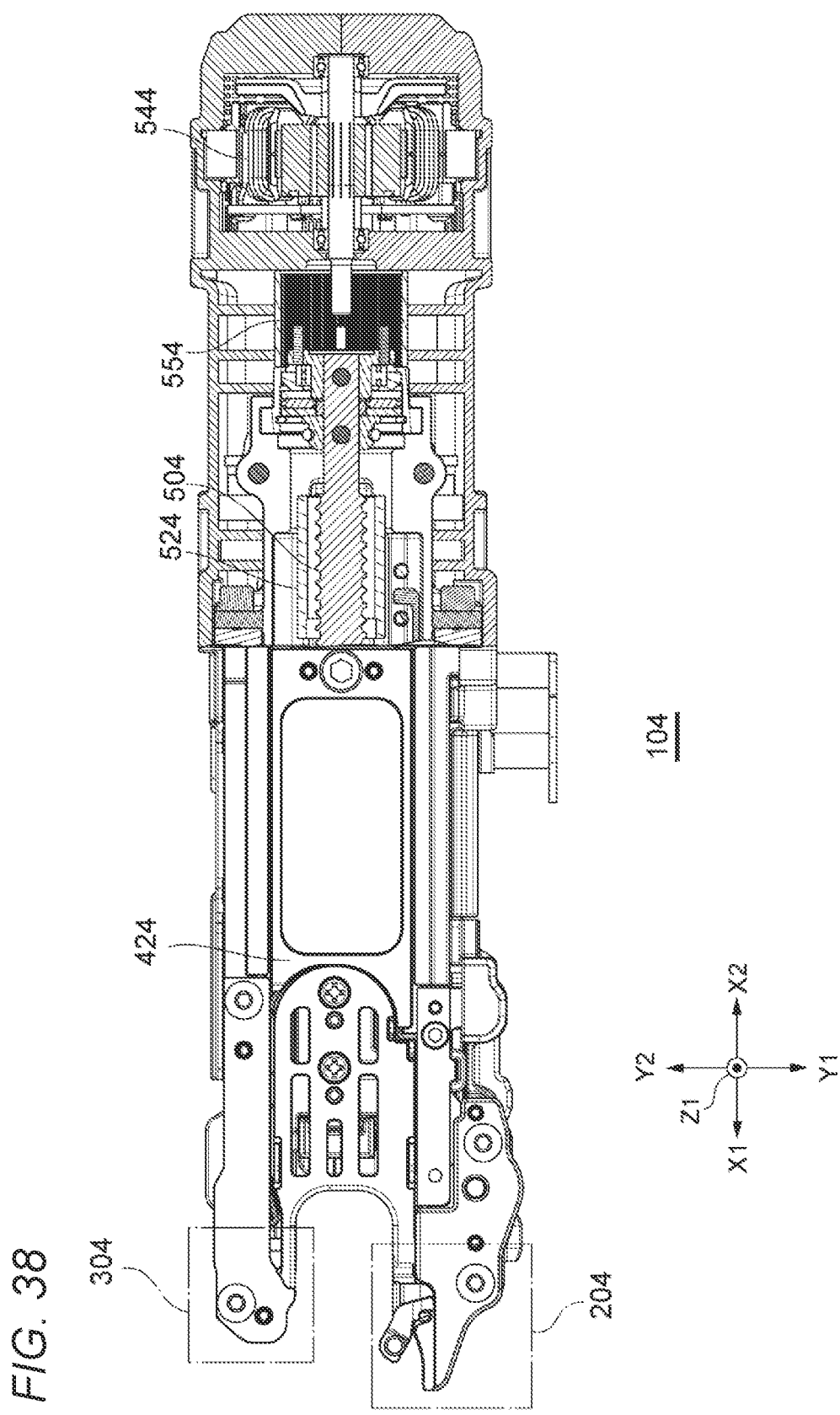
FIG. 38 is a cross-sectional view of the binding machine according to the embodiment in a top view.

FIG. 37 is a right side view of the binding machine 104, and FIG. 38 is a cross-sectional view of the binding machine 104 in the top view. The binding machine 104 binds the first object G and the second object P by using the staple S4 having the formed opening. The binding machine 104 includes the first displacement portion 204 that displaces the first leg portion S14 of the staple S4 so as to be engageable with the first object G, and the second displacement portion 304 that displaces the second leg portion S24 of the staple S4 so as to be engageable with the first object G. The second displacement portion 304 can bind the first object G and the second object P by engaging the tip end portion of the second leg portion S24 with the first object G in a state in which the second object P is surrounded by the first leg portion S14, the second leg portion S24, and the main body portion S34 of the staple S4.

Specifically, the binding machine 104 includes a grip 124 extending in an up-down direction so as to be gripped by the user and provided with a switch 124S for driving the binding machine 104, a magazine 144 (FIG. 37) that can hold a plurality of staples S4 stacked in the up-down direction, a pusher 165 (not shown) for biasing the plurality of staples S4 accommodated in the magazine 144 toward the upward direction Z1, a driver 424 (FIG. 38) that pushes the staple S4 positioned at an upper end toward the forward direction X1 coinciding with the opening direction D1 to separate the staple S4 positioned at the upper end from another staple S4 and move the staple S4 in the forward direction X1, a movement mechanism for moving the driver 424, the first displacement portion 204 (FIG. 38. The first displacement portion 204 may be referred to as a clincher portion.) for displacing the first leg portion S14 of the staple S4 by curving or bending the first leg portion S14, and the second displacement portion 304 (FIG. 38) for displacing the second leg portion S24 of the staple S4 by curving or bending the second leg portion S24.

Driver and Movement Mechanism for Driver

As described in Patent Literature 3, the binding machine 104 is configured such that a nut part 524 and the driver 424 fixed thereto can be moved in the forward direction or the rearward direction by rotating a ball screw 504, which is provided extending approximately at the center of the binding machine 104 in a front-rear direction, clockwise or counterclockwise by a built-in motor 544. The nut part 524 and the driver 424 can move in the forward direction X1 and the rearward direction X2, and thus the nut part 524 and the driver 424 may be referred to as movement portions. The binding machine 104 further includes a speed reducer 554 connected to an output shaft of the motor 544 and a printed wiring board on which a CPU corresponding to a control device of the motor 544 is mounted.

The driver 424 can move in the forward direction X1 to separate the staple S4 positioned at the upper end among the plurality of staples S4 held in the magazine 144 and stacked in the up-down direction from the another staple S4 and move the staple S4 positioned at the upper end in the forward direction X1 in a state of maintaining a front-rear relation in which the opening of the staple S4 is at the front and the main body portion S34 is at the rear. The driver 424 plastically deforms the first leg portion S14 by further moving the separated staple S4 in the forward direction X1 and bringing the first leg portion S14 into contact with the first displacement portion 204 (to be described later), and plastically deforms the second leg portion S24 by bringing the second leg portion S24 into contact with a first guiding wall 304W1 and a second guiding wall 304W2 (FIG. 40A and the like) provided in the second displacement portion 304 (to be described later).

First Displacement Portion

The first displacement portion 204 (an example of a "displacement portion") has a function of displacing the first leg portion S14 of the staple S4 that moves in the forward direction X1 by the driver 424 so as to be engageable with the first object G. However, the configuration for displacing the staple S4 that moves in the forward direction X1 by the driver 424 can be variously modified according to a binding object and the like, and may be modified to include the first displacement portion according to the other embodiments or other known configurations.

It can be easily carried out by a person skilled in the art based on the technical level at the time of the present application including Patent Literature 3, and thus the detailed description thereof will be omitted. The first displacement portion 204 according to the present embodiment includes a hole formed with a cylindrical inner wall surface on which the tip end portion of the first leg portion S14 advances toward the downward direction Z2 while being curved in an arc shape or a spiral shape by a tip end of the second portion S142 of the first leg portion S14 of the staple S4 being inserted as advancing by the driver 424, and a groove portion for guiding the tip end portion of the first leg portion S14 to the hole (for example, corresponding to a hole 210 and a groove portion 211 disclosed in Patent Literature 3). Since the hole is provided in the forward direction X1 with respect to the first leg portion S14, it is possible to bring the tip end of the second portion S142 into contact with the inner wall surface of the hole as the staple S4 advances, and displace the second portion S142 such that the tip end of the second portion S142 advances in a spiral shape in accordance with a shape of the inner wall surface.

According to such a configuration, by inserting the tip end of the second portion S142 of the first leg portion S14 into the hole in a state in which, for example, a guide string, which is the first object G (FIG. 41 and the like) as a guide element, is disposed along a central axis of the hole, the tip end of the second portion S142 can advance in the spiral shape to surround the first object G, and thus the first leg portion S14 can be engaged with the first object G. Since the first object G is inserted into the hole, the hole may be referred to as a first insertion portion. In order to strengthen the engagement between the first object G and the first leg portion S14, an inner diameter of the inner wall surface of the hole is preferably less than a total value of twice a wire diameter of the staple S4 and an outer diameter of the first object G. The first object G or a part of the staple S4 is crushed by setting the inner diameter in this manner, and thus it is possible to strengthen the engagement between the staple S4 and the first object G.

Second Displacement Portion

Figure 40A:
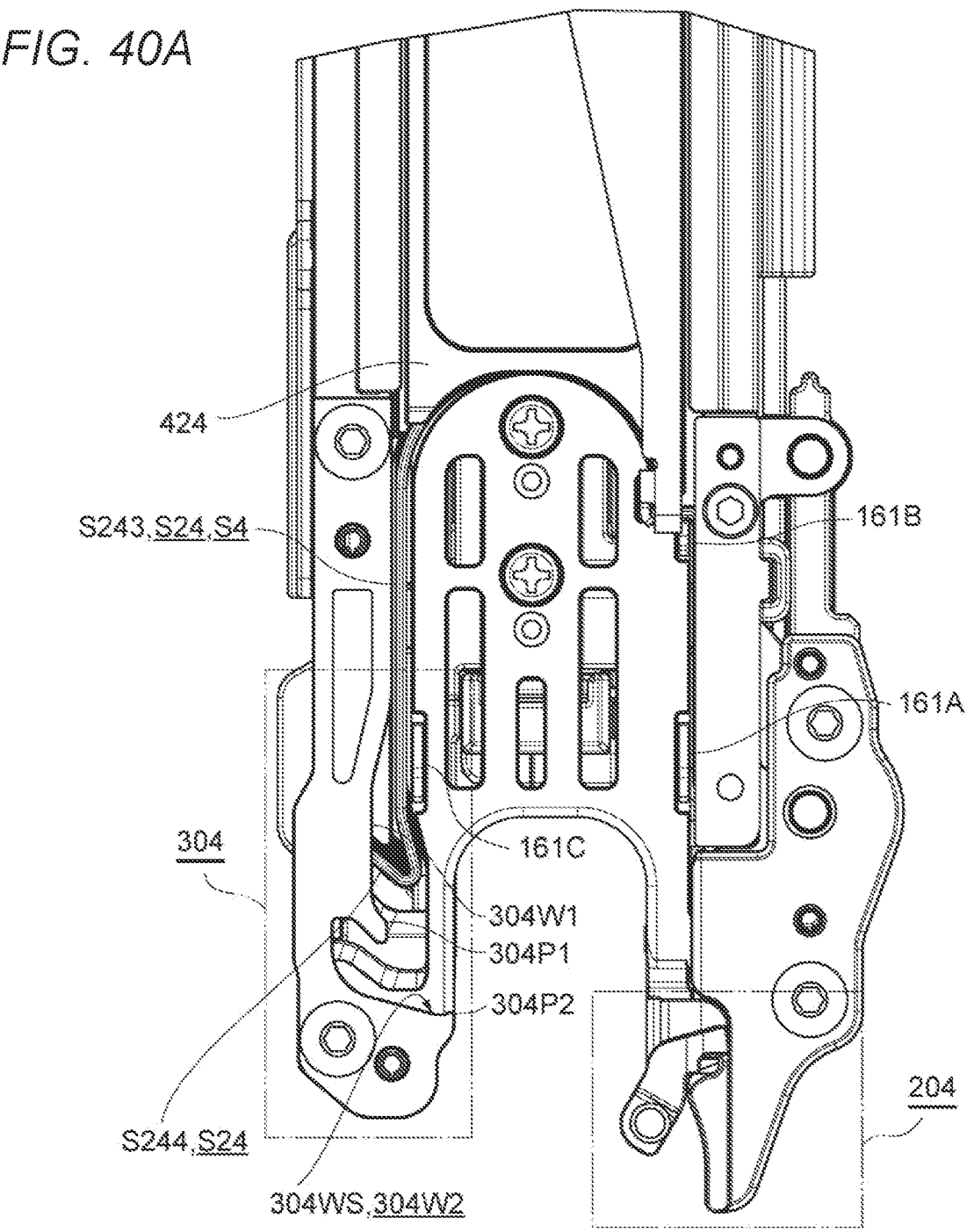
FIG. 40A is a plan view illustrating a binding method of the binding machine according to the embodiment.

The second displacement portion 304 (An example of the "displacement portion". FIG. 40A and the like) has a function of displacing the second leg portion S24 of the staple S4 that moves in the forward direction X1 by the driver 424 so as to be engageable with the first object G. It can be easily carried out by a person skilled in the art based on the technical level at the time of the present application including Patent Literature 3, and thus the detailed description thereof will be omitted. The second displacement portion 304 according to the present embodiment can displace the second leg portion S24 in an inward direction with respect to the staple S4 as the driver 424 moves in the forward direction X1. Specifically, the second displacement portion 304 includes the first guiding wall 304W1 that is provided outside the second leg portion S24 in an initial state before the start of displacement of the staple S4, and that comes into contact with the second leg portion S24 of the staple S4 moving in the opening direction D1 (Since the opening direction D1 coincides with the forward direction X1, and thus the opening direction D1 may be referred to as the forward direction X1. The same applies hereinafter) to curve the second leg portion S24. The first guiding wall 304W1 has a recessed portion recessed toward an outward direction with respect to the staple S4 (the leftward direction Y2).

The second displacement portion 304 further includes the second guiding wall 304W2 that is provided in the forward direction X1 with respect to the second leg portion S24 in the initial state before the start of displacement of the staple S4, and that comes into contact with the second leg portion S24 of the staple S4 moving in the opening direction D1 to curve the second leg portion S24. The second guiding wall 304W2 has a wall surface facing the rearward direction X2 and a protruded portion 304P2 protruding in the rearward direction X2. The protruded portion 304P2 is provided in the forward direction with respect to the second leg portion S24 in the front-rear direction and is provided in the inward direction with respect to the second leg portion S24 in a left-right direction in the initial state, and is provided at an inner end portion of the second guiding wall 304W2 such that a protruding amount toward the rearward direction X2 becomes large as advancing toward the rightward direction Y1 (the inward direction).

As described above, the first displacement portion 204 and the second displacement portion 304 can bind the second object P by displacing the first leg portion S14 and the second leg portion S24 of the staple S4 that moves in the forward direction X1 by the driver 424 to engage with the first object G in a state in which the second object P is inserted into the opening of the staple S4.

Movable Wall

The binding machine 104 according to the present embodiment includes a movable wall 161A, a movable wall 161B, and a movable wall 161C for guiding the movement direction of the staple S4 (hereinafter, these three movable walls are collectively referred to as a movable wall 161). Each of these movable walls 161 is provided to face a surface facing the inside of (the inward direction with respect to) the staple S4, and can move in the downward direction and retract from the guide position when the movable wall is pushed toward the forward direction X1 by the staple S4 that moves in the forward direction X1 by the driver 424.

Figure 39A:
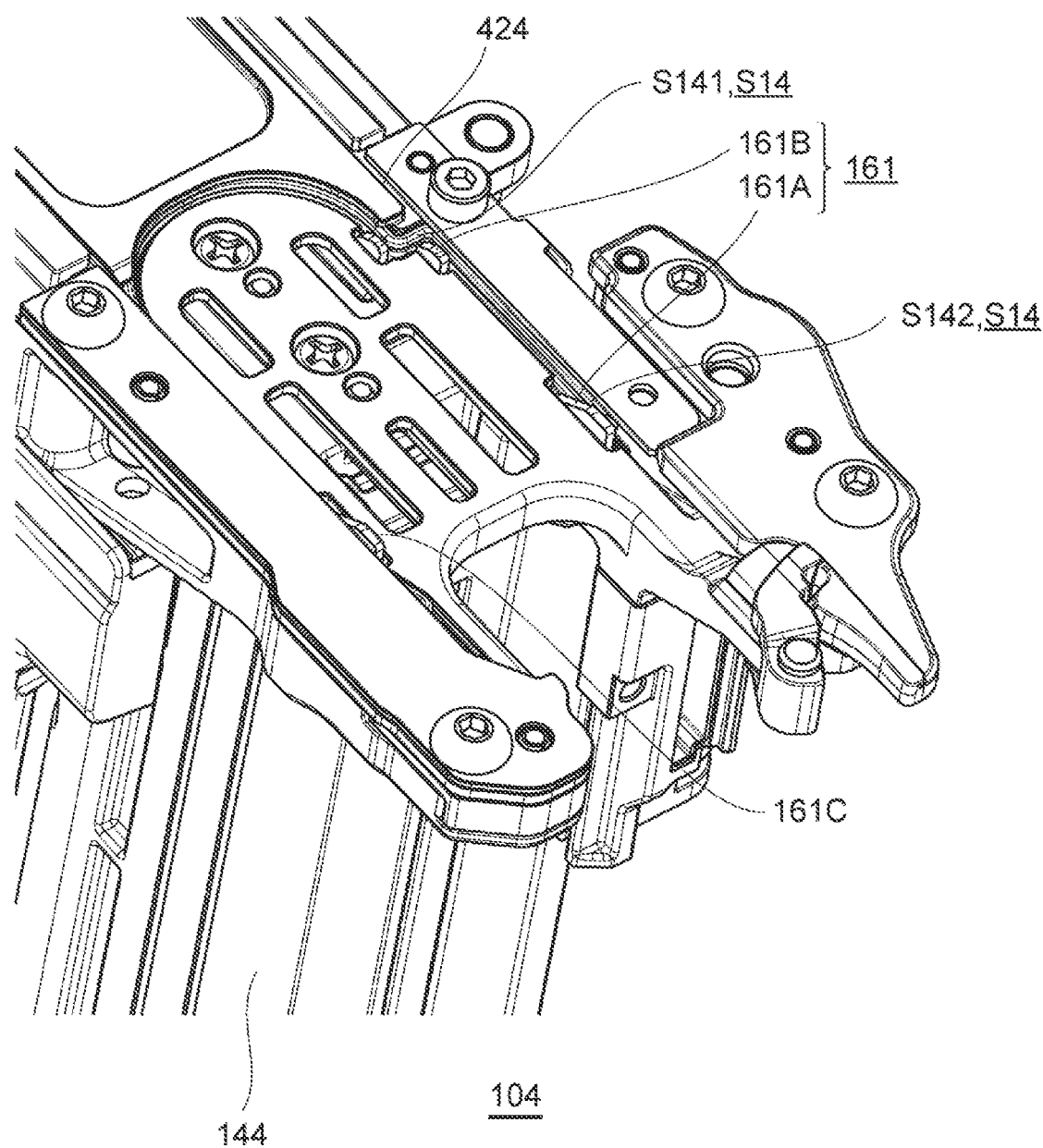
FIG. 39A is a perspective view of a front end portion of the binding machine according to the embodiment.
Figure 39B:
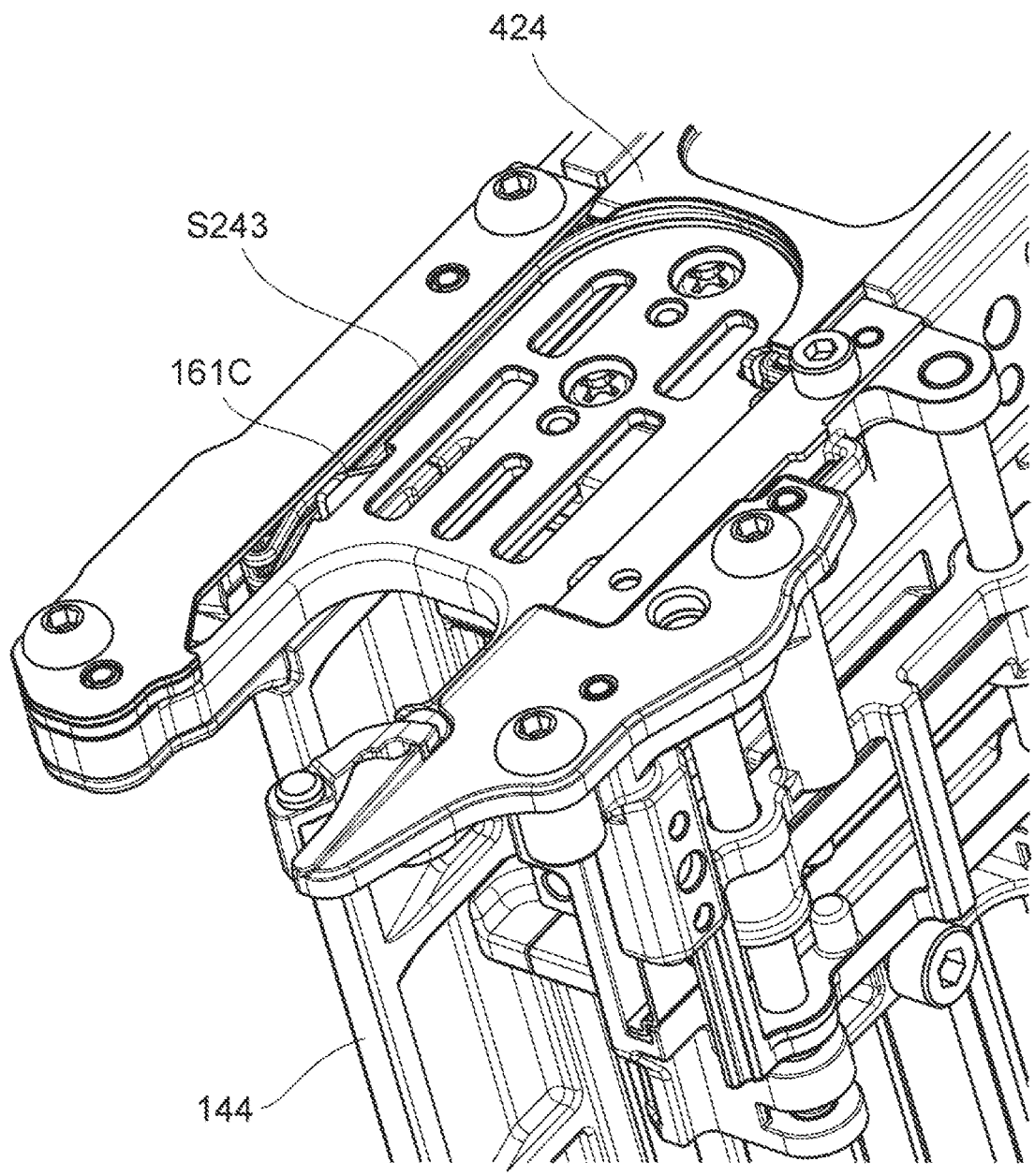
FIG. 39B is a perspective view of the front end portion of the binding machine according to the embodiment.

FIGS. 39A and 39B are perspective views of the front end portion of the binding machine 104 as viewed from an upper left side and an upper right side, respectively.

As illustrated in FIG. 39A, the movable wall 161A is provided inside (an example of the "guide position") the tip end portion (may be referred to as a front end portion) of the first leg portion S14. By providing the movable wall 161A inside the first leg portion S14, the first leg portion S14 can be inhibited from being displaced in the inward direction, and can be guided to the forward direction X1.

The movable wall 161B is provided in the crank portion of the first leg portion S14, that is, in the forward direction with respect to the first portion S141 and inside the second portion S142. By providing the movable wall 161B in the crank portion, the second portion S142 of the crank portion can be inhibited from being displaced in the inward direction, and can be guided to the forward direction X1.

As illustrated in FIG. 39B, the movable wall 161C is provided inside the tip end portion of the third portion S243 of the second leg portion S24. By providing the movable wall 161C inside the second leg portion S24, the second leg portion S24 can be inhibited from being displaced in the inward direction, and can be guided to the forward direction X1.

Binding Method

Hereinafter, a binding method using the binding machine 104 will be described. The first object G inserted into the hole and the second object P inserted into a recessed portion (may be referred to as a "second insertion portion") provided between the first displacement portion 204 and the second displacement portion 304 are omitted from the drawings for convenience of description. In addition, for convenience of description, a part of the configuration may be omitted from the drawings. For example, in FIG. 40A and the like, a cover and the like provided above the second displacement portion 304 and the like are omitted.

FIGS. 40A to 40F are cross-sectional views illustrating a process of engaging the staple S4 with the first object G by using the binding machine 104 in the top view. FIG. 40A is a plan view of the front end portion of the binding machine 104 in the initial state before the start of displacement (before the start of movement) of the staple S4. In FIG. 40A, the plurality of staples S4 are stacked in the up-down direction at the same position in the front-rear direction. When the driver 424 starts to move in the forward direction from this state, the staple S4 pushed toward the forward direction by the driver 424 starts to move in the forward direction X1. At this time, the movable walls 161A to 161C are positioned inside the first leg portion S14 or the second leg portion S24 of the staple S4, respectively, and thus the staple S4 is restrained from being displaced in an unintended direction and is guided to move in the forward direction X1. The driver 424 includes a roof portion provided to cover the main body portion S34 of the staple S4 from above, and thus a part of the main body portion S34 is covered with the roof portion of the driver 424 in FIG. 40A.

Figure 40B:
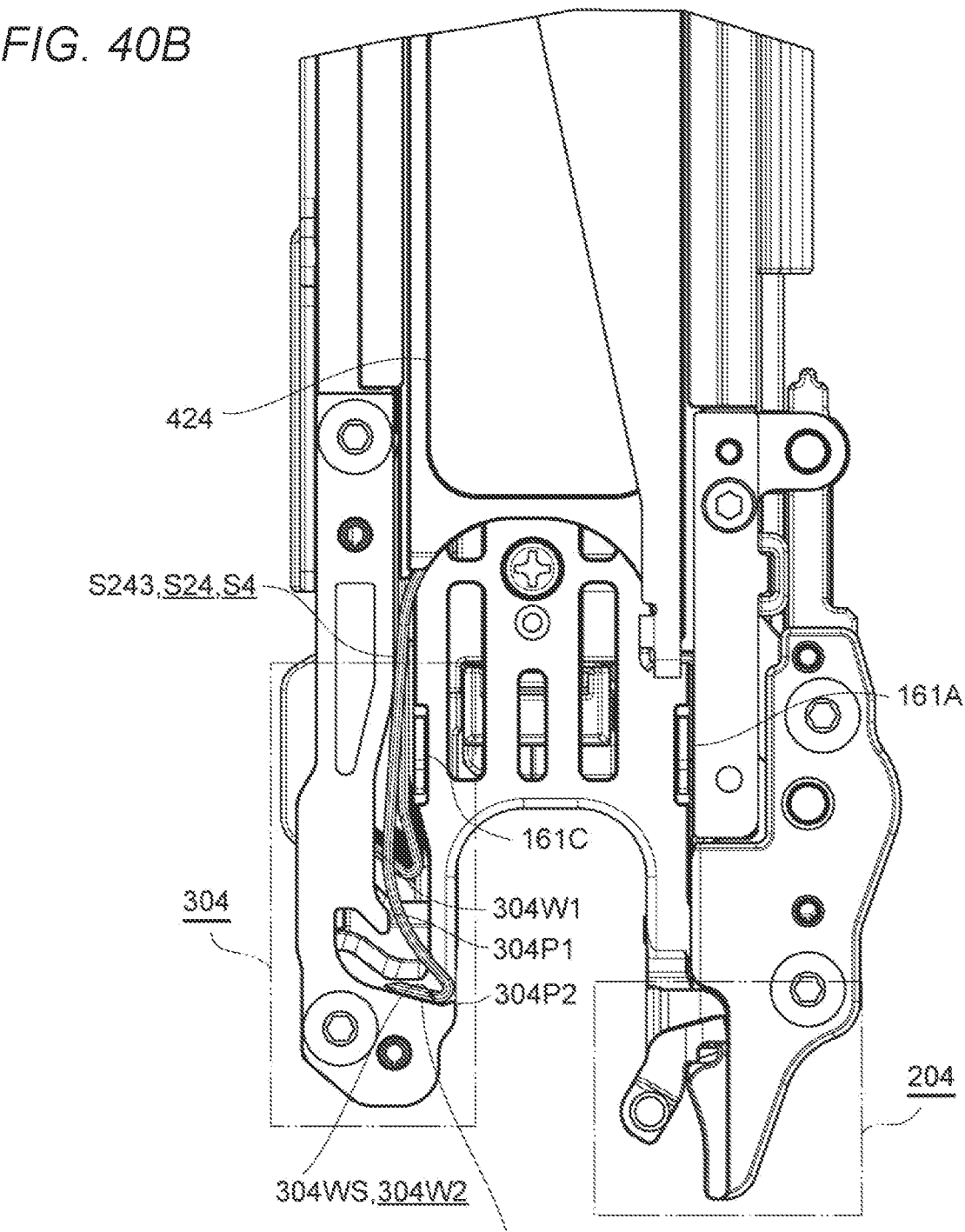
FIG. 40B is a plan view illustrating the binding method of the binding machine according to the embodiment.
Figure 40C:
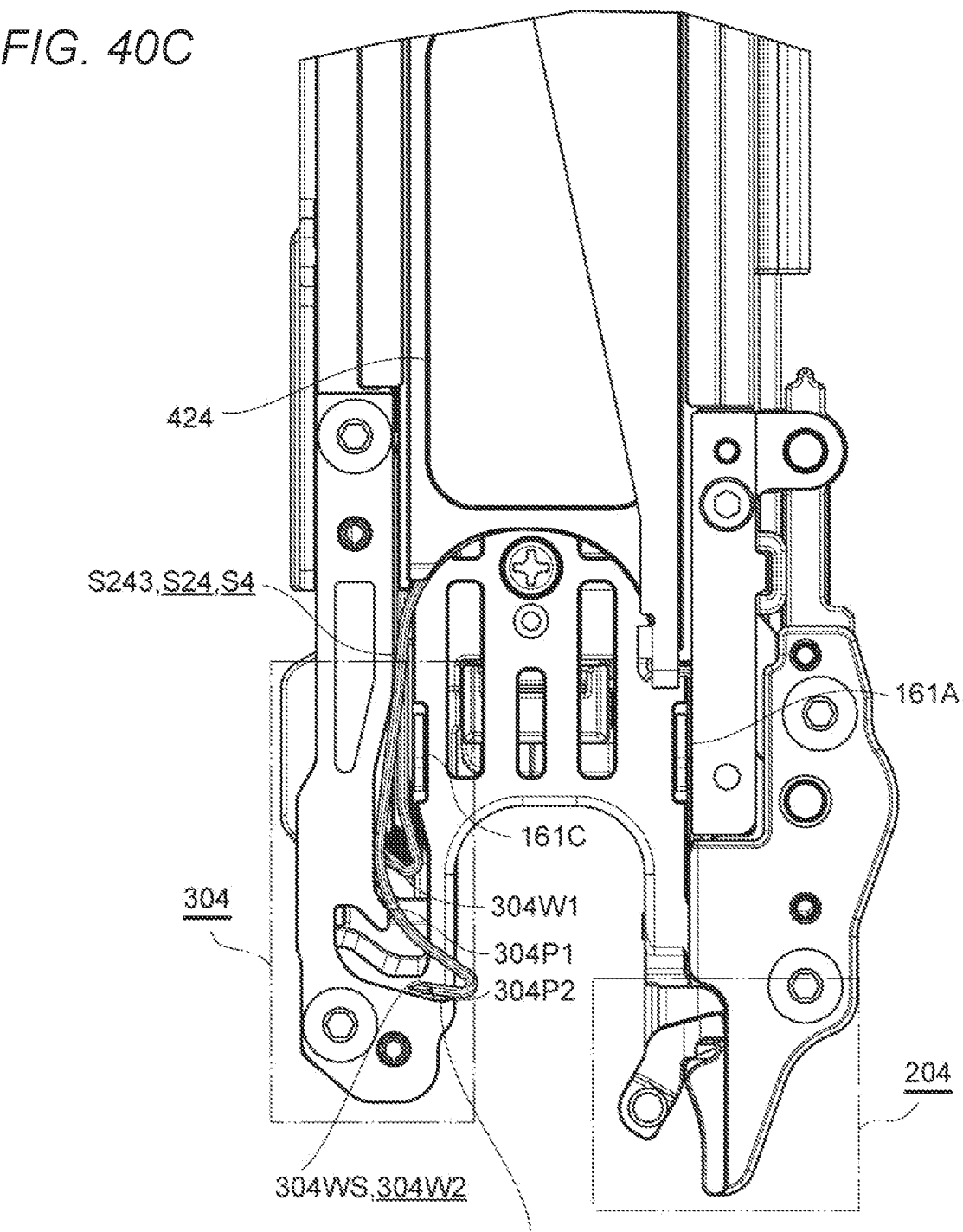
FIG. 40C is a plan view illustrating the binding method of the binding machine according to the embodiment.

FIG. 40B is a plan view of the front end portion of the binding machine 104 in a state after the start of displacement of the staple S4 positioned at the upper end. As illustrated in FIG. 40B, the staple S4 positioned at the upper end is separated from the another staple S4 positioned in the downward direction and moves in the forward direction X1. At this time, the movable wall 161B has already retreated toward the downward direction by being pushed by the first portion S141 of the staple S4. On the other hand, the movable wall 161A and the movable wall 161C guide the first leg portion S14 and the second leg portion S24 of the staple S4 in the forward direction by being positioned at the guide positions in the inward direction with respect to the first leg portion S14 and the second leg portion S24, respectively. As illustrated in FIGS. 40B and 40C, the second guiding wall 304W2 is provided in the forward direction X1 with respect to the second leg portion S24, and thus when the driver 424 further advances, the hook portion S244 of the second leg portion S24 comes into contact with a wall surface 304WS of the second guiding wall 304W2 facing the rearward direction X2 and advances along the wall surface 304WS while being deformed. The wall surface 304WS has a portion facing the rearward direction X2 and formed substantially parallel to the left-right direction, and thus the hook portion S244 cannot advance toward the forward direction X1, and the third portion S243 that tries to move in the forward direction X1 is curved so as to bulge to the outward direction. The first guiding wall 304W1 has a recessed surface that is provided in the outward direction with respect to the second leg portion S24 (the rightward direction Y1), and that is formed to face the inward direction with respect to the staple S4 and to be recessed to the outward direction (the rightward direction Y1), and thus as illustrated in FIG. 40B, the third portion S243 bulges to the outward direction and is curved such that at least a part thereof comes into contact with the recessed surface of the recessed portion.

When the staple S4 further moves in the forward direction X1 by being pushed by the driver 424, the third portion S243 of the staple S4 is further curved so as to bulge to the inward direction (the leftward direction Y2). Accordingly, a part of the third portion S243 of the staple S4 comes into contact with a protruded portion 304P1 formed at an end portion of the first guiding wall 304W1 in the forward direction X1. When the staple S4 further moves in the forward direction X1, as illustrated in FIG. 40C, the third portion S243 of the staple S4 is bent toward the rearward direction X2 from the wall surface 304WS of the second guiding wall 304W2 with the protruded portion 304P1 of the first guiding wall 304W1 as a fulcrum. As described above, in the present embodiment, the wall surface 304WS of the second guiding wall 304W2 functions as a bending portion that bends the third portion S243 of the staple S4. In addition, the protruded portion 304P1 of the first guiding wall 304W1 functions as a first fulcrum portion when the third portion S243 of the staple S4 is bent.

Figure 40D:
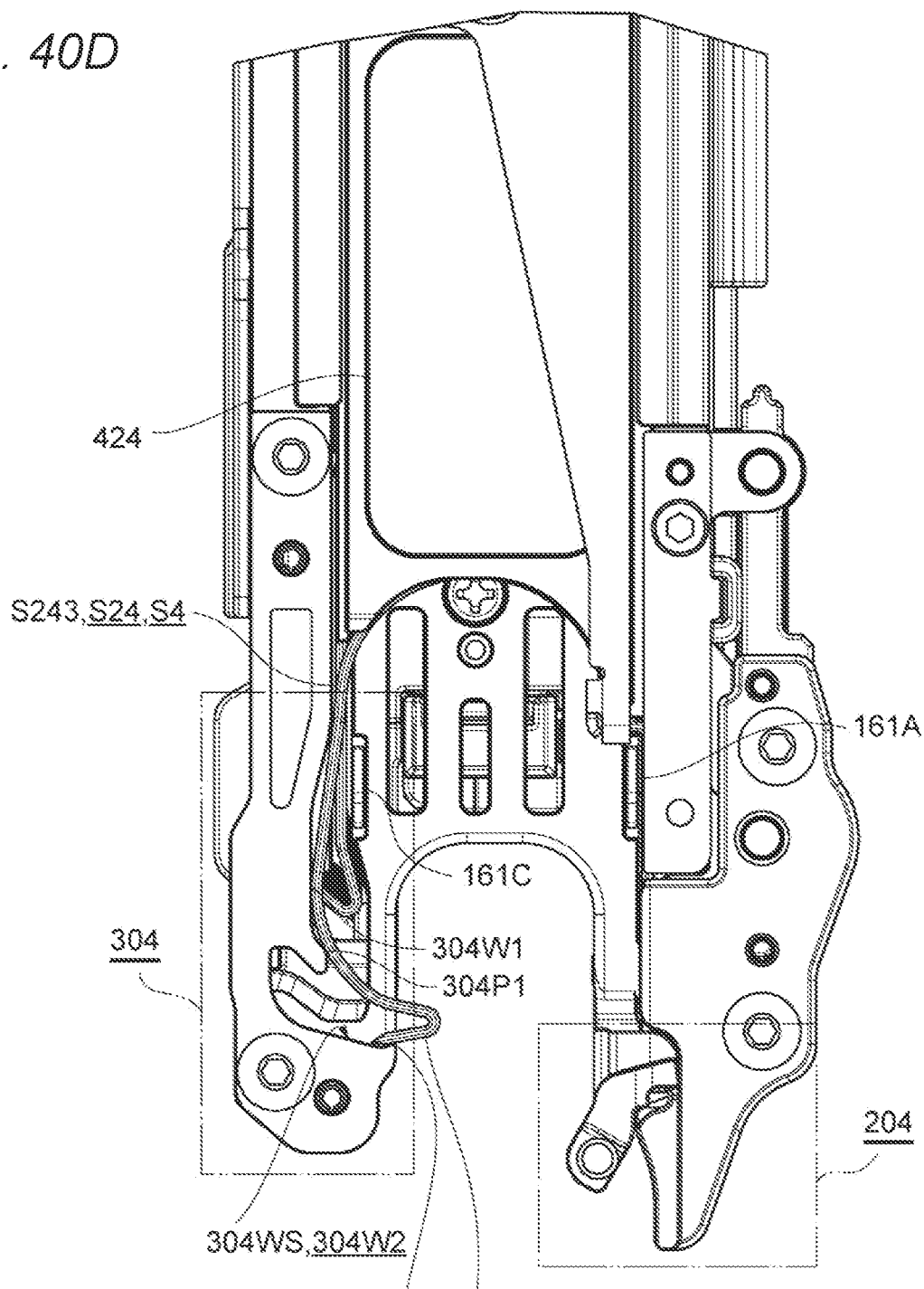
FIG. 40D is a plan view illustrating the binding method of the binding machine according to the embodiment.

As illustrated in FIGS. 40C and 40D, the second guiding wall 304W2 includes the protruded portion 304P2 whose protruding amount toward the rearward direction X2 becomes large as advancing toward the inward direction (the leftward direction Y2). Therefore, when the staple S4 further moves in the forward direction X1 by being pushed by the driver 424, the hook portion S244 of the staple S4 is guided to advance toward the rearward direction X2 while coming into contact with the protruded portion 304P2. Accordingly, the third portion S243 of the staple S4 bulges to the outward direction and is curved. When the hook portion S244 moves over the second guiding wall 304W2, the hook portion S244 advances toward the forward direction X1 due to the elasticity of the second leg portion S24, and the third portion S243 of the second leg portion S24 comes into contact with the protruded portion 304P1. Through the process described above, the second leg portion S24 is curved substantially counterclockwise in the paper surface and is bent in a direction approaching the first leg portion S14 in the top view.

After the hook portion S244 moves over the second guiding wall 304W2, a tip end of the first leg portion S14 starts to enter the hole of the first displacement portion 204. Since the staple S4 has flexibility and plasticity, when the staple S4 moves in the opening direction D1, the tip end of the first leg portion S14 advances along an inner wall of the hole while being curved in a spiral shape. Accordingly, by moving the staple S4 in the forward direction in a state in which the first object G is disposed on an axis of the spiral shape, it is possible to engage the tip end portion of the first leg portion S14 of the staple S4 with the first object G in a spiral shape surrounding the outer periphery of the first object G with the first object G as an axis.

Figure 40E:
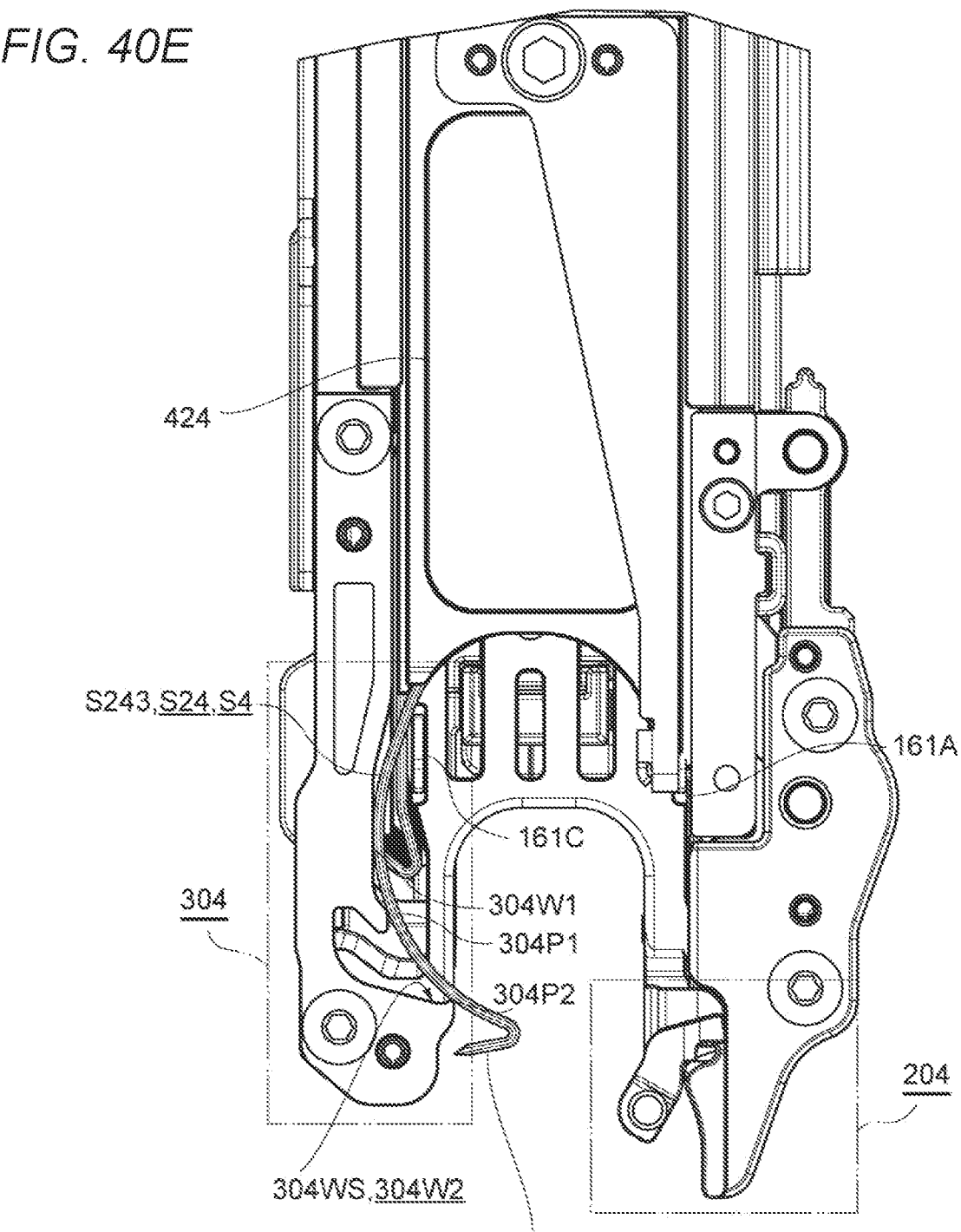
FIG. 40E is a plan view illustrating the binding method of the binding machine according to the embodiment.

When the driver 424 further causes the staple S4 to advance, the hook portion S244 comes into contact with an inclined surface of the second displacement portion 304, which is inclined toward the upward direction Z1 and the rearward direction X2, and moves in the upward direction Z1. As illustrated in FIG. 40E, the hook portion S244 passes through a region between the first object G and the second object P in the top view and advances to a position intersecting the first leg portion S14. The second leg portion S24 including the hook portion S244 moves in the upward direction Z1 by coming into contact with the inclined surface moving in the upward direction, and thus the second leg portion S24 does not interfere with the first leg portion S14.

Figure 40F:
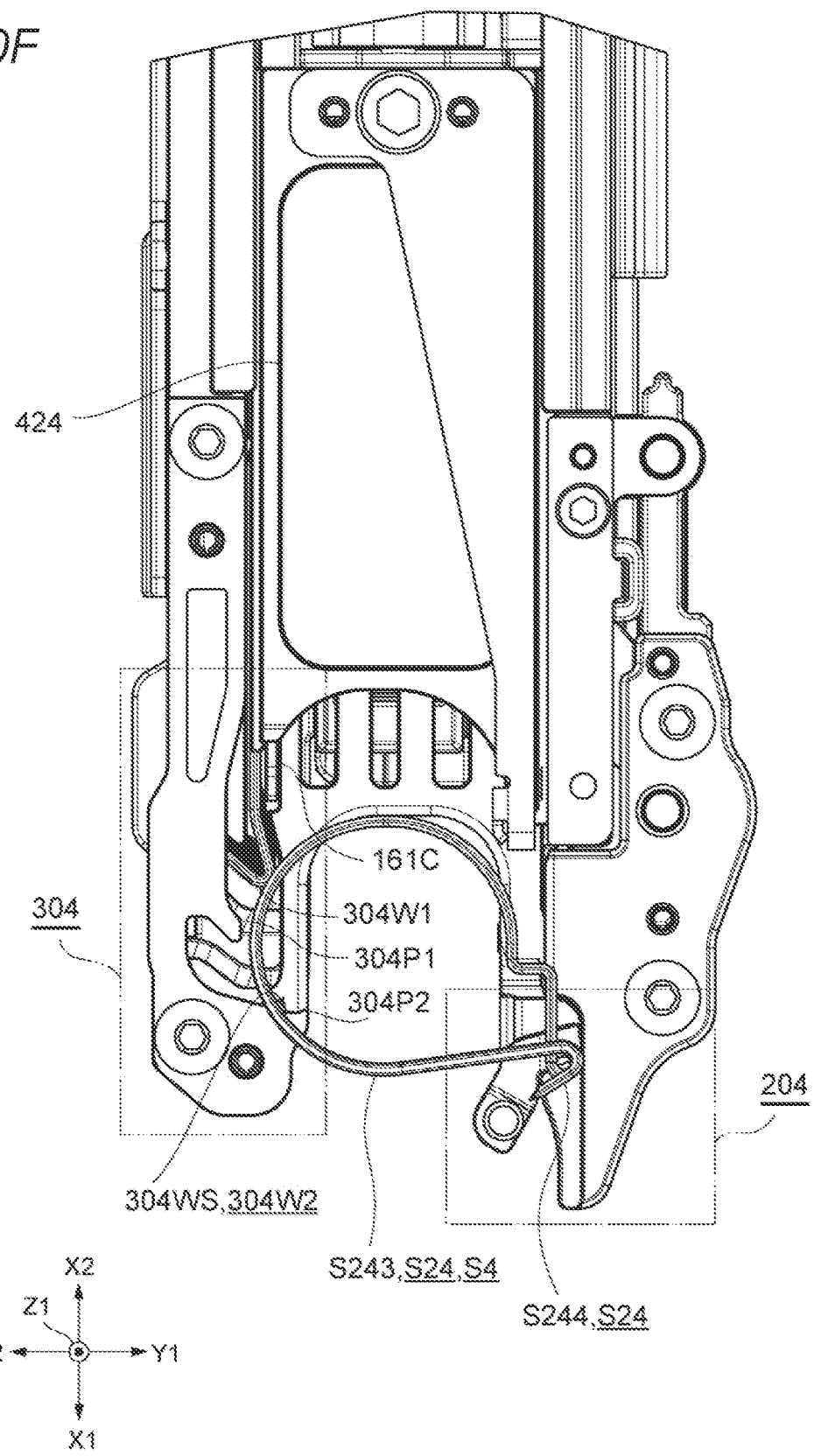
FIG. 40F is a plan view illustrating the binding method of the binding machine according to the embodiment.

FIG. 40F illustrates a state in which the driver 424 is retracting. Since the second leg portion S24 of the staple S4 exhibits an elastic force so as to restore as the driver 424 retracts, the second leg portion S24 is displaced in a clockwise direction in the paper surface, approaches the first object G, and is engaged with the first object G. The first guiding wall 304W1 may also form an inclined surface facing the upward direction on a surface that comes into contact with the second leg portion S24 so as to promote the movement of the hook portion S244 toward the upward direction Z1.

Figure 41:
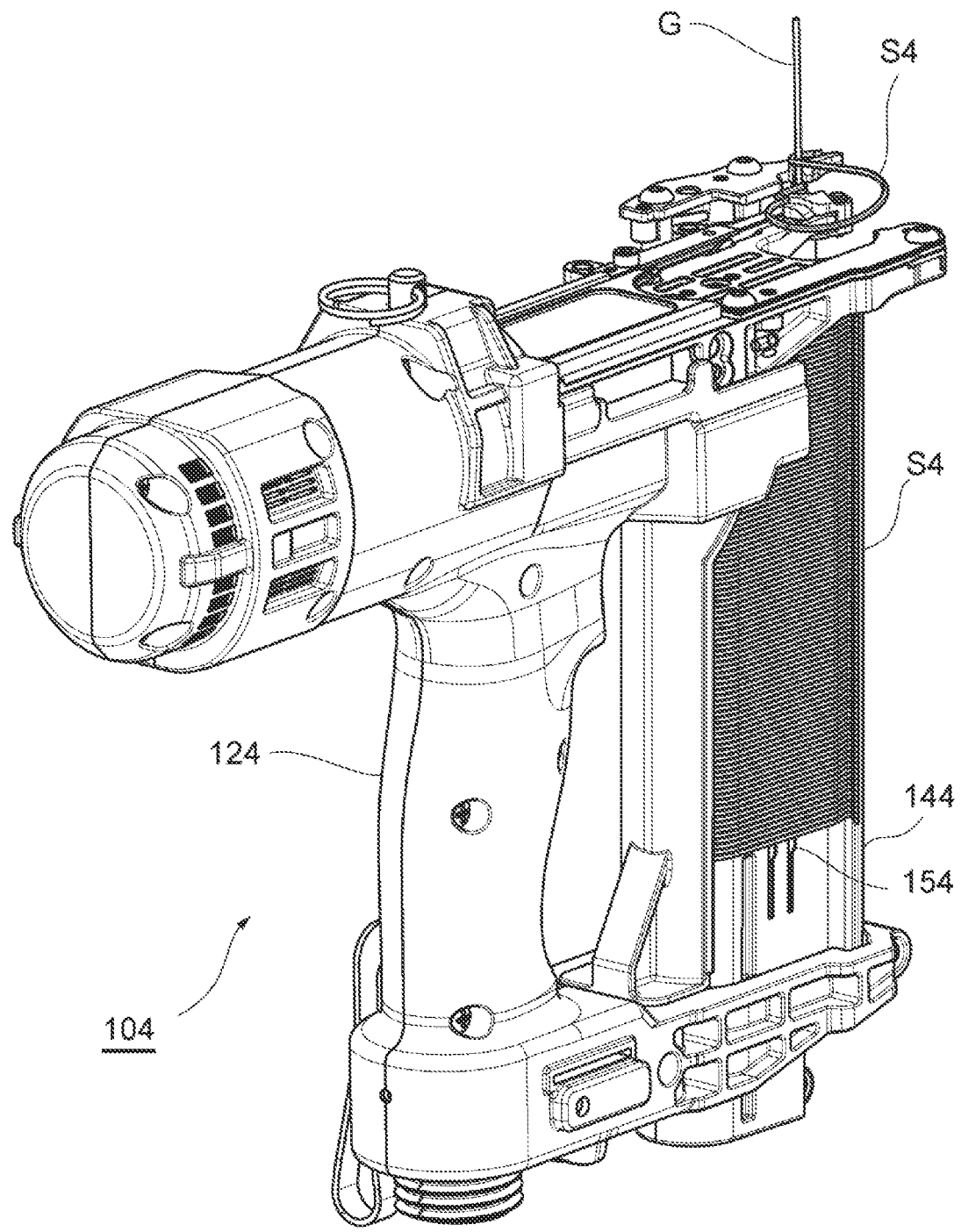
FIG. 41 is a perspective view of the binding machine according to the embodiment as viewed from a rearward direction.

According to the binding method described above, it is possible to engage the first leg portion S14 and the second leg portion S24 with the first object G so as to surround and bind the second object P by the first leg portion S14, the second leg portion S24, and the main body portion S34. By providing the movable wall 161 as the guiding portion, the binding machine 104 can guide the movement of the staple S4 in the forward direction X1 without suppressing the movement of the staple S4 in the forward direction X1. FIG. 41 is a rear perspective view illustrating a state in which the staple S4 is engaged with the first object G (however, the second object P disposed at a position at which the second object P is surrounded by the staple S4 is omitted in FIG. 41).

Positional Relation Between Magazine 144 and Parts

Next, a positional relation between the magazine 144 and the parts will be described.

Figure 42:
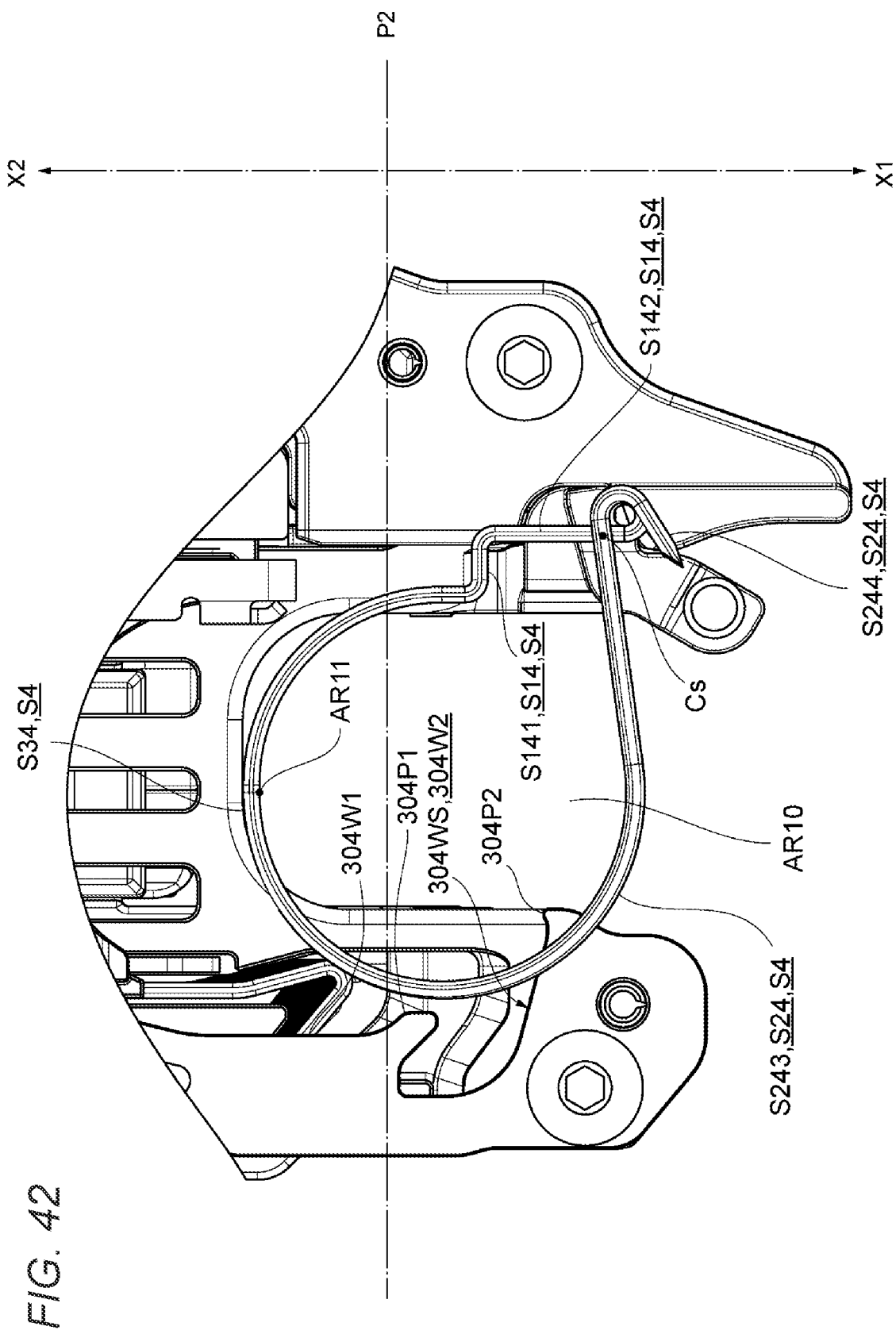
FIG. 42 is a plan view illustrating the staple displaced by the binding machine according to the embodiment.

FIG. 42 is a plan view of the binding machine 104 as viewed in the upward direction Z1, illustrating a binding region AR10 surrounded by the displaced staple S4. As illustrated in FIG. 42, in a state after the displacement, the second leg portion S24 intersects the first leg portion S14 in the top view. The binding region AR10 corresponds to a region surrounded by the main body portion S34, the first leg portion S14, and the second leg portion S24 of the staple S4.

In FIG. 42, an intersection point at which the first leg portion S14 and the second leg portion S24 of the staple S4 intersect with each other is indicated by reference numeral Cs. In addition, a position of a front end surface of the magazine 144 in the front-rear direction is indicated by reference numeral P2.

As illustrated in FIG. 42, the position P2 in the magazine 144 is located in the rearward direction X2 with respect to the intersection point Cs of the staple S4. Therefore, it is possible to restrain a situation in which the magazine 144 comes into contact with the second object P penetrating through the binding region AR10 and damages the second object P.

The position P2 in the magazine 144 may be disposed in the rearward direction X2 with respect to a position AR11 of the binding region AR10 in FIG. 42. The position AR11 is a position of a rear end of the binding region AR10. According to such a configuration, in the top view, the front end surface of the magazine 144 is positioned in the rearward direction X2 with respect to the region AR10 in which the second object P may be present, and thus it is possible to restrain the contact between the binding machine 104 and the second object P.

As is apparent from FIG. 42, the position P2 in the magazine 144 is located in the rearward direction X2 with respect to the protruded portion 304P1 of the first guiding wall 304W1. According to such a configuration, it is possible to further restrain the situation in which the magazine 144 comes into contact with the second object P penetrating through the binding region AR10 and damages the second object P.

Further, various modifications can be made without departing from the gist of the present disclosure.

For example, the binding machine 10 illustrated in the first embodiment may have a configuration similar to that of the binding machine 100 according to the present embodiment by deforming so as to increase the movement amount in the forward direction of the staple S.

For example, the present disclosure includes a magazine that holds staples connected to each other, each of the staples having a first leg portion and a second leg portion and is opened between the first leg portion and the second leg portion, a driver that pushes one staple in a forward direction with an opening portion facing forward and moves at least the first leg portion and the second leg portion in the forward direction with respect to the other staple held by the magazine, and a displacement portion that binds an object to be bound inserted between the first leg portion and the second leg portion by displacing the first leg portion of the one staple moved in the forward direction.

According to such a configuration, since it is possible to bind by moving the one staple in the forward direction with respect to the other staple, it is possible to restrain the situation in which the magazine for holding the staples damages the object.

Here, a rear end of the one staple may be moved in the forward direction with respect to a front end of the other staple held by the magazine.

Further, various modifications can be made without departing from the gist of the present disclosure. For example, it is possible to add other known configurations to a part of constituent elements of an embodiment within the scope of the ordinary creativity of a person skilled in the art. In addition, a part of constituent elements of an embodiment may be replaced with other known constituent elements. The constituent elements disclosed in the present application can be reasonably combined or replaced with other known constituent elements by the exhibition of the ordinary creativity of a person skilled in the art.

The invention according to the present application can be implemented as a binding machine or a binding method described as the following notes in addition to the invention including the above embodiments.

That is, the present application further discloses binding machines described below.

Note 1

A binding machine including: a magazine configured to hold staples connected to each other, each of the staples having a first leg portion and a second leg portion and being opened between the first leg portion and the second leg portion; a driver configured to push one staple in a forward direction with an opening portion facing forward and configured to move at least the first leg portion and the second leg portion in the forward direction with respect to the other staple held by the magazine; and a displacement portion configured to bind an object to be bound inserted between the first leg portion and the second leg portion by displacing the first leg portion of the one staple moved in the forward direction.

Note 1-A

The binding machine according to Note 1, in which the driver is capable of moving a rear end of the one staple in the forward direction with respect to a front end of the other staple held by the magazine.

The present application discloses a binding machine including: a magazine configured to hold a staple that has a first leg portion and a second leg portion and that is opened between the first leg portion and the second leg portion; a driver configured to push the staple held in the magazine in a forward direction with an opening portion facing forward and configured to move the first leg portion and the second leg portion in the forward direction of the magazine; and a displacement portion configured to binds an object to be bound inserted between the first leg portion and the second leg portion by displacing the first leg portion moved in the forward direction of the magazine.

The displacement portion may be configured to displace the first leg portion to intersect the second leg portion in a top view, and the magazine may be positioned in a rearward direction of an intersection point when the first leg portion and the second leg portion intersect each other.

The displacement portion may include a first fulcrum portion positioned in an inward direction of the first leg portion moved in the forward direction of the magazine, and a bending portion positioned in an outward direction of the first leg portion and configured to bend the first leg portion in the inward direction with the first fulcrum portion as a fulcrum, and the magazine may be positioned in a rearward direction of the first fulcrum portion.

The displacement portion may include a second fulcrum portion positioned in an outward direction of the first leg portion moved in the forward direction of the magazine, and a bending portion positioned in an outward direction of the first leg portion and configured to bend the first leg portion in an inward direction by pivoting in the inward direction with the second fulcrum portion as a fulcrum, and the magazine may be positioned in a rearward direction of the second fulcrum portion.

The magazine may be positioned in a rearward direction of a virtual straight line that passes through a rear end of the staple at a binding position and that is inclined in a downward direction with respect to the forward direction by 60 degrees, in a side view.

The driver may be configured to move the staples held in the magazine in the forward direction of the magazine, by a distance of a total length of the staple.

Furthermore, the present application discloses a binding machine including: a magazine capable of accommodating a plurality of staples stacked in an up-down direction; a driver capable of separating the staple positioned at an upper end from another staple and moving the separated staple in the forward direction; and a displacement portion capable of binding a first object and a second object by displacing the separated staple.

The binding machine may further include a pusher capable of moving the staple accommodated in the magazine in an upward direction.

The displacement portion may include a first displacement portion that protrudes in the forward direction with respect to the magazine and a second displacement portion that protrudes in the forward direction with respect to the magazine.

The binding machine may be able to displace the staple in a region in the forward direction with respect to the magazine.

The staple displaced by the binding machine may include a first leg portion, a second leg portion longer than the first leg portion, and a main body portion that connects the first leg portion and the second leg portion.

The second displacement portion of the binding machine may be able to displace the second leg portion so as to surround the second object that extends in the up-down direction in a region in the forward direction of the magazine and penetrates a region between the first displacement portion and the second displacement portion in a top view and intersect the first leg portion.

The magazine of the binding machine may include a magazine wall portion including a front end surface extending in the up-down direction and facing the forward direction, and the front end surface of a cut surface obtained by cutting the magazine wall portion in a virtual plane perpendicular to the up-down direction may be positioned in a rearward direction of an intersection point at which the first leg portion and the second leg portion intersect.

The magazine wall portion may include a first wall portion that is provided opposite to the first leg portion and includes a first surface extending in the up-down direction and facing the forward direction, a second wall portion that is provided opposite to the second leg portion, includes a second surface extending in the up-down direction and facing the forward direction, and includes a portion formed in the forward direction with respect to the first wall portion, and a third wall portion that is provided opposite to the main body portion and includes a portion formed in a rearward direction of the first wall portion.

The magazine may be formed such that the first surface corresponds to a surface of a front end portion of the first wall portion and the second surface is a front end portion of the second wall portion and corresponds to a surface of a front end portion of the magazine.

The driver of the binding machine may be able to separate the staple positioned at the upper end from the another staple to move the staple to a forward binding position. The displacement portion of the binding machine may be able to displace the staple moved to the binding position, a front end of the second wall portion in the cut surface obtained by cutting the magazine wall portion in the virtual plane perpendicular to the up-down direction may be positioned in a forward direction with respect to a rear end of the staple in the binding position, and a front end of the first wall portion in the cut surface may be positioned in a rearward direction with respect to the rear end of the staple arranged at the binding position.

The driver may be able to separate the staple positioned at the upper end from the another staple to move the staple to the forward binding position such that a region obtained by projecting the staple moved to the binding position in the up-down direction and a region obtained by projecting the another staple accommodated in the magazine in the up-down direction are separated from each other.

The magazine may be able to hold the staple having a first length in a front-rear direction, and the driver may be able to move the staple in the forward direction by a distance of 50% or more of the first length.

The binding machine may further include a wall portion configured to serve as a bending fulcrum for displacing by bending the staple, the magazine may include a magazine wall portion including a surface extending in the up-down direction and facing the forward direction, and a surface of the magazine wall portion of the cut surface obtained by cutting the magazine wall portion in the virtual plane perpendicular to the up-down direction may be positioned in a rearward direction of the fulcrum.

Furthermore, the present application discloses a binding machine including: a magazine capable of accommodating a plurality of staples stacked in an up-down direction; a driver capable of separating the staple positioned at an upper end from another staple and moving the separated staple to a forward binding position; and a displacement portion capable of binding a first object and a second object by displacing the separated staple. The magazine may be positioned in a rearward direction with respect to a virtual straight line that passes through a rear end of the staple at the binding position and that is inclined with respect to the forward direction by 60 degrees and inclined with respect to the downward direction by 30 degrees, in a side view.

These binding machines may have a configuration suitable for bending growing plants.

The present application discloses a binding machine configured to bind a first object and a second object by using a staple that includes a first leg portion, a second leg portion, and a main body portion connecting the first leg portion and the second leg portion, and that has an opening formed between the first leg portion and the second leg portion. The binding machine includes a first displacement portion configured to displace the first leg portion so as to be engageable with the first object, and a second displacement portion configured to displace the second leg portion so as to surround the second object by using the first leg portion, the second leg portion, and the main body portion, and to be engageable with the first object.

In the top view, the second displacement portion may be able to displace the second leg portion to a position at which the second leg portion intersects the first leg portion.

The binding machine may include a first insertion portion into which the first object is to be inserted and a second insertion portion into which the second object is to be inserted. Further, the first displacement portion may be configured to displace a tip end portion of the first leg portion so as to engage with the first object inserted into the first insertion portion, and the second displacement portion may be configured to displace the second leg portion so as to surround the second object inserted into the second insertion portion.

The binding machine may include a movement portion configured to move the staple in an opening direction of the staple. Further, the second displacement portion may displace the second leg portion in the inward direction of the staple as the movement portion moves in the opening direction.

The movement portion may include a driver movable in the opening direction.

The movement portion may include a slider movable in the opening direction.

The movement portion may include the driver and the slider that are movable in the opening direction.

The second displacement portion may curve the second leg portion in the inward direction of the staple as the movement portion moves in the opening direction.

The second displacement portion may bend the second leg portion in the inward direction of the staple as the slider of the movement portion moves in the opening direction.

The second displacement portion may include an arm that is provided outside the second leg portion and that is configured to bend the second leg portion by being in contact with the movement portion moving in the opening direction.

The first displacement portion may be engaged with the first object by curving the tip end portion of the first leg portion in an arc shape as the movement portion moves in the opening direction.

The first displacement portion may include a first insertion portion into which the first object and the first leg portion are to be inserted.

The first insertion portion may include an inner wall configured to be engaged with the inserted first object by bending the tip end portion of the inserted first leg portion in an arc shape.

The first displacement portion may be configured to fold back the tip end portion of the first leg portion to sandwich the first object.

The present application discloses a binding method. This binding method is a binding method binding a first object and a second object by using a staple that includes a first leg portion, a second leg portion, and a main body portion connecting the first leg portion and the second leg portion, and that has an opening formed between the first leg portion and the second leg portion. The binding method includes a step of displacing the first leg portion and engaging the first object with the first leg portion, and a step of displacing the second leg portion so as to surround the second object by using the first leg portion, the second leg portion, and the main body portion, and engaging the first object with the second leg portion.

The step of displacing the first leg portion and engaging the first object with the first leg portion may include a step of advancing a tip end of the first leg portion in the downward direction separated from a plane penetrating through the first leg portion, the second leg portion, and the main body portion.

The step of displacing the second leg portion so as to surround the second object by using the first leg portion, the second leg portion, and the main body portion, and engaging the first object with the second leg portion may include a step of advancing a tip end of the second leg portion in an upward direction separated from the plane.

The step of displacing the first leg portion and engaging the first object with the first leg portion may include a step of displacing a portion that is within a first distance from a tip end of the first leg portion and engaging the first object with the first leg portion.

The step of displacing the second leg portion so as to surround the second object by using the first leg portion, the second leg portion, and the main body portion, and engaging the first object with the second leg portion may include a step of displacing a portion that is within a second distance larger than the first distance from a tip end of the second leg portion and engaging the first object with the second leg portion.

The step of displacing the second leg portion so as to surround the second object by using the first leg portion, the second leg portion, and the main body portion, and engaging the first object with the second leg portion may include a step of displacing, in a top view, the second leg portion in a first rotation direction to a position at which the second leg portion intersects the first leg portion and allowing a tip end portion of the second leg portion to pass through a gap between the first object and the second object, and a step of displacing the second leg portion in a second rotation direction opposite to the first rotation direction and engaging, with the first object, the tip end portion of the second leg portion passing through the gap between the first object and the second object.

The step of displacing, in the top view, the second leg portion in the first rotation direction to the position at which the second leg portion intersects the first leg portion and allowing the tip end portion of the second leg portion to pass through the gap between the first object and the second object may include a step of bending the tip end portion of the second leg portion in the second rotation direction opposite to the first rotation direction while bending the second leg portion in the first rotation direction.

The step of displacing the first leg portion and engaging the first object with the first leg portion may include a step of bending the tip end portion of the first leg portion in the first rotation direction and engaging the first object with the tip end portion of the first leg portion.

Here, the top view refers to a viewpoint viewed from a direction perpendicular to a plane penetrating through the first leg portion, the second leg portion, and the main body portion before the binding, and may be referred to as a plan view.

In the present disclosure, the description "binding a first object and a second object" refers to restricting the movement of the second object with respect to the first object. Here, the staple used for binding does not necessarily come into contact with the first object or the second object. For example, even when the staple does not come into contact with the second object, it is possible to restrict the movement of the second object with respect to the first object by engaging with the first object in a state in which the staple surrounds the second object, and thus the description "binding a first object and a second object" includes such a state.

In the present disclosure, the description "bend" or the description "fold" refers to local bending. Therefore, in a case of bending, a portion other than a locally bent portion substantially maintains an original shape. For example, when a linearly extending member is bent, a portion other than the locally bent portion substantially maintains a linearly extending shape.

In the present disclosure, the description "curve" refers to bending in a bow shape within a predetermined range. Therefore, in a case of curving, the curved member is deformed smoothly within a predetermined range.

In the present disclosure, the description "bend" includes bending and curving.

In the present disclosure, the "first leg portion" refers to a portion including one end portion of the staple, and the "second leg portion" refers to a portion including the other end portion of the staple. The "first leg portion" according to the present disclosure is not limited to the first leg portion described in embodiments, and the "second leg portion" according to the present disclosure is not limited to the second leg portion described in the embodiments. For example, the "first leg portion" according to the present disclosure may have a shape of the second leg portion described in the embodiments, and the "second leg portion" according to the present disclosure may have a shape of the first leg portion described in the embodiments.

In the present disclosure, the "magazine" refers to a configuration that performs a function of holding the staple in cooperation with the pusher. For example, a part for connecting and integrating the "magazine" and a binding machine main body does not correspond to the "magazine" of the present disclosure. For example, an adapter installed between an upper end of the "magazine" and the binding machine main body in order to attach the "magazine" to the binding machine main body does not correspond to the "magazine" of the present disclosure because the adapter is not a portion that performs the function of holding the staple but a part that connects the "magazine" and the binding machine main body. Similarly, a part that connects a grip and the "magazine" in order to hold the "magazine" does not correspond to the "magazine" of the present disclosure. The pusher also does not correspond to the "magazine".

The "magazine" of the present disclosure is a part capable of holding the staple and thus may have a configuration other than the configuration shown in the present embodiment. For example, the "magazine" of the present disclosure may be a part capable of holding the staple such that one end portion of the staple is exposed. Similarly, the "magazine" of the present disclosure may be a part capable of holding the staple such that both end portions of the staple are exposed. Such a configuration is included in the "magazine" since the staple can be held by holding the main body portion connecting both end portions.

What is claimed is:

1. A binding machine comprising:
   a magazine configured to hold a staple that has a main body portion, a first leg portion and a second leg portion and that is opened between the first leg portion and the second leg portion, wherein the main body portion connects the first leg portion and the second leg portion;
   a driver configured to push the staple held in the magazine in a forward direction with an opening portion facing forward and configured to move the first leg portion and the second leg portion in the forward direction of the magazine; and
   a displacement portion configured to engage the first leg portion and the second leg portion with a first object and to bind a second object inserted between the first leg portion and the second leg portion, by displacing the first leg portion and the second leg portion moved in the forward direction of the magazine, wherein
   the displacement portion is configured to displace the first leg portion to intersect the second leg portion in a top view, the top view corresponding to a direction perpendicular to a plane penetrating through the first leg portion, the second leg portion and the main body portion before binding,
   the magazine is positioned rearward of an intersection point where the first leg portion and the second leg portion intersect each other in a rearward direction opposite to the forward direction,
   the displacement portion is configured to engage the first leg portion and the second leg portion with the first object in a first region forward of the intersection point in the forward direction, and the displacement portion is configured to bind the second object inserted between the first leg portion and the second leg portion in a second region rearward of the intersection point in the rearward direction.

2. The binding machine according to claim 1, wherein the displacement portion includes a fulcrum portion positioned in an inward direction of the first leg portion and moved in the forward direction, wherein the inward direction is a direction from an outer side of the staple toward a region surrounded by the staple, the displacement portion includes a bending portion positioned in an outward direction of the first leg portion and configured to bend the first leg portion in the inward direction with the fulcrum portion as a fulcrum, wherein the outward direction is a direction from the region surrounded by the staple toward an outer side of the staple, and the magazine is positioned rearward of the fulcrum portion in the rearward direction.

3. The binding machine according to claim 2, wherein the driver is configured to move the staple held in the magazine in the forward direction by a distance of a half of a total length of the staple.

4. The binding machine according to claim 3, wherein the driver is configured to move the staple held in the magazine in the forward direction by a distance of the total length of the staple.

5. The binding machine according to claim 1, wherein the driver is configured to move the staple held in the magazine in the forward direction by a distance of a half of a total length of the staple.

6. The binding machine according to claim 5, wherein the driver is configured to move the staple held in the magazine in the forward direction by a distance of the total length of the staple.

7. The binding machine according to claim 1, further comprising:

a ball screw; and a nut part configured to move based on a rotation of the ball screw, wherein the nut part is configured to move the driver.

8. The binding machine according to claim 7, wherein a total of a length of the driver and an extension amount of the ball screw in the forward direction from a position of a rear end of the staple held in the magazine, is equal to or larger than a half of a total length of the staple.

* * * * *